(12) United States Patent
Smith et al.

(10) Patent No.: US 11,735,960 B2
(45) Date of Patent: Aug. 22, 2023

(54) SYSTEMS, METHODS, APPARATUSES, AND DEVICES FOR FACILITATING WIRELESS ENERGY TRANSMISSIONS

(71) Applicant: Voice Life FZCO, Dubai (AE)

(72) Inventors: Robert Smith, Huntington Beach, CA (US); David Lark, CorCoran, CA (US); Michael Smith, Huntington Beach, CA (US)

(73) Assignee: VOICE LIFE FZCO, Dubai (AE)

( * ) Notice: Subject to any disclaimer, the term of this patent is extended or adjusted under 35 U.S.C. 154(b) by 0 days.

(21) Appl. No.: 18/059,874

(22) Filed: Nov. 29, 2022

(65) Prior Publication Data

US 2023/0163637 A1    May 25, 2023

Related U.S. Application Data

(63) Continuation-in-part of application No. 17/499,335, filed on Oct. 12, 2021, now Pat. No. 11,545,855,
(Continued)

(51) Int. Cl.
*H02J 50/20*  (2016.01)
*H02J 50/40*  (2016.01)
(Continued)

(52) U.S. Cl.
CPC .......... *H02J 50/20* (2016.02); *G06Q 20/3672* (2013.01); *H02J 50/005* (2020.01);
(Continued)

(58) Field of Classification Search
CPC .......... H02J 50/20; H02J 50/40; H02J 50/005; G06Q 20/3672; H04B 5/0031; H04B 5/0037; H04B 7/195
(Continued)

(56) References Cited

U.S. PATENT DOCUMENTS

| | | | |
|---|---|---|---|
| 7,839,124 B2 | 11/2010 | Yamazaki et al. | |
| 8,183,828 B2 * | 5/2012 | Tanabe | H02J 50/60 |
| | | | 320/108 |

(Continued)

FOREIGN PATENT DOCUMENTS

| | | |
|---|---|---|
| CN | 109067011 A | 12/2018 |
| KR | 101999126 B1 | 9/2019 |

(Continued)

OTHER PUBLICATIONS

Strugar et al., M2M Billing for Electric Autonomous Vehicles, 2018, arXiv: 1804.00658v1.

(Continued)

*Primary Examiner* — Alfonso Perez Borroto

(57) ABSTRACT

A system for facilitating wireless energy transmissions. The system comprises a ground station and a space station. The ground station is positioned in a location on the earth. The ground station comprises a transmitter device. The space station is positioned in an orbit around the earth. The space station comprises a primary receiver device and a primary transmitter device. The primary receiver device comprises a receiver transceiver. The transmitter device transmits terahertz electromagnetic wave energy wirelessly to the receiver transceiver. The receiver transceiver receives the energy wirelessly from the transmitter. The receiver transceiver comprises a receiver enclosure comprised of a metamaterial. The receiver enclosure converts the terahertz electromagnetic wave energy into electrical energy based on the receiving. The receiver enclosure comprises a receiver antenna comprised of superconducting material and facilitates the (Continued)

receiving. The primary transmitter device transmits the electrical energy wirelessly to a secondary receiver device based on the converting.

20 Claims, 64 Drawing Sheets

Related U.S. Application Data which is a continuation-in-part of application No. PCT/US2021/028225, filed on Apr. 20, 2021, and a continuation-in-part of application No. 17/137,830, filed on Dec. 30, 2020, now Pat. No. 11,171,521, and a continuation-in-part of application No. 17/044,792, filed on Oct. 1, 2020, now Pat. No. 11,303,159, said application No. 17/137,830 is a continuation-in-part of application No. 16/853,170, filed on Apr. 20, 2020, now Pat. No. 10,910,882, which is a continuation-in-part of application No. 16/597,776, filed as application No. PCT/IB2019/052413 on Mar. 25, 2019, now Pat. No. 10,944,296, said application No. 16/597,776 is a continuation-in-part of application No. PCT/IB2018/057826, filed on Oct. 9, 2018.

(60) Provisional application No. 62/652,022, filed on Apr. 3, 2018, provisional application No. 62/569,722, filed on Oct. 9, 2017.

(51) Int. Cl.
  *H02J 50/00* (2016.01)
  *H04B 5/00* (2006.01)
  *G06Q 20/36* (2012.01)
  *H04B 7/195* (2006.01)

(52) U.S. Cl.
  CPC ............ *H02J 50/40* (2016.02); *H04B 5/0031* (2013.01); *H04B 5/0037* (2013.01); *H04B 7/195* (2013.01)

(58) Field of Classification Search
  USPC .......................................... 307/104; 320/108
  See application file for complete search history.

(56) References Cited

U.S. PATENT DOCUMENTS

| | | | |
|---|---|---|---|
| 8,629,651 B2 * | 1/2014 | Guccione | H02J 50/90 320/108 |
| 9,544,075 B2 | 1/2017 | Altman et al. | |
| 9,871,291 B2 | 1/2018 | Chen et al. | |
| 10,103,552 B1 | 10/2018 | Leabman et al. | |
| 10,910,882 B2 | 2/2021 | Smith et al. | |
| 10,944,296 B2 | 3/2021 | Smith et al. | |
| 2006/0145694 A1 | 7/2006 | Oppenlander et al. | |
| 2009/0153098 A1 * | 6/2009 | Toya | H02J 50/10 320/108 |
| 2010/0315045 A1 * | 12/2010 | Zeine | H02J 50/70 320/137 |
| 2011/0181120 A1 | 7/2011 | Liu et al. | |
| 2013/0082653 A1 | 4/2013 | Lee et al. | |
| 2013/0200844 A1 | 8/2013 | Lee et al. | |
| 2014/0312833 A1 | 10/2014 | Won et al. | |
| 2016/0100312 A1 | 4/2016 | Bell et al. | |
| 2016/0191121 A1 | 6/2016 | Bell et al. | |
| 2018/0145416 A1 | 5/2018 | Cardullo et al. | |
| 2019/0058242 A1 | 2/2019 | Tabe | |
| 2020/0044485 A1 | 2/2020 | Smith et al. | |
| 2020/0251936 A1 | 8/2020 | Smith et al. | |
| 2021/0152035 A1 | 5/2021 | Smith et al. | |

FOREIGN PATENT DOCUMENTS

| | | |
|---|---|---|
| WO | 2014180419 A1 | 11/2014 |
| WO | 2018126065 | 7/2018 |
| WO | 2019073390 A1 | 4/2019 |

OTHER PUBLICATIONS

Zhang et al., "Two-dimensional MoS2-enabled flexible rectenna for Wi-Fi-band wireless A energy harvesting", http:l/ciqm.harvard.edu/uploads/2/3/3/4/2334921 O/zhang_grajal2019.pdf.
M2M Billing for Electric Autonomous Vehicles; Dragos Strugar, Rasheed Hussain, Manuel Mazzara, Victor Rivera) (DOI:10.13140/RG.2.2.19785.65122) (Date of Publication: Feb. 4, 2018) (pp. 1-5).

\* cited by examiner

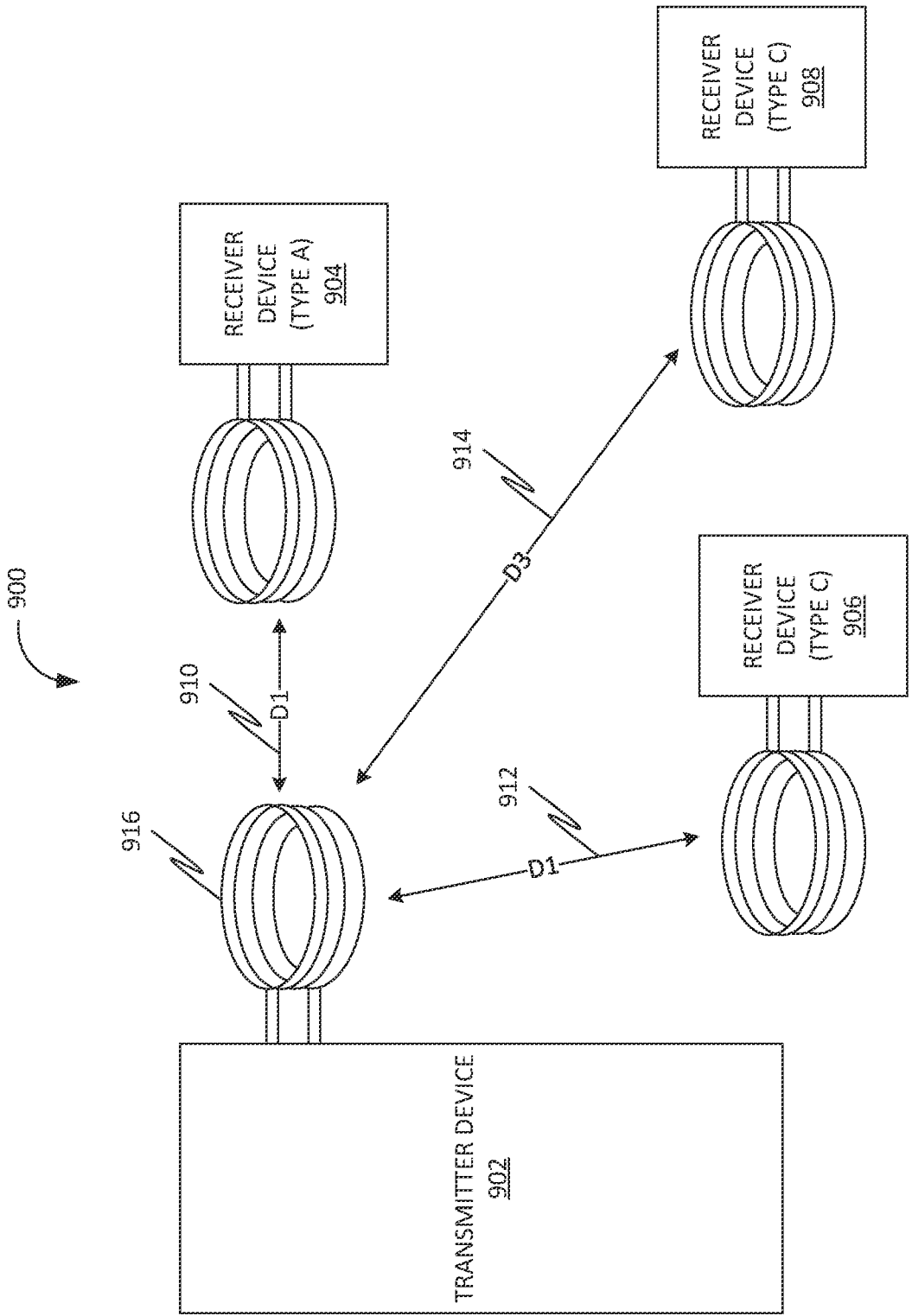

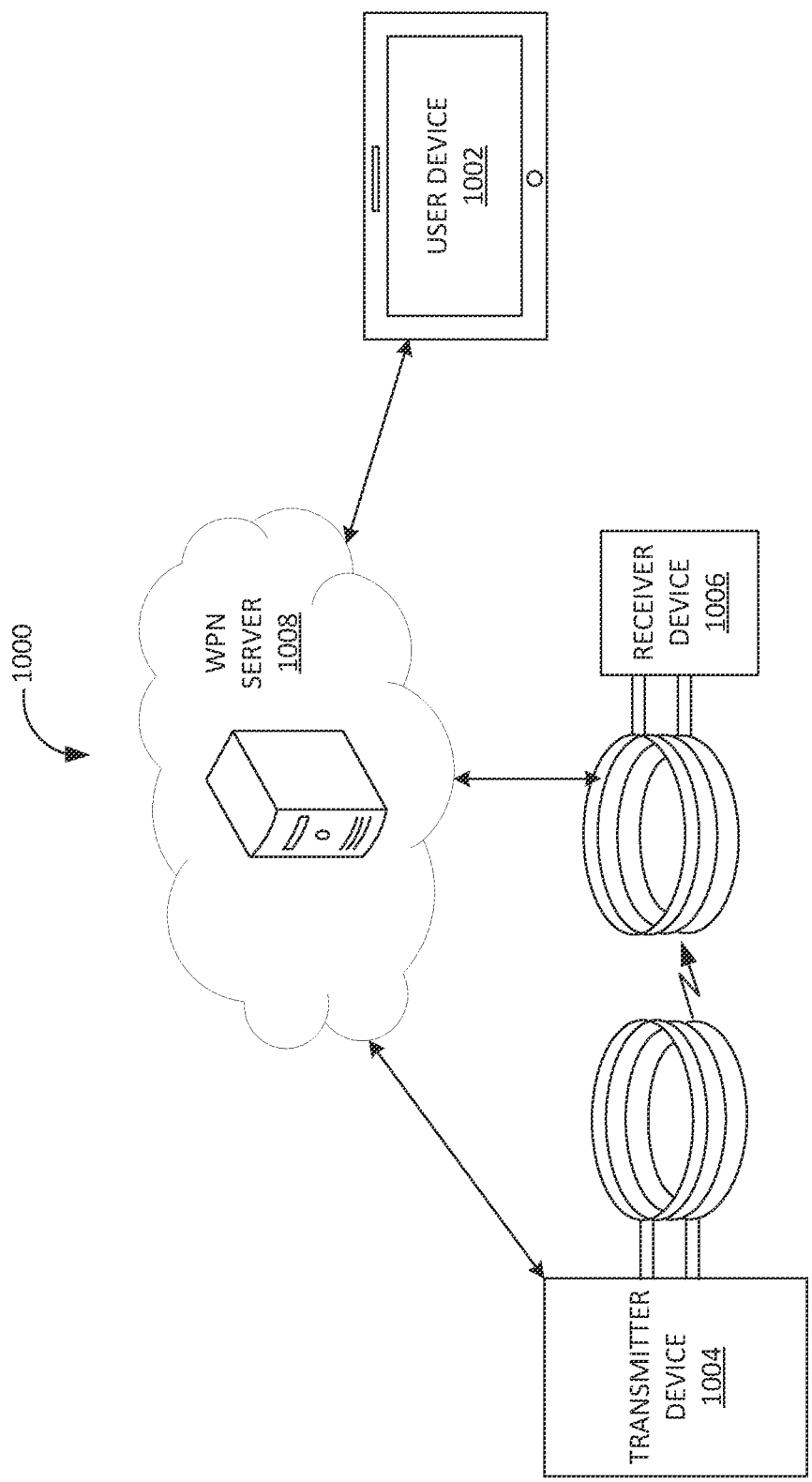

1102

| Application Interactive Interface for User Operation | | 1110 |
|---|---|---|
| Software Layer | | |
| Data Packing and Security Engine | Data Packing and Security Engine | 1108 |
| Terahertz Protocol Stack | Terahertz Protocol Stack | |
| Terahertz Communication Interface drive | Terahertz Communication Interface drive | 1106 |
| Terahertz Transceiver | Terahertz Transceiver | |

1104

| Application interactive interface for user operation | | 1116 |
|---|---|---|
| Wireless Power Network (WPN) | | |
| Data Packing and Security Engine | Data packing and Security Engine | 1114 |
| Terahertz Protocol Stack | Terahertz Protocol Stack | |
| Terahertz Communication Interface drive | Terahertz Communication Interface drive | 1112 |
| Terahertz Transceiver | Terahertz Transceiver | |

FIG. 11

SYSTEMS, METHODS, APPARATUSES, AND DEVICES FOR FACILITATING WIRELESS ENERGY TRANSMISSIONS

TECHNICAL FIELD

Generally, the present disclosure relates to the field of equipment for production, distribution, or transformation of energy. More specifically, the present disclosure relates to systems, methods, apparatuses, and devices for facilitating wireless energy transmissions.

BACKGROUND

Radio-frequency (RF)-based wireless technology enables three different basic system functions, namely, wireless communication (data/voice), wireless sensing (parameter), and wireless powering transmission (energy). The first two well-known wireless applications are found today in numerous social and economic activities, which have been transforming our daily life. However, the terahertz wireless power transmission (WPT), which is unknown at least publicly, has not yet been developed and established as one of the fundamental driving forces for wireless powering (charging) of mobile devices.

Further, portable electronic devices such as smartphones, tablets, notebooks, and other electronic devices have become an everyday need in the way we communicate and interact with others. The frequent use of these devices needs a significant amount of power, which may easily deplete the batteries attached to these devices. Therefore, a user is frequently needed to plug in the device to a power source and recharge such devices. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supplies to be able to charge electronic devices. However, such activity may render electronic devices inoperable during charging.

Current solutions may include IoT low power sensors, and smartphones, tablets, and other electronic devices using rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. For example, harvesting (RF) energy typically utilizes directional antennas to target and deliver energy to a device and utilizes a directional pocket of energy and waveform operating in the 2.4/5.8 GHz radiofrequency range. In this case, the device still requires to be placed in a certain location, and orientation for a period of time in order to be charged. Assuming a single source power transmission of electromagnetic (EM) signal, a factor proportional to $1/r^2$ reduces an EM signal power over a distance r; in other words, it is attenuated proportionally to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat. In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving devices. In addition, in many use cases, the device is not stationary, which is an added difficulty.

In addition, in currently available wireless charging solutions, there is inadequate security associated with power transfer. In particular, there are no mechanisms in place to ensure that power transfer is provided only to authorized devices.

Further, existing wireless chargers are designed to charge specific electronic devices that are generally co-designed with corresponding wireless chargers. In other words, both the wireless transmitter and a wireless receiver are designed as a pair to be matched in terms of parameters of power transfer. Accordingly, the wireless transmitter of existing wireless chargers is not capable of supplying power to multiple electronic devices with varying parameters. Furthermore, the wireless receiver is required to be placed at a specified distance in order to provide efficient and/or timely charging. In other words, any deviation in the distance between the wireless transmitter and the wireless receiver may result in inefficiencies and/or insufficient transfer of power.

Additionally, in existing wireless charging networks and systems, there is no monitoring of the wireless power transfer process. In other words, a user is largely unaware of the operational status of the power transfer process. The only way that a user may realize that power transfer is taking place is by noticing a change in the level of a battery of a receiver device. Furthermore, this requires a user's presence near the wireless charger and/or receiver in order to monitor and ensure the proper transfer of power.

Finally, in existing wireless charging solutions, there is inadequate security and authentication associated with power transfer. In particular, there are no mechanisms in place to ensure that power transfer is provided only to authorized and authenticated devices.

Further, there is an increasing interest in blockchain technology and the Internet-of-Things (IoT) where small computing sensors and mobile devices are embedded in everyday objects and environments. However, providing power to such small computing sensors and mobile devices is a challenge, as these sensors and computing devices become smaller and more numerous. Directly plugging these devices to provide power is inconvenient and is difficult at large scale.

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs. For example, an LLN may be an Internet of Things (IoT) network in which "things," e.g., uniquely identifiable objects such as sensors and actuators, are interconnected over a computer network.

In IoT and similar networks, mobile nodes may register with different local networks as they move. For example, a person may carry a number of wearable sensors (e.g., heart rate monitor, blood glucose meter, etc.) that connect to different networks as the user travels (e.g., through a community, between different floors of a building, etc.). Each of these sensors and the various networks may have their registration and authentication mechanisms that can consume multiple resource cycles, depending on how fast the objects are moving.

Existing techniques for facilitating wireless energy transmissions are deficient with regard to several aspects. For instance, current technologies are specifically designed wirelessly transfer electromagnetic energy between receivers and transmitters at low frequencies. As a result, different technologies are needed that transfer electromagnetic energy between the receivers and the transmitters at higher frequencies. Furthermore, current technologies transfer electromagnetic energy between the receivers and the transmitters via radiation. As a result, different technologies are needed that transfer the electromagnetic energy between the receivers and the transmitters via conduction through the ionosphere.

Therefore, there is a need for systems, methods, apparatuses, and devices for facilitating wireless energy transmissions that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a system for facilitating wireless energy transmissions, in accordance with some embodiments. Accordingly, the system may include at least one ground station and at least one space station. Further, the at least one ground station may be positioned in at least one location on the earth. Further, the at least one ground station may include at least one transmitter device. Further, the at least one space station may be positioned in at least one orbit around the earth. Further, each of the at least one space station may include a primary receiver device and a primary transmitter device. Further, the primary receiver device may include a receiver transceiver. Further, the at least one transmitter device may be configured for transmitting energy wirelessly to the receiver transceiver. Further, the energy may include terahertz electromagnetic wave energy. Further, the receiver transceiver may be configured for receiving the energy wirelessly from the at least one transmitter device based on the transmitting of the energy wirelessly. Further, the receiver transceiver may include a receiver enclosure. Further, the receiver enclosure may include at least one metamaterial. Further, the receiver enclosure may be configured for converting the terahertz electromagnetic wave energy into electrical energy based on the receiving of the energy. Further, the receiver enclosure may include a receiver antenna configured for facilitating the receiving of the energy wirelessly. Further, the receiver antenna may include at least one superconducting material. Further, the primary transmitter device may be electrically coupled with the primary receiver device. Further, the primary transmitter device may be configured for transmitting the electrical energy wirelessly to at least one secondary receiver device based on the converting.

Further disclosed herein is a system for facilitating wireless energy transmissions, in accordance with some embodiments. Accordingly, the system may include at least one ground station and at least one space station.

Further, the at least one ground station may be positioned in at least one location on the earth. Further, the at least one ground station may include at least one transmitter device.

Further, the at least one space station may be positioned in at least one orbit around the earth. Further, each of the at least one space station may include a primary receiver device and a primary transmitter device. Further, the primary receiver device may include a receiver transceiver. Further, the at least one transmitter device may be configured for transmitting energy wirelessly to the receiver transceiver. Further, the energy may include terahertz electromagnetic wave energy. Further, the receiver transceiver may be configured for receiving the energy wirelessly from the at least one transmitter device based on the transmitting of the energy wirelessly. Further, the receiver transceiver may include a receiver enclosure. Further, the receiver enclosure may include at least one metamaterial. Further, the receiver enclosure may be configured for storing the terahertz electromagnetic wave energy based on the receiving of the energy. Further, the receiver enclosure may be configured for converting the terahertz electromagnetic wave energy into electrical energy based on the receiving of the energy. Further, the receiver enclosure may include a receiver antenna configured for facilitating the receiving of the energy wirelessly. Further, the receiver antenna may include at least one superconducting material. Further, the receiver transceiver may be configured for transmitting a registration request to the at least one transmitter device. Further, the registration request may include a unique receiver device identifier associated with the primary receiver device. Further, the primary receiver device may be configured for generating the at least one energy asset based on the converting. Further, the primary receiver device may be configured for accessing a second distributed block-chain associated with at least one transaction of the at least one energy asset based on the generating of the at least one energy asset. Further, the primary receiver device may be configured for creating at least one entry for the at least one transaction of the at least one energy asset in the second distributed block-chain based on the accessing of the second distributed block-chain. Further, the at least one transmitter device may be configured for analyzing the registration request. Further, the at least one transmitter device may be configured for accessing a distributed block-chain associated with wireless energy transfer based on the analyzing. Further, the at least one transmitter device may be configured for authenticating the primary receiver device based on the accessing of the distributed block-chain. Further, the transmitting of the energy wirelessly to the receiver transceiver may be based on the authenticating. Further, the primary transmitter device may be electrically coupled with the primary receiver device. Further, the primary transmitter device may be configured for transmitting the electrical energy wirelessly to at least one secondary receiver device based on the converting and the creating.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 9 illustrates a system for facilitating wireless transfer of power configured to adapt wireless transmission of power from a transmitter device to a plurality of receiver devices, in accordance with some embodiments.

FIG. 10 illustrates a system for facilitating wireless transfer of power configured to transmit an alert to a user device regarding the wireless transmission of power from a transmitter device to a receiver device, in accordance with some embodiments.

FIG. 11 illustrates wireless power transfer protocol stacks associated with the transmitter device and the receiver device, in accordance with some embodiments.

DETAILED DESCRIPTION

Figure 1:
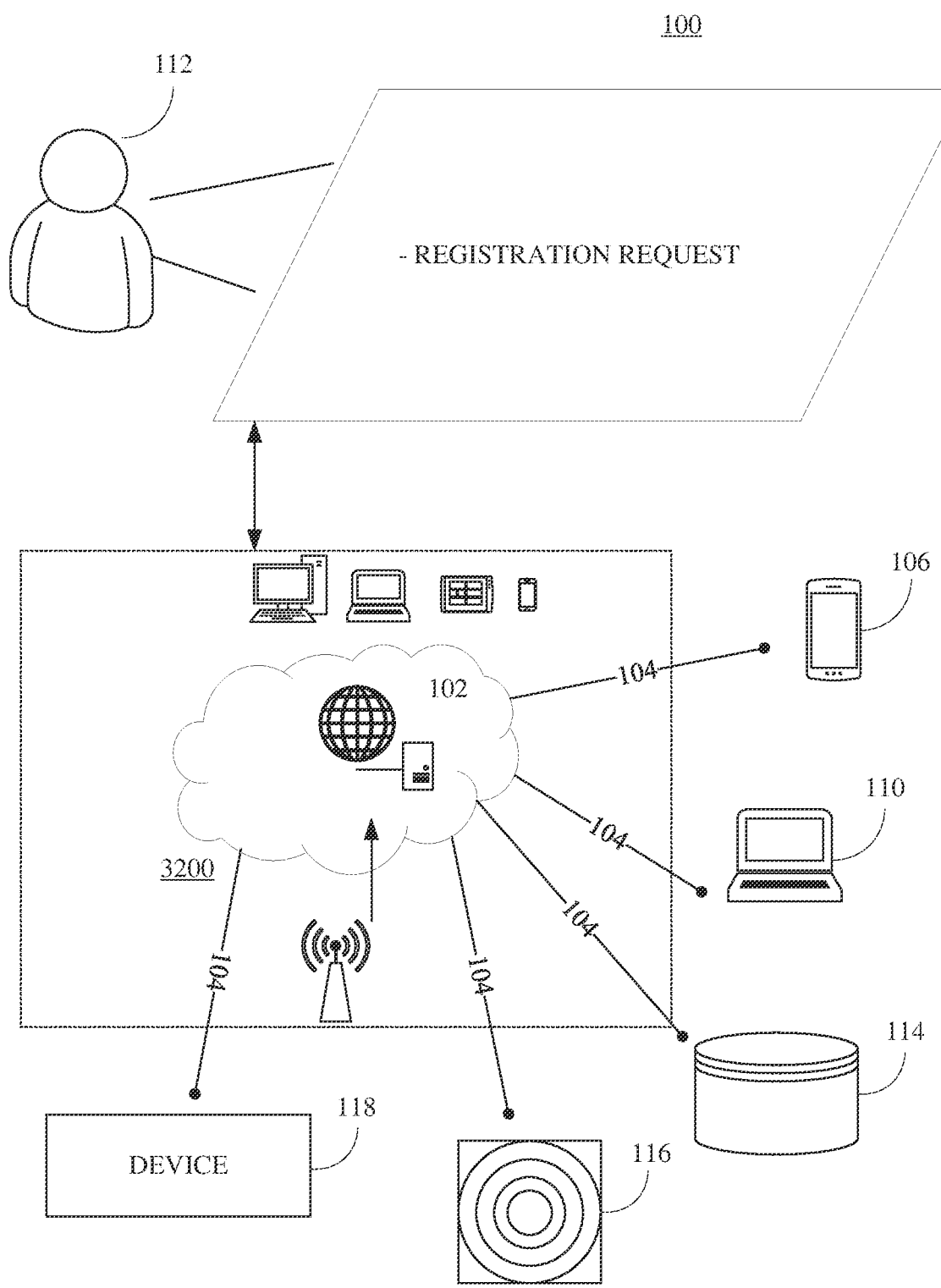
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a receiver device for facilitating wireless energy reception, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device includes a processing unit. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the communication device may include a transceiver (communication interface). Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part.

Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems, methods, apparatuses, and devices for facilitating wireless energy transmissions.

Further, the present disclosure describes a receiver device for facilitating transaction of energy wirelessly received by the receiver device. In particular, the present disclosure provides terahertz wireless power transmission for (charging) receiver devices utilizing a terahertz power transmission wave. It should be understood that applications and mechanisms of the disclosed techniques are not limited to the foregoing examples. Accordingly, all improvements and transformations shall fall within the protection scope of the present disclosure.

Further, the present disclosure describes methods and systems to facilitate blockchain-based wireless power transmission transfer that delivers power to devices such as, for example, IoT low-power sensors and mobile devices, smartphones, notebook computers, electric cars, unmanned aerial vehicles, IoT devices, medical devices, wearables, kiosks, and low and high-power sensors, etc.

Further, the present disclosure describes methods and systems to facilitate blockchain-based wireless power transfer that delivers power to devices such as, superconducting receiver devices that's able to amplify terahertz frequencies in the electromagnetic spectrum and stores electricity on a supercapacitor. The optical transistor in the receiver allows the receiver to harvest energy from the elusive terahertz gap bandwidth and create the next generation superconductivity whereby a charge moves through a material with minimum resistance.

Terahertz wave—also known as sub-millimeter radiation, terahertz radiation, tremendously high frequency, T-rays, T-waves, T-light, T-lux, or THz—consists of electromagnetic waves within the ITU-designated band of frequencies from 0.3 to 3 terahertz (THz; 1 THz=$10^{12}$ Hz).

Accordingly, in some embodiments, Terahertz wireless power based methods and systems for power transmission are provided. Terahertz wireless power-based methods and systems for power transmission may implement rapid transmission of power (charging) between many receiver devices. Additionally, the methods and systems may implement a novel Artificial Intelligence (AI) interactive algorithm model in the terahertz transmitter device and/or receiver devices. Accordingly, power transmission and data interaction may be performed quickly, stably, and securely.

The methods and systems may implement optimization on a physical structure of a Wireless Power Network (WPN) product based on wireless power transmission, thus may allow completion of transmission and exchange of power and in a scenario in which a power transmission medium is highly secured. The methods and systems may provide bulk transmission of power, which may be managed through the WPN which employs the use of artificial intelligence and deep learning that is scalable and can be accessed everywhere.

A terahertz wireless power-based method for power transmission may include placing a terahertz receiver device within a terahertz wireless signal search range of a terahertz transmitter device. Further, the terahertz transmitter device and the terahertz receiver device may be configured to mutually detect whether a function of transmitting and receiving power through a terahertz wireless signal is available in each other. If both the terahertz transmitter device and the terahertz receiver device-detect mutually availability of the function of transmitting and receiving power through a terahertz wireless signal, connection and a unique match (i.e. pairing) may be performed between the terahertz transmitter device and the terahertz receiver device. When a connection and paring are successful, the terahertz transmitter device may send power to the terahertz receiver device through a terahertz wireless signal. Further, in some embodiments, the initiation of power transfer may be based on a voice user interface instruction (e.g. a voice command provided a user).

In another embodiment, a terahertz wireless power-based method for power transmission may include placing a portable terahertz transmitter device within a terahertz wireless signal search range of a terahertz receiver device and performing connection and unique match between the terahertz transmitter and terahertz receiver device. When connection and paring are successful, the terahertz transmitter device may send power and data to the terahertz receiver device.

In a further embodiment, a terahertz wireless power-based system for power transmission may include a terahertz transmitter device connected and paired to many other terahertz receiver devices, and sending power to the many other terahertz receiver devices via a terahertz wireless signal according to a user instruction. The system located on the wireless power network (WPN) may further include many other terahertz receiver devices for receiving the power sent by the terahertz transmitter device via the terahertz wireless power signal.

Terahertz wireless power-based methods and systems for power transmission are provided. To make the objectives, technical solutions, and advantages clear, the methods and systems are described in detail with reference to the accompanying drawings. It should be understood that the specific embodiments described herein are for illustrative purposes and are not intended to limit the claimed invention in any way.

Terahertz wireless power-based methods and systems for power transmission may include a terahertz transmitter device and a terahertz receiver device placed within an effective distance of each other and, by means of connection and unique match, the terahertz transmitter device receives communications data from the terahertz receiver device and after receiving the communication data, the terahertz transmitter device can transmit power to the terahertz receiver device via a terahertz wireless power signal.

According to some embodiments, the present disclosure provides a terahertz wireless power-based method for power transmission. Accordingly, when power transmission is required, the method may include placing a terahertz receiver device within a terahertz wireless signal search range of a terahertz transmitter device and performing connection and unique match between the terahertz transmitter device and the terahertz receiver device.

A terahertz transmitter device and a terahertz receiver device together may support terahertz wireless power transmission. A terahertz transmitter device and a terahertz receiver device may be respectively referred to as a first node and a second node. High-speed power and data transmission may be performed between the two nodes. Power transmission is unilateral and any data communication may be bilateral. A terahertz transmitter device may transmit communication data to a terahertz receiver device. A terahertz receiver device may transmit communication data to a terahertz transmitter device. Data is structured providing a registration process that identities the type of device, calculates the distance from the transmitter to the receiver, and detects how much of a battery charge the mobile receiver device needs.

A terahertz receiver device can consist of Internet of Things (IoT) devices, mobile electronic devices, Smartphones, Wearables, Tablets, Gaming consoles and controllers, e-book readers, Remote controls, Sensors (in automobiles or such as thermostats), autonomous vehicles, Toys Rechargeable batteries, Rechargeable lights, Automotive accessories, and Medical devices, etc. A terahertz receiver device may receive power (charge) from a terahertz transmitter device. A terahertz transmitter device is located the wireless power network (WPN) in the cloud may be connected to a graphics process (GPU) machine-based bulk storage database in which bulk data may be stored. A bulk storage database may include multiple overlying business functions utilizing Artificial Intelligence (AI), Deep Learning, and Computer Learning, thus a relationship between the terahertz transmitter device connected to the GPU machine-based storage database and a terahertz receiver device may be a master-slave relationship between a WPN and a client terahertz receiver. The terahertz transmitter device connected to a bulk storage database may be a node that is equivalent to other storage devices, and all the data and power transmission between any two nodes may be a point-to-point coordinating relationship. Therefore, a terahertz transmitter device may transmit power to a terahertz receiver device and the terahertz receiver device may also transmit data stored in the WPN therein connected to the terahertz transmitter device.

A terahertz receiver device may be placed within a certain distance of one another, wherein the distance may be an effective distance of terahertz wireless data communications and power transmission. A coverage area of a terahertz wireless signal may be limited, thus terahertz devices may be placed within an effective distance such that connection and unique match, power transmission, and the like may be performed.

First and terahertz receiver devices may validate each other so as to guarantee the security of the power transmission. When a connection and unique match between a first transmitter and terahertz receiver device is not successful, a connection and unique match error may be prompted. Alternatively, or additionally, a dialog may be presented to a user. Subsequent to a connection and unique match failure, a user may select whether to perform connection and unique match again. A prompting body may be either the first transmitter or the terahertz receiver device. When a connection and unique match between first and terahertz receiver devices are successful, a power transmission process may be performed.

When connection and paring are successful, power may be sent by a terahertz transmitter device to a terahertz receiver device using a terahertz wireless signal according to a user instruction. When connection and paring between the terahertz transmitter device and the terahertz receiver device are successful, a connection may be established between the terahertz transmitter device and the terahertz receiver device, and power transmission may be performed according to a user instruction. A power transmission may be performed using a terahertz wireless signal. A terahertz (THz) wave may be a terahertz ray. A terahertz ray may be an electromagnetic wave having an electromagnetism frequency between 0.1 THz and 10 THz (wavelength is between 3 mm and 30 um), and a wave range between microwave and far-infrared rays. Based on the characteristics of larger transmission capacity and better directivity of a terahertz (THz) wireless communications, a transmission power rate of a terahertz wave may reach 10 Gbps. Therefore, a terahertz wave may include transmission of power and structured bulk data. Terahertz wireless communications may implement power transmission quickly, securely, and stably.

Point-to-point power transmission may be implemented. A terahertz transmission device may transmit power to a plurality of terahertz transmission transmitter devices at the same time, thus, improving power transmission efficiency.

According to some embodiments, the present disclosure provides a Wireless Power Network (WPN) analogous to a Wi-Fi network for data connectivity. Accordingly, multiple receiver devices (E.g. smartphone, tablet, laptop computer, light bulbs, fans, etc.) may be configured to receive wireless power transfer from a transmitter device of the WPN. Accordingly, the multiple receiver devices may be configured to detect the availability of the transmitter device for providing wireless power transfer. Further, the multiple receiver devices may also be configured to exchange data with the transmitter device over one or more communication channels (e.g. Bluetooth, NFC, Wi-Fi, cellular network, etc.). Based on the exchange of data, a receiver device may establish itself as an authorized device for receiving wireless power transfer from the transmitter device. For example, a receiver device may be paired with the transmitter device by use of a unique code associated with the receiver device. Accordingly, the transmitter device may acknowledge a power transfer request from the receiver device based on the presence of the unique code within the power transfer request.

According to some aspects, a terahertz wireless power based method and system (Wireless Power Network) for power transmission is disclosed. The terahertz wireless power based method and system comprising use of wireless power transmission application and system (WPN) for the (charging) of a terahertz transmitter and terahertz receiver devices utilizing a terahertz power transmission wave.

According to further aspects, a terahertz wireless power based method for power transmission, comprising placing a plurality of terahertz receiver devices within a terahertz wireless signal search range of a terahertz transmitter device, wherein the first and the plurality of terahertz receiver devices automatically and mutually detect whether an opposite side has a function of transmitting power through a terahertz wireless signal in response to the plurality of terahertz receiver devices being placed within the terahertz wireless signal search range of the terahertz transmitter device, and wherein the first and the plurality of terahertz receiver devices can consist of Internet of Things (IoT), mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories, and Medical devices, etc.

Further, if both the terahertz transmitter device and the plurality of terahertz receiver devices detect mutually that the opposite side has the function of transmitting power through the terahertz wireless signal, automatically connecting and unique match are performed between the first and the plurality of terahertz receiver devices without user interaction.

Further, when the connection and unique match are successful, transmitting, by the terahertz transmitter device, the power to the plurality of terahertz receiver devices at the same time by point-to-point transmission using a terahertz wireless power signal, and according to a user interaction continuing, pausing, interrupting or retrying the power transmitting. The terahertz transmitter device and the plurality of terahertz receiver devices are in a master and slave relationship and the terahertz transmitter device is the master.

According to further aspects, the terahertz wireless power-based method for power transmission may include, when the connection and unique match are successful, selecting, by the terahertz transmitter device, data according to a user instruction. This includes enabling, by the terahertz transmitter device, a power transmission process according to the voice user interface instruction. Further, it includes determining, by the terahertz transmitter device, whether a state of a power/data transmission process is normal.

Further, if the state of the power and an AI-enabled data transmission process is normal, controlling, by the terahertz transmitter device, the power/data transmission process according to the voice user interface instruction; and if the state of the power/data transmission process is abnormal, prompting the user of a power/data transmission error.

According to further aspects, the terahertz wireless power-based method for power transmission may include, if the state of the power transmission process is normal, the terahertz transmitter device prompting the user of the state and a parameter of the power transmission process.

According to further aspects, the terahertz wireless power-based method for power transmission may include, when the connection and unique match are performed between the first and the plurality of terahertz receiver devices, performing unique match through exchanging unique match codes; when unique match codes of the first and the plurality of terahertz receiver devices are identical, the connection and unique match are successful.

According to further aspects, the terahertz transmitter device comprising at least one of can consist of Internet of Things (IoT) receiver devices, mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories, and Medical devices, etc.

According to some aspects, a terahertz wireless power-based method for power transmission is disclosed. The method comprising placing a plurality of terahertz receiver devices within a terahertz wireless signal search range of a terahertz transmitter device, and performing a connection and unique match between the first and the plurality of terahertz receiver devices.

Further, the method may include, when the connection and unique match are successful, automatically sending, by the terahertz transmitter device, structured data communication to the plurality of terahertz receiver devices at the same time delivering a point-to-point power transmission, using a terahertz wireless signal, in response to the plurality of terahertz receiver devices being placed within the terahertz wireless signal search range of the terahertz transmitter device.

Further, the structured data communication to be automatically sent is determined by a user prior to the connection and unique match of the first and the plurality of terahertz receiver devices.

Further, the method may include presenting to a user invalidity of the plurality of terahertz receiver devices based on an absence of a function therein for transmitting data through a terahertz wireless signal.

According to further aspects, the terahertz wireless power-based method for power transmission may include performing connection and unique match between the first and the plurality of terahertz receiver devices. Further, the method may include detecting, by the terahertz transmitter device, whether the plurality of terahertz receiver devices has a function for transmitting power using a terahertz wireless signal.

Further, the method may include, if the plurality of terahertz receiver devices has the function for transmitting data using a terahertz wireless signal, performing connection and unique match between the first and the plurality of terahertz receiver devices respectively by accepting an operation instruction from the user; and if the plurality of terahertz receiver devices does not have the function for transmitting data using a terahertz wireless signal, prompting the user of an error.

According to further aspects, the terahertz wireless power-based method for power transmission may include, when the connection and unique match are successful, selecting, by the terahertz transmitter device, power according to a user instruction.

Further, the method may include enabling, by the terahertz transmitter device, a power, and data transmission process according to the user instruction.

Further, the method may include determining, by the terahertz transmitter device, whether a state of the data transmission process is normal; and if the state of the power transmission process is normal, controlling, by the terahertz transmitter device, the data transmission process according to the user instruction; and if the state of the power transmission process is abnormal, prompting the user of a power transmission error.

According to further aspects, the terahertz wireless power-based method for power transmission may include, if the state of the power transmission process is normal, the terahertz transmitter device prompting the user of the state and a parameter of the power transmission process.

According to further aspects, the terahertz wireless power-based method for power transmission may include, when the connection and unique match are performed between the first and the plurality of terahertz receiver devices, performing unique match through exchanging registration unique match codes; when registration unique match codes of the first and the plurality of terahertz receiver devices are identical, the connection and unique match are successful. The registration process will allow devices to be serviced on the network.

According to further aspects, the plurality of terahertz receiver devices includes at least one of: can consist of Internet of Things (IoT) receiver devices, mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories, and Medical devices, etc.

According to some aspects, a terahertz wireless power-based system for power transmission. The terahertz wireless power-based system includes a terahertz transmitter device connected and uniquely matched with a plurality of terahertz receiver devices, the terahertz transmitter device sending power to the plurality of terahertz receiver devices at a same time by point-to-point power transmission using a terahertz wireless signal according to a user instruction, wherein the wireless power transmission happens quickly, securely, safely and stably in response to the plurality of terahertz receiver devices being placed within the terahertz wireless signal search range of the terahertz transmitter device.

Further, both the first and the plurality of terahertz receiver devices are provided with three AI-enabled function: a first function, a second function, and a third function.

Further, the first function is a hardware detection layer which comprises a terahertz transceiver and the WPN. The terahertz transceiver receiving and sending the data and power using a terahertz wireless power transmission wave, and the WPN is used for storing the receiver data.

Further, the second function is an enable AI software that manages via WPN that manages power and data transmission, and preferentially selects power and receiver data.

Further, the third function is interactive speech understanding voice commands where the WPN will communicate with the receiver device thru a personal digital assistant. If there is an error and the user will be prompted user through voice commands how to fix the invalidation of the plurality of the terahertz receiver to issue maximum efficiency.

According to further aspects, the terahertz wireless power-based system for power transmission and the second function comprises a terahertz cloud-based communication interface with WPN, a terahertz protocol stack, a power-packing, and a security engine and cloud-based network AI-enabled system and a storage drive. Further, the disclosed system may include mechanisms for terahertz transmitters and receivers to report health and receive commands is managed by the WPN. Further, the disclosed system may include an interface for receiver device manufacturers to identify the wireless power chip unique match at the OS level. The terahertz communication interface drive controls a terahertz transceiver to receive data and send power transmission.

Further, the disclosed system may include the terahertz transmitter communication with the (WPN) protocol stack performs protocol layer data processing on data transmitted by the data packing and security engine from the terahertz receiver.

Further, the disclosed system may include the data packing and security engine performs corresponding processing on data transmitted by the WPN file system and the terahertz communication protocol stack.

Further, the disclosed system may include the system (WPN) and the storage drive call in the receiver data in the storage medium on the WPN.

According to further aspects, the terahertz wireless power-based system for power transmission may include the power transmission system and the storage drive store packed and encrypted data in a storage medium on the WPN.

According to further aspects, the terahertz wireless power-based system for power transmission may include the WPN controlling the power transmission process by establishing a registration process that allows mobile devices to be charged and serviced on the WPN. The mechanisms for the WPN allow the transmitter the ability to intelligently locate the mobile receiver devices, identify the type of device, calculate the distance from the transmitter to the receiver, and detect how much of a battery charge the mobile receiver device needs. With this information, the WPN further provides a state and a parameter of the power transmission process.

According to further aspects, the terahertz wireless power-based system for power transmission may include the terahertz transmitter device and the plurality of terahertz receiver devices includes at least one of: can consist of Internet of Things (IoT) receiver devices, mobile electronic devices, smartphones, autonomous vehicles, wearables, tablets, gaming consoles and controllers, e-book readers, remote controls, sensors (in automobiles or such as thermostats) toys rechargeable batteries, rechargeable lights, automotive accessories, and medical devices, etc.;

According to some embodiments, a method and system to facilitate blockchain-based wireless power transfer that delivers power to devices such as, for example, IoT low-power sensors and mobile devices are disclosed.

According to some embodiments, a device in a network receives a network registration and power transmission request from a particular node. The network registration request comprises information about the particular node. The device causes performance of authentication, identity, and validation of the information about the particular node via comparison of the information about the particular node to a distributed blockchain that includes information regarding the particular node and one or more other nodes. The device causes an update to the blockchain-based information about the particular node and the validation of the information about the particular node. The device uses the updated blockchain to control the behavior of the particular node and any other related node.

According to some embodiments, blockchain-based methods and systems for wireless power transmissions are provided.

Further, a computer network is a geographically distributed collection of nodes interconnected by communication links and segments for transporting data between end nodes, such as mobile devices, personal computers, and workstations, or other devices, such as sensors, etc. Many types of networks are available, ranging from Unstructured or Omni-directional wireless mesh networks, Structured wireless mesh networks, peer to peer (P2P), local area networks (LANs) to wide area networks (WANs). In an unstructured wireless mesh network, each mesh node typically uses an Omni-directional antenna and may communicate with all the other mesh nodes that are within the transmission range. Structured wireless mesh networks are planned networks typically implemented using multiple radios at each node location and multiple directional antennas. Peer-to-peer (P2P) computing or networking is a distributed application architecture that partitions tasks or workloads between peers. Peers are equally privileged, equipotent participants in the application. They are said to form a peer-to-peer network of nodes. LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology. A Terahertz power transmitter/router apparatus may include Terahertz Low Earth Orbiting Satellite power transmitter/router, Terahertz Cell Tower power transmitter/router, and Terahertz Wi-Fi power transmitter/router and the use of microwaves at the 2,450 MHz spectrum.

Further, the radio-frequency (RF)-based wireless technology consists of three different basic system functions, namely, wireless communication (data/voice), wireless sensing (parameter), and wireless powering transmission (energy). The first two well-known wireless applications have been found today in nearly all social and economic activities, which have been transforming our daily life. However, the terahertz wireless power transmission (WPT), which is unknown at least publicly, has not yet been developed and established as one of the fundamental driving forces for wireless powering (charging) of IoT and mobile devices.

Terahertz wave—also known as sub-millimeter radiation, terahertz radiation, tremendously high frequency, T-rays, T-waves, T-light, T-lux, or THz—consists of electromagnetic waves within the ITU-designated band of frequencies from 0.3 to 3 terahertz (THz; 1 THz=$10^{12}$ Hz). It fully covers the global-satellite-positioning band (1.58 GHz and 1.22 GHz), the cellular-communications fourth-generation, (4G) fifth-generation (5G), (1.7 GHz and 1.9 GHz sixth-generation) (6G), seventh-generation long-term-evolution band (95 gigahertz (GHz) to 3 terahertz (THz) range and 21.2 GHz of spectrum for testing of unlicensed devices and also the use of microwaves at the 2,450 MHz spectrum.

Further, blockchain-based identity and transaction platforms—Information (e.g., a photo) for a person can be encrypted and stored in a blockchain as part of enrolling the person as a user in a blockchain-based identity and transaction platform. Trust relationships can be formed between the user and other users, and records of the trust relationships can be stored in the blockchain. Transactions between the user and other users with whom the user has formed a trust relationship can be authorized. Records of the transactions can also be stored in the blockchain. Authorization can involve, for example, a multi-stage verification process that accesses information stored on the blockchain. The transactions and identity information, along with other information, can contribute to an economic identity of the person. Storing an economic identity (and the underlying information that forms the economic identity of the person) in the blockchain results in a secure platform accessible to people regardless of their economic or geographic circumstances.

The trend of decentralization represents a massive wave of innovation that is reshaping society. Decentralized application platforms (Smart Contracts) are "self-executing" and "self-enforceable" transactions and do not require information to pass through a single point. Instead, many points connect, known as a peer-to-peer (P2P) network. Smart contracts remove the need for a "trusted third party" by providing a transparent, auditable, enforceable, and affordable means to conduct a variety of transactions over the blockchain. Currently, new kinds of Blockchain transactions and decentralized applications are emerging, along with new social norms and expectations. Crypto-currencies and smart contracts together act as the backbone of this new world. On the one hand, we are seeing the evolution of money, where the process of creating, transacting, and storing value has fundamentally changed with the invention of cryptocurrencies. On the other hand, we have Smart Contracts that introduce an added layer of facilitation, where agreements can be structured on the Blockchain to be both self-executing, and self-enforcing, providing a wide range of benefits and applications. Further, utility tokens, also called user tokens or application coins, represent future access to a company's product or service.

According to some embodiments, a disclosed method comprises receiving on a network, a network registration from a particular terahertz receiver node, wherein the network registration request comprises of a blockchain-based method on authentication, identity, and verification for the initiating of wireless power transmission.

According to further embodiments, the information about a particular terahertz receiver node comprises of one or more of a node type, a group identifier, a unique receiver node identifier, or an indication of the network to which the node requests registrations.

According to further embodiments, the update to the blockchain comprises a trust level for a particular terahertz receiver node based on the authentication, identity, and validation of the particular receiver node.

According to further embodiments, the comparison of the authentication information about the particular node to the blockchain comprises a comparison between the information about the particular node to information regarding the node in the blockchain set by the manufacturer of the node.

According to further embodiments, using the updated blockchain to control the behavior of the particular terahertz receiver nodes and the one or more nodes for the initiating of wireless power transmission.

According to further embodiments, the request comprises a public encryption key, the method further comprising: using by a device the public encryption key to authenticate the request by analyzing digitally signed information regarding the particular one of the other nodes in the updated blockchain.

According to further embodiments, the method includes determining, by the device, a location profile of the particular node; and causing, by the device, the updated blockchain to include the location profile of the particular node.

According to further embodiments, the method includes using, by the device, the updated blockchain to control the behavior of the particular node and the one or more other nodes comprises: determining, by the device, a profile of the particular node; and comparing, by the device, the determined location, identity of the type of device, calculating the distance from the power transmitter to the receiver and detect how much of a battery charge the mobile receiver device needs to initiating of wireless power transmission.

According to further embodiments, the device is a terahertz receiver/harvester in the network According to some embodiments, a terahertz power transmitter/router apparatus is disclosed. The terahertz power transmitter/router apparatus includes one or more network interfaces that communicate globally on a cloud network. Further, the terahertz power transmitter/router apparatus includes multiple systems on a chip GPU processor coupled to the network interfaces and configured to execute one or more power transmission, and a memory configured to store an AI enable process executable by the GPU processor, the process when executed operable to receive a network registration request from a particular node, the network registration request comprises information about the particular node; cause performance of a validation of the information about the particular node via comparison of the information about the particular node to a distributed blockchain that includes information regarding the particular node and one or more other nodes, update to the blockchain-based on the information about the particular node and the validation of the information about the particular node and use the updated blockchain to control the behavior of the particular node and the one or more other nodes.

According to further embodiments, the information about the particular node comprises one or more of: a node type, a group identifier, a unique node identifier, or an indication of the network to which the node requests registration.

According to further embodiments, the update to the blockchain comprises a trust level for the particular node based on the validation of the information about the particular node.

According to further embodiments, the comparison of the information about the particular node to the blockchain comprises a comparison between the information about the particular node to information regarding the node in the blockchain set by a manufacturer of the node.

According to further embodiments, the apparatus uses the updated blockchain to control the behavior of the particular node and the one or more other nodes by receiving a request from a particular one of the other nodes; and processing the request based in part on a trust level in the updated blockchain that is associated with the particular one of the other nodes.

According to further embodiments, the request comprises a public encryption key, and wherein the process, when executed, is further operable to use the public encryption key to authenticate the power transmission request by analyzing digitally voice and biometric information regarding the particular one of the other nodes in the updated blockchain.

According to further embodiments, the process, when executed, is further operable to determine a location profile of the particular node; and cause the updated blockchain to include the location profile of the particular node According to further embodiments, the apparatus uses the updated blockchain. A layer of Interaction to control the behavior of the particular node and the one or more other nodes by determining, by the device, a location profile of the particular node; and comparing, by the device, the determined location identifies the type of device, calculate the distance from the transmitter to the receiver and detect how much of a battery charge the mobile receiver device needs to initiating of wireless power transmission.

According to further embodiments, the apparatus is a terahertz power transmitter/router.

According to some embodiments, an electronic device case (such as a smartphone case) may include the disclosed receiver device. The electronic device case may then interface with an electronic device. Then, the electronic device case may receive wireless power and then provide power to the electronic device. The electronic device case may also include a battery. In a further embodiment, at least one component of one or more of the electronic device case, receiver device, the battery may be made of super-carbon (graphene). This may help in enhanced connectivity, enhanced conductivity, and enhanced efficiency.

The disclosed embodiments are related to all blockchain-based applications and mechanism for far-field power delivery to Internet of Things (IoT) devices, mobile electronic devices, Smartphones, Wearables, Tablets, Gaming consoles and controllers, e-book readers, Remote controls, Sensors (in automobiles or such as thermostats), autonomous vehicles, Toys Rechargeable batteries, Rechargeable lights, Automotive accessories, and Medical devices, etc.

Further, in some embodiments, the present disclosure may include a method comprises receiving on a network, a network registration from a particular terahertz receiver node, wherein the network registration request comprises of a blockchain-based method on authentication, identity, and verification for the initiating of wireless power transmission.

Further, in some embodiments, the information about a particular terahertz receiver node comprises of one or more of a node type, a group identifier, a unique receiver node identifier, or an indication of the network to which the node requests registrations.

Further, in some embodiments, the update to the blockchain comprises a trust level for a particular terahertz receiver node based on the authentication, identity, and validation about the particular receiver node. Further, in some embodiments, the comparison of the authentication information about the particular node to the blockchain comprises a comparison between the information about the particular node to information regarding the node in the blockchain set by the manufacturer of the node.

Using the updated blockchain to control the behavior of the particular terahertz receiver nodes and the one or more nodes for the initiating of wireless power transmission. Further, in some embodiments, the request comprises a public encryption key, the method further comprising: using by a device the public encryption key to authenticate the request by analyzing digitally signed information regarding the particular one of the other nodes in the updated blockchain.

Further, in some embodiments, the method comprising: determining, by the device, a location profile of the particular node; and causing, by the device, the updated blockchain to include the location profile of the particular node.

Further, in some embodiments, using, by the device, the updated blockchain to control the behavior of the particular node and the one or more other nodes comprises: determining, by the device, a profile of the particular node; and comparing, by the device, the determined location, identity of the type of device, calculating the distance from the power transmitter to the receiver and detect how much of a battery charge the mobile receiver device needs to initiating of wireless power transmission.

Further, in some embodiments, the device is a terahertz receiver/harvester in the network Further, in some embodiments, a terahertz power transmitter/router apparatus, comprising: one or more network interfaces that communicates globally on a cloud network; a multiple system-on-chip GPU processors coupled to the network interfaces and configured to execute one or more power transmission, and a memory configured to store an AI enable process executable by the GPU processor, the process when executed operable to receive a network registration request from a particular node, wherein the network registration request comprises information about the particular node; cause performance of a validation of the information about the particular node via comparison of the information about the particular node to a distributed blockchain that includes information regarding the particular node and one or more other nodes; cause an update to the blockchain-based on the information about the particular node and the validation of the information about the particular node; and use the updated blockchain to control behavior of the particular node and the one or more other nodes.

Further, in some embodiments, the information about the particular node comprises one or more of: a node type, a group identifier, a unique node identifier, or an indication of the network to which the node requests registration.

Further, in some embodiments, the update to the blockchain comprises a trust level for the particular node based on the validation of the information about the particular node.

Further, in some embodiments, the comparison of the information about the particular node to the blockchain comprises a comparison between the information about the particular node to information regarding the node in the blockchain set by a manufacturer of the node.

Further, in some embodiments, the apparatus uses the updated blockchain to control the behavior of the particular node and the one or more other nodes by: receiving a request from a particular one of the other nodes; and processing the request based in part on a trust level in the updated blockchain that is associated with the particular one of the other nodes.

Further, in some embodiments, the request comprises a public encryption key, and wherein the process when executed is further operable to: use the public encryption key to authenticate the power transmission request by analyzing digitally voice and biometric information regarding the particular one of the other nodes in the updated blockchain.

Further, in some embodiments, the process when executed is further operable to: determine a location profile of the particular node; and cause the updated blockchain to include the location profile of the particular node Further, in some embodiments, the apparatus uses the updated blockchain. Layer Of Interaction to control the behavior of the particular node and the one or more other nodes by: determining, by the device, a location profile of the particular node; and comparing, by the device, the determined location identifies the type of device, calculate the distance from the transmitter to the receiver and detect how much of a battery charge the mobile receiver device needs to initiating of wireless power transmission.

Further, in some embodiments, the apparatus is a terahertz power transmitter/router Voice Life Inc. is laying aspect to all blockchain-based applications and mechanism for far-field power delivery to the internet of Things (IoT) devices, mobile electronic devices, Smartphones, Wearables, Tablets, Gaming consoles and controllers, ebook readers, Remote controls, Sensors (in automobiles or such as thermostats), autonomous vehicles, Toys Rechargeable batteries, Rechargeable lights, Automotive accessories, and Medical devices, etc.

Further, the disclosed receiver device may include the utilization of the high power and high-frequency terahertz domain (or terahertz domain). Further, the disclosed receiver device may include a transceiver. Further, the disclosed receiver device may utilize blockchain. Further, the disclosed receiver device may be configured for using terahertz high power and high frequency. Further, the disclosed receiver device may be configured for receiving, transferring, and storing wireless energy from the terahertz domain.

In further embodiments, the disclosed receiver device may include a housing surface. Further, the housing surface may include ultra-thin two-dimensional metamaterial layers that allow the propagation and storage of electromagnetic energy and the control of electromagnetic wireless power transmission in the desired direction.

In some embodiments, the housing surface may include a wideband, high-efficiency, ultrathin multi-mode metasurface transceiver antenna that comprises at least one superconducting material.

In some embodiments, the terahertz domain application may include a plasma-based "far-field wireless power charging system" that may harvest energy from high power, high-frequency terahertz waves by combining this with ultrathin multi-mode metasurface transceiver antennas.

Further, in some embodiments, the housing enclosure may include a discharge control circuit configured to control discharging of the wireless power transfer to another type of battery. Further, the discharge control circuit may include a switch; and a load portion electrically connected to the system through the discharge control circuit, wherein the antenna diode is connected to the enclosure.

Further, in some embodiments, the housing enclosure may include a two-dimensional MoS2-enabled flexible rectenna rectifier and a wireless power transmission charge control circuit. Further, the enclosure stored energy may be discharged by user voice command turning on the switch in response to a request for voltage from another type of device battery and supplying wireless power transmission of electrical energy stored in device battery to the load portion through the discharge control circuit, Further, charging of the battery may be performed cumulatively. Further, discharging of the battery is performed in pulse, and wherein the battery is configured to discharge at least 80 percent of the electrical power stored in the enclosure.

Further, the disclosed receiver device may include a far-field wireless power charging system. Further, the disclosed receiver device may include a terahertz transceiver circuitry system on a chip (SOC) design. Further, implementing such terahertz wave-matter interactions at chip-scale not only significantly reduces the energy consumption and form factor of the system, but also enables EM-wireless power transmission wave manipulation with much greater precision and flexibility. Further, the disclosed receiver device on-chip prototypes operate at terahertz and above, to advance the next-generation far-field wireless power charging system and network infrastructures.

Further, in some embodiments, the terahertz transceiver circuitry is configured to identify and classify streams of wireless power transmission signals for facilitating wireless energy reception, distribution, and storing of wireless energy from at least one low earth orbit satellite on a mesh node network constellation.

Further, in some embodiments, the terahertz transceiver circuitry is configured to accelerate electromagnetic THz wave signals converting AC electromagnetic THz waves into DC electricity and storing the energy.

Further, in some embodiments, the terahertz transceiver circuitry is configured with a wireless power transmission algorithm to accelerating artificial intelligence (AI) computational deep learning of the different types of transmitters and Wi-Fi Hot Spots.

Further, in some embodiments, the terahertz transceiver circuitry is configured to locate and communicate with a low earth orbit satellite mesh node network constellation on a terahertz (THz) band associated with an inter-satellite link (ISL) for the facilitating wireless energy reception, distribution, and storing of wireless energy.

Further, in some embodiments, the terahertz transceiver circuitry is configured to locate and communicate with a 7G, 6G, and 5G cell mesh node network constellation on a terahertz (THz) band associated with an inter-satellite link (ISL) for the facilitating wireless energy reception, distribution and storing of wireless energy.

Further, the constellation of highly advanced "microrouters" in low earth orbit satellites may cover every square inch of the planet with uninterrupted, high-speed internet and wireless power from space. Further, a blockchain network associated with the disclosed receiver device may be expanded into space.

Further, in some embodiments, a blockchain "smart contract" model associated with the disclosed receiver device may include a wireless power transfer protocol where billions of software neurons and trillions of connections are trained in parallel with multi-stage authentication, verification, payment process mechanisms, and information may be stored on the blockchain.

Further, in some embodiments, the wireless power transfer protocol (or blockchain "smart contract" protocol) may include deep neural network (DNN) algorithms. Further, the wireless power transfer protocol may operate with 99 percent accuracy on a single neural network framework that locates, detects, classify and pinpoint the different types of mobile devices Further, in some embodiments, the blockchain in a combination with the transceiver may include a registration process that identifies the type of device. Further, the blockchain may facilitate calculating the distance from the transmitter to the transceiver and detects mobile transceiver power needs before activating the wireless power transmission.

Further, in some embodiments, the blockchain may include deep learning accelerator technology expands the scalability to include a global database of over low earth-orbiting satellites, cellular towers and over Wi-Fi hotspots for network positioning and object detection for the provisioning of wireless power.

Further, in some embodiments, a transceiver device (or the disclosed receiver device) may be associated with a terahertz domain. Further, the at least one low earth orbit satellite transmitter may be configured for comparing the registration request with the distributed block-chain associated with the terahertz domain.

Further, the low earth orbit satellite transmitting of the registration, multi-stage authentication, verification mechanisms, and information may be stored on the blockchain.

Further, in some embodiments, the disclosed receiver device may be configured to locate and communicate with a low earth orbit satellite mesh node network constellation on a terahertz (THz) domain band associated with the inter-satellite link (ISL) for the facilitating wireless energy reception, distribution and storing of wireless energy.

Further, in some embodiments, blockchain space network associated with the disclosed receiver device may be configured to locate and communicate with a 6G and 5G cell tower mesh node network on a terahertz (THz) band associated with the inter-satellite link (ISL) for the facilitating wireless energy reception, distribution and storing of wireless energy.

Further, in some embodiments, the receiver device enables a blockchain energy asset to be bundled and stored onto a Cryptocurrency application on the transceiver device for facilitating wireless energy reception as an energy asset. Further, the blockchain energy asset may be a blockchain quantum energy asset. Further, the energy asset may be a quantum energy asset. When the user initiates a voice command request, or an application request the authentication, Identity, and verification process happens simultaneously and the digital currency chain transaction process is also initiated by the user application and wireless power transmission is activated. This all-in-one system links a blockchain energy asset to a transaction, a point of sale/payment terminal all bundled on the transceiver device for facilitating wireless energy reception. Further, the blockchain energy asset may be a blockchain quantum energy asset.

Further, the present disclosure describes a receiver that is configured for receiving energy wirelessly from transceiver within the receiver device structure, wherein receiver device and transceiver structure comprises of a two-dimensional (2D) material membrane generating free standing ambient energy in the Terahertz (THz) frequency vibration range of 30-200 cm-1, wherein the receiver is mechanically coupled to the membrane such that the receiver is configured to detect an alternating current power signal from the membrane. Further, the receiver is configured to convert the ambient alternating current power signal to a direct current energy charge providing a clean, continuous, limitless charge to an electronic device.

Further, the present disclosure describes a blockchain implemented quantum transaction using the receiver device. Further, the present disclosure describes the blockchain implemented quantum transaction using a quantum wallet in the quantum transceiver of the receiver device. Further, the receiver device may be configured for accessing a distributed block-chain associated with wireless energy asset transfer capable of a Quantum Transaction which includes the ability to transfer and sell excess energy to the grid. Further, a method of transceiver generating a quantum energy asset that can be performed by at least one receiver device includes energy asset transmission includes indistinguishability obfuscation (IO) secure from quantum computer attacks. Further, the energy asset transmission may be the quantum energy asset transmission.

Further, the present disclosure describes a transceiver composition structure of the transceiver. Further, the composition of the transceiver includes Graphene, MoS2, MoSe2, WS2, WSe2, ReS2, ReSe2, BN, and combinations of a transition metal and another element ("MX2"). Also, the electrical conductivity of the various two-dimensional materials varies considerably, which can control the efficiency of harvesting energy using an electrostatic approach. Further, the freestanding membrane is comprised of different layers of graphene based on a number of Carbon atoms.

Further, the different layers of graphene may include 1 Layer CVD, Mono-layer or "Pristine" Graphene, 1-3 layers Very Few Layer Graphene (vFLG), 2-5 Few Layer Graphene (FLG) 1.1 Magic Angle, and 1-10 Multi-Layer Graphene (MLG).

Further, the present disclosure describes the receiver device that has the ability to capture, transform and store terahertz electromagnetic wave energy. Since the Sun is the primary energy and terahertz electromagnetic wave energy source for the solar system, the receiver device could be incorporated into a variety of satellite and interplanetary power stations. For example, the magnetosphere energy could be harvested through a connected low earth orbit (LEO) satellite power station. The collected energy could be extracted utilizing a digital energy asset and transferred to connected earth-based receiver devices. Further, the digital energy asset may be a digital quantum energy asset.

The ionosphere is the ionized part of the upper atmosphere of Earth, from about 48 km (30 mi) to 965 km (600 mi) above sea level, a region that includes the thermosphere and parts of the mesosphere and exosphere. The ionosphere is ionized by solar radiation. It plays an important role in atmospheric electricity and forms the inner edge of the magnetosphere. It has practical importance because, among other functions, it influences radio propagation to distant places on Earth.

Further, the present disclosure describes an interplanetary power station aboard an interstellar vehicle designed with the receiver device to continuously capture, transform, and store the terahertz electromagnetic wave energy for specific uses.

Further, the present disclosure describes a receiver device configured for facilitating a quantum energy transmission of wireless electrical energy.

Further, the present disclosure describes a receiver device configured for facilitating the propagation of a unique torus flow of limitless wireless energy.

Further, the present disclosure describes a receiver device for facilitating quantum wireless power transmission of limitless electrical energy.

Further, the present disclosure relates to the field of the wireless transmission of electrical energy. More specifically, the present disclosure relates to a receiver device configured for the transmission of electrical energy, in a combination of a plurality of quantum elements.

Further, the present disclosure describes a receiver device for facilitating a quantum energy transmission of wireless electrical energy. Further, the receiver device comprised a quantum energy field. Further, the quantum energy field comprises a quantum terahertz electromagnetic circuit controller contained therein and surrounded by an inert insulating medium under pressure that propagates wave energy. Further, a quantum receiver metamaterial enclosure allows the propagation of a unique torus flow of limitless wireless energy and generates terahertz electromagnetic wave energy and the receiver converts the terahertz electromagnetic wave energy into electrical energy. Further, the receiver transceiver includes a quantum power key distribution method for a secure wireless power transmission which implements a cryptographic protocol involving, the security quantum F-NFT vault, security quantum F-NFT wallet all components of the quantum energy asset. It enables two quantum wireless power transmission systems to produce a shared random secret key quantum energy wallet known only to them, which can then be used to encrypt and decrypt wireless power transmission.

Further, the present disclosure describes a quantum energy system. Further, the quantum energy system describes a method of (quantum energy system) transmitting electrical energy through the universe's own quantum natural media, which consists of a (Quantum Energy Field) that creates a propagation or its own unique torus flow of electrical energy, by conduction, utilizing the ionosphere and a low earth satellite providing sufficiently-high electromotive force and collecting, transmitting or receiving at a distant point the electrical energy so propagated or caused to the power transmission flow.

Further, the present disclosure describes a method of generating quantum energy and power transmission to a space station and power transmission to a receiver on earth. The method hereinbefore described of transmitting electrical energy through the universe natural media, which consists in producing energy between a low earth satellite and a transceiver on the space station generating electrical energy, a sufficiently-high electromotive force to render elevated Ionosphere conducting, causing thereby a propagation or flow of electrical energy, by conduction, through the ionosphere, and collecting or receiving at a point distant from the generating-station the electrical energy so propagated or caused to flow.

Further, the present disclosure describes a method powering smart cities, flying cars, drones, etc. The method hereinbefore described of transmitting electrical energy through the natural media, which consists in producing between the earth and a low earth satellite generator-terminal elevated above the same, at a generating station, a sufficiently-high electromotive force to render elevated ionosphere and acting, causing thereby a propagation or flow of electrical energy utilizing the ionosphere, by conduction, collecting or receiving the energy so transmitted by means of a receiving-circuit at a point distant from the generating-station, using the receiving-circuit to energize a secondary circuit, and operating translating devices by means of the energy so obtained in the secondary circuit.

Further, the present disclosure describes the usage of the Quantum Energy Field that provides clean, limitless energy.

Further, the present disclosure implements an F-NFT Platform. Further, the implementation of the F-NFT platform allows implementation of the Quantum F-NFT Vault, Quantum F-NFT Wallet, and Quantum F-NFT Key Distribution System Further, at least one energy asset may be at least one quantum energy asset that may be a fractional non-fungible token (F-NFT) quantum energy asset. Further, the fractional non-fungible token (F-NFT) quantum energy asset may be defined as a fractional non-fungible energy token (F-NFT) that may be a unique and non-interchangeable unit of energy stored on a digital ledger. Further, the receiver transceiver includes a quantum power key distribution method for a secure wireless power transmission and transaction which implements a cryptographic protocol involving components of the quantum power key distribution and also includes a quantum F-NFT Vault, a quantum F-NFT wallet into the quantum energy system. It enables two quantum wireless power transmission systems to produce a shared random secret key quantum energy wallet known only to them, which can be used to encrypt and decrypt wireless power transmission Further, the F-NFT may be used to represent a quantum energy asset as a unique asset that utilizes the blockchain technology to establish a verified and a public proof of quantum energy asset ownership.

Further, the present disclosure describes a VL Quantum Space Network that provides "Infinity" Network Scalability. Further, the VL Quantum Space Network provides Wireless Terahertz Speed Data Communications. Further, the Wireless Power Transmission may be faster than the speed of conventional wireless power transmissions.

Further, the present disclosure describes at least one of at least one asset, an energy asset, at least one blockchain energy asset, a blockchain energy asset, a fractional non-fungible token (F-NFT) energy asset, etc. Further, the at least one energy asset may be at least one quantum energy asset, the energy asset may be a quantum energy asset, the at least one blockchain energy asset may be at least one blockchain quantum energy asset, the blockchain energy asset may be a blockchain quantum energy asset, the fractional non-fungible token (F-NFT) energy asset may be a fractional non-fungible token (F-NFT) quantum energy asset and a quantum fractional non-fungible token (F-NFT) energy asset. Further, the at least one quantum energy asset, the quantum energy asset, the at least one blockchain quantum energy asset, the blockchain quantum energy asset, the non-fungible token (F-NFT) quantum energy asset, and the quantum fractional non-fungible token (F-NFT) energy asset may be associated with a quantum energy system, quantum energy field, quantum power key distribution, a quantum F-NFT vault, and a quantum F-NFT wallet.

Further, the present disclosure describes an advancement and expansion of the wireless power network and quantum energy transmission technology.

Further, the present disclosure describes a Quantum Space Network comprising a network of low earth orbit satellites and space stations. Further, the quantum space network allows the transmission of energy via multiple energy pathways. Further, a first energy pathway includes transmitting energy from the ground transmitter to one or more LEO satellites and transmitting the energy from the one or more LEO satellites to one or more space stations. Further, a second energy pathway includes transmitting energy from the ground transmitter to one or more LEO satellites and transmitting the energy from the one or more LEO satellites to one or more ground receivers and/or one or more space stations. Further, a third energy pathway includes transmitting energy from the ground transmitter to one or more LEO satellites and transmitting the energy from the one or more LEO satellites to a ground receiver. Further, a fourth energy pathway includes transmitting energy from the ground transmitter to the ionosphere causing reflection of the energy to a ground receiver (Point to Point mode). Further, a fifth energy pathway includes transmitting energy from the ground transmitter to the ionosphere causing reflection of the energy to ground receivers (Point to Multi-Point mode). Further, the ground receiver(s) may be ground station(s). Further, LEO satellite(s) may be space station(s).

Further, the present disclosure describes a Quantum Space Network comprising a network of low earth orbit satellites, space stations, and ground stations that support power transmission for Metaverse devices (wearables, HID, earphones, tactile/haptic feedback devices, etc.).

Further, the present disclosure describes a Quantum Space Network comprising a network of low earth orbit satellites and space stations and ground stations support navigation.

Further, the present disclosure describes a quantum energy system implemented using a Quantum Space Network which comprises a network of low earth orbit satellites and space stations or ground stations. Further, the quantum energy system employs an alternative positioning system that makes use of a fifth-generation (5G), sixth-generation (6G), and seventh-generation (7G) telecommunications network using a distributed atomic clock for navigation which is more accurate and robust than GPS. Further, the quantum energy system has an extremely accurate radio clock that is good to one billionth of a second with navigation to within an 8 Centimeter Accuracy.

Further, the present disclosure describes a new technology that is important for the implementation of a wide range of advanced wireless power transmission location-based metaverse applications. Scheduled in connection with Extended Reality (XR) for efficiently supporting AR (Augmented Reality), VR (Virtual Reality), MR (Mixed Reality), and the like.

Referring now to figures, FIG. 1 is an illustration of an online platform 100 consistent with various embodiments of the present disclosure. By way of non-limiting example, the online platform 100 to facilitate wireless energy transmissions may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116 and a device 118 (such as the receiver device 200, the receiver device 3400, the receiver device 4100, the receiver device 4600, the at least one transmitter device 4706, the primary receiver device 4708, the primary transmitter device 4710, the at least one secondary receiver device 4712, etc.) over a communication network 104, such as but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 3200.

Figure 2:
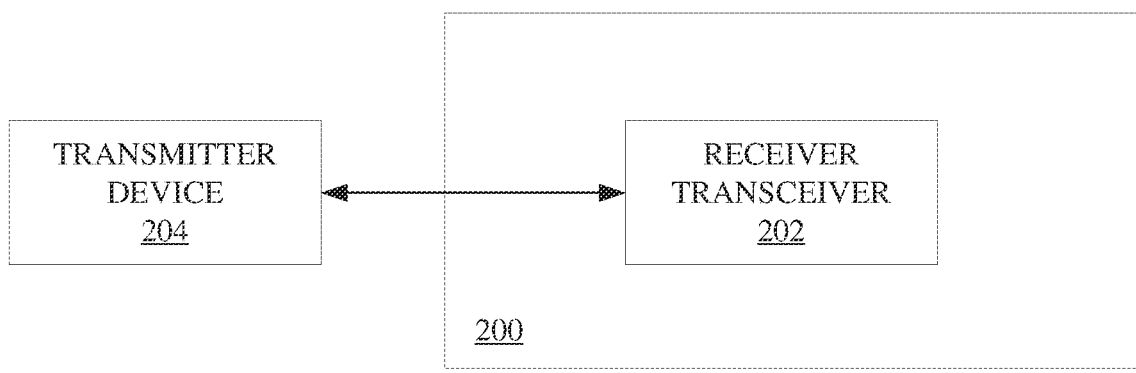
FIG. 2 is a block diagram of a receiver device for facilitating wireless energy reception, in accordance with some embodiments.

FIG. 2 is a block diagram of a receiver device 200 for facilitating wireless energy reception, in accordance with some embodiments. Accordingly, the receiver device 200 may include a receiver transceiver 202.

Further, the receiver transceiver 202 may be configured for receiving energy wirelessly from at least one transmitter device 204. Further, the receiver transceiver 202 may include a receiver antenna configured for facilitating the receiving of the energy wirelessly. Further, the receiver antenna may include at least one superconducting material. Further, the receiver transceiver 202 may be configured for transmitting a registration request to the at least one transmitter device 204. Further, the registration request may include a unique receiver device identifier. Further, the at least one transmitter device 204 may be configured for analyzing the registration request. Further, the at least one transmitter device 204 may be configured for accessing a distributed block-chain associated with wireless energy transfer based on analyzing. Further, the at least one transmitter device 204 may be configured for authenticating the receiver device 200 based on the accessing. Further, the at least one transmitter device 204 may be configured for transmitting the energy wirelessly to the receiver transceiver 202 based on the authenticating. Further, the at least one transmitter device 204 may include one or more satellites. Further, the one or more satellites may include one or more low earth orbiting satellites.

Further, in some embodiments, the receiver antenna may be configured for receiving electromagnetic waves associated with at least one frequency band. Further, the electromagnetic waves are configured for transferring the energy to the receiver antenna based on the receiving of the electromagnetic waves. Further, a frequency band of the at least one frequency band may be characterized by terahertz frequencies. Further, in some embodiments, the receiver antenna may include a graphene material. Further, the graphene material may be configured for harvesting the electromagnetic waves. Further, the harvesting may include absorbing the electromagnetic waves and converting the electromagnetic waves in electrical energy. Further, in some embodiments, the receiver antenna may include at least one detecting component. Further, the at least one detecting component may be comprised of the at least one superconducting material. Further, the at least one detecting component may be configured for absorbing the electromagnetic waves of the terahertz frequencies. Further, in some embodiments, the receiver antenna may include at least one amplifying component. Further, the at least one amplifying component may be comprised of the at least one superconducting material. Further, the at least one amplifying component may be configured for amplifying the electromagnetic waves of the terahertz frequencies by adding additional energy to the electromagnetic waves. Further, in some embodiments, the receiver antenna may include at least one converting component. Further, the at least one converting component may be comprised of the at least one superconducting material. Further, the at least one converting component may be configured for converting the electromagnetic waves of the terahertz frequencies in electrical energy by uninhibited movement of charges in the at least one converting component.

Figure 3:
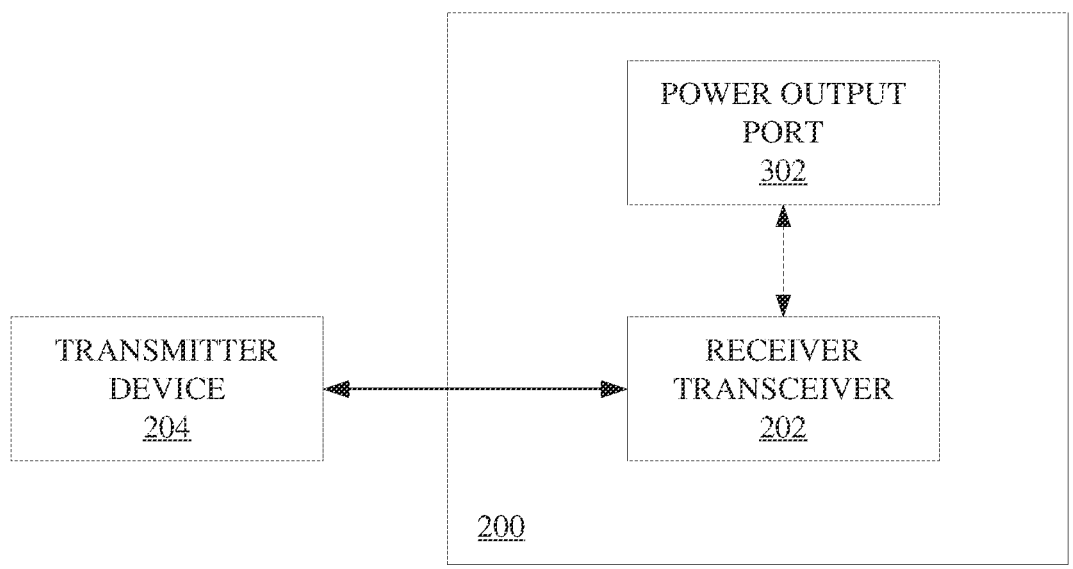
FIG. 3 is a block diagram of the receiver device for facilitating wireless energy reception, in accordance with some embodiments.

Further, in some embodiments, the at least one converting component may include a rectenna. Further, the rectenna may be configured for converting the electromagnetic waves into direct current electrical energy. Further, in some embodiments, the rectenna may include a two-dimensional $MoS_2$-enabled flexible rectenna. Further, in some embodiments, the receiver device 200 may include a power output port 302, as shown in FIG. 3, communicatively coupled with the receiver transceiver 202. Further, the power output port 302 may be configured to be interfaced with at least one power input port of at least one electronic device. Further, the power output port 302 may be configured for supplying electrical energy to the at least one electronic device. Further, the at least one electronic device may include at least one supercapacitor. Further, the at least one supercapacitor may be configured for storing the electrical energy.

Further, in some embodiments, the receiver antenna may include a circuitry. Further, the circuitry may be configured for facilitating the receiving of the energy. Further, the circuitry may be comprised of the at least one superconducting material. Further, the circuitry may be configured for conducting an electric current of the electrical energy with zero loss.

Further, in some embodiments, the at least one superconductor material may include indium doped zinc oxide, zinc tin oxide, amorphous silicon, amorphous germanium, low-temperature polycrystalline silicon, transition metal dichalcogenide, yttrium-doped zinc oxide, polysilicon, poly germanium doped with boron, poly germanium doped with aluminum, germanium doped with phosphorous, germanium doped with arsenic, indium oxide, tin oxide, zinc oxide, gallium oxide, indium gallium zinc oxide, copper oxide, nickel oxide, cobalt, indium tin oxide, tungsten disulphide, molybdenum disulphide, molybdenum selenide, black phosphorous, molybdenite, INAs, InP, a-InGaZnO, c-InGaZnO, GaZnON, ZnON, C-Axis Aligned crystal, molybdenum and Sulphur, group-VI transition metal dichalcogenide, gold, and silver.

FIG. 3 is a block diagram of the receiver device 200 for facilitating wireless energy reception, in accordance with some embodiments.

Figure 4:
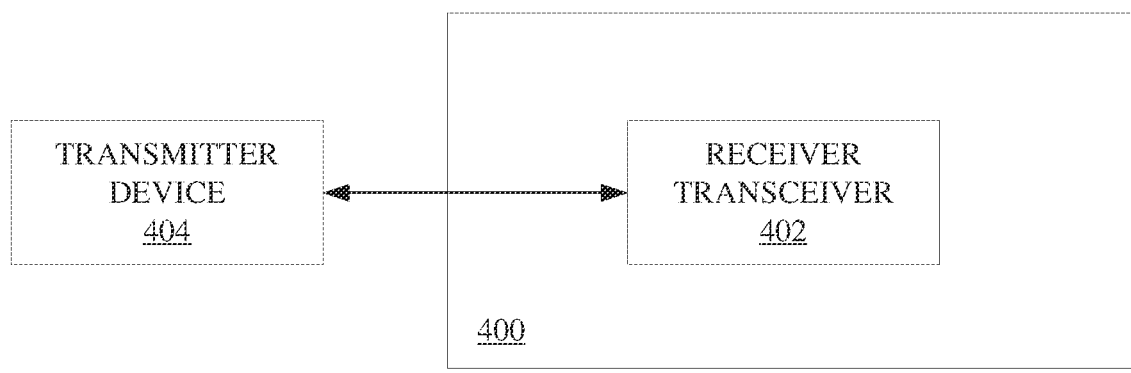
FIG. 4 is a block diagram of a receiver device for facilitating wireless energy reception, in accordance with some embodiments.

FIG. 4 is a block diagram of a receiver device 400 for facilitating wireless energy reception, in accordance with some embodiments. Accordingly, the receiver device 400 may include a receiver transceiver 402.

Further, the receiver transceiver 402 may be configured for receiving energy wirelessly from at least one transmitter device 404. Further, the at least one transmitter device 404 may include one or more satellites. Further, the one or more satellites may include one or more low earth orbiting satellites. Further, the receiver transceiver 402 may include a receiver antenna configured for facilitating the receiving of the energy wirelessly. Further, the receiver antenna may include at least one superconducting material. Further, the receiver antenna may be configured for receiving electromagnetic waves associated with at least one frequency band. Further, the electromagnetic waves are configured for transferring the energy to the receiver antenna based on the receiving of the electromagnetic waves. Further, a frequency band of the at least one frequency band may be characterized by terahertz frequencies. Further, the receiver transceiver 402 may be configured for transmitting a registration request to the at least one transmitter device 404. Further, the registration request may include a unique receiver device identifier. Further, the at least one transmitter device 404 may be configured for analyzing the registration request. Further, the at least one transmitter device 404 may be configured for accessing a distributed block-chain associated with wireless energy transfer based on analyzing. Further, the at least one transmitter device 404 may be configured for authenticating the receiver device 400 based on the accessing. Further, the at least one transmitter device 404 may be configured for transmitting the energy wirelessly to the receiver transceiver 402 based on the authenticating.

Further, in some embodiments, the receiver antenna may include a graphene material. Further, the graphene material may be configured for harvesting the electromagnetic waves. Further, the harvesting may include absorbing the electromagnetic waves and converting the electromagnetic waves in electrical energy.

Further, in some embodiments, the receiver antenna may include at least one detecting component. Further, the at least one detecting component may be comprised of the at least one superconducting material. Further, the at least one detecting component may be configured for absorbing the electromagnetic waves of the terahertz frequencies.

Further, in some embodiments, the receiver antenna may include at least one amplifying component. Further, the at least one amplifying component may be comprised of the at least one superconducting material. Further, the at least one amplifying component may be configured for amplifying the electromagnetic waves of the terahertz frequencies by adding additional energy to the electromagnetic waves.

Further, in some embodiments, the receiver antenna may include at least one converting component. Further, the at least one converting component may be comprised of the at least one superconducting material. Further, the at least one converting component may be configured for converting the electromagnetic waves of the terahertz frequencies in electrical energy by uninhibited movement of charges in the at least one converting component. Further, in some embodiments, the at least one converting component may include a rectenna. Further, the rectenna may be configured for converting the electromagnetic waves into direct current electrical energy. Further, in some embodiments, the rectenna may include a two-dimensional $MoS_2$-enabled flexible rectenna.

Figure 5:
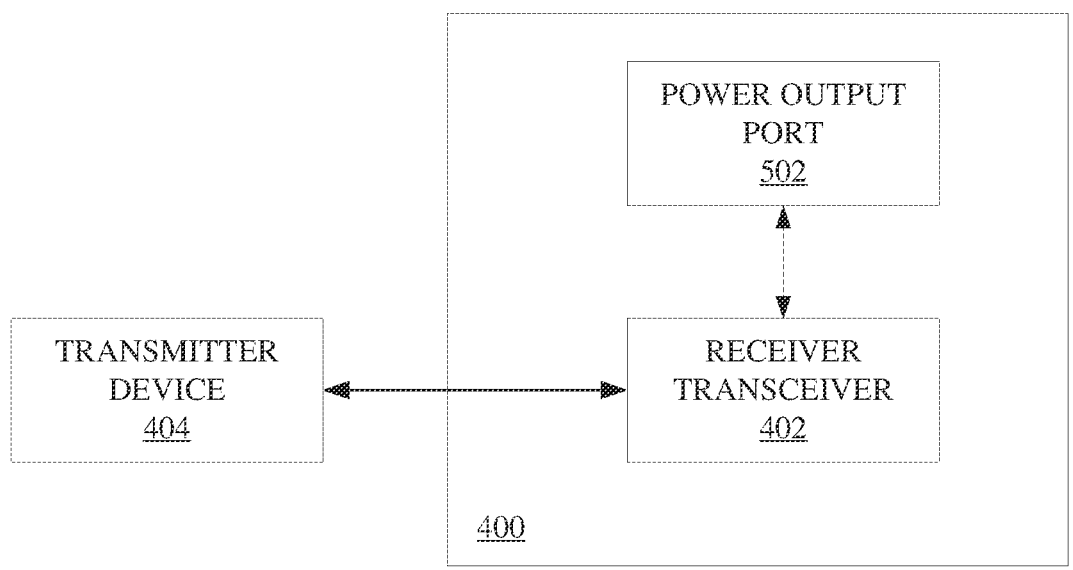
FIG. 5 is a block diagram of the receiver device for facilitating wireless energy reception, in accordance with some embodiments.

Further, in some embodiments, the receiver device 400 may include a power output port 502, as shown in FIG. 5, communicatively coupled with the receiver transceiver 402. Further, the power output port 502 may be configured to be interfaced with at least one power input port of at least one electronic device. Further, the power output port 502 may be configured for supplying electrical energy to the at least one electronic device. Further, the at least one electronic device may include at least one supercapacitor. Further, the at least one supercapacitor may be configured for storing the electrical energy.

Further, in some embodiments, the at least one superconductor material may include indium doped zinc oxide, zinc tin oxide, amorphous silicon, amorphous germanium, low-temperature polycrystalline silicon, transition metal dichalcogenide, yttrium-doped zinc oxide, polysilicon, poly germanium doped with boron, poly germanium doped with aluminum, germanium doped with phosphorous, germanium doped with arsenic, indium oxide, tin oxide, zinc oxide, gallium oxide, indium gallium zinc oxide, copper oxide, nickel oxide, cobalt, indium tin oxide, tungsten disulphide, molybdenum disulphide, molybdenum selenide, black phosphorous, molybdenite, INAs, InP, a-InGaZnO, c-InGaZnO, GaZnON, ZnON, C-Axis Aligned crystal, molybdenum and Sulphur, group-VI transition metal dichalcogenide, gold, and silver.

FIG. 5 is a block diagram of the receiver device 400 for facilitating wireless energy reception, in accordance with some embodiments.

Figure 6:
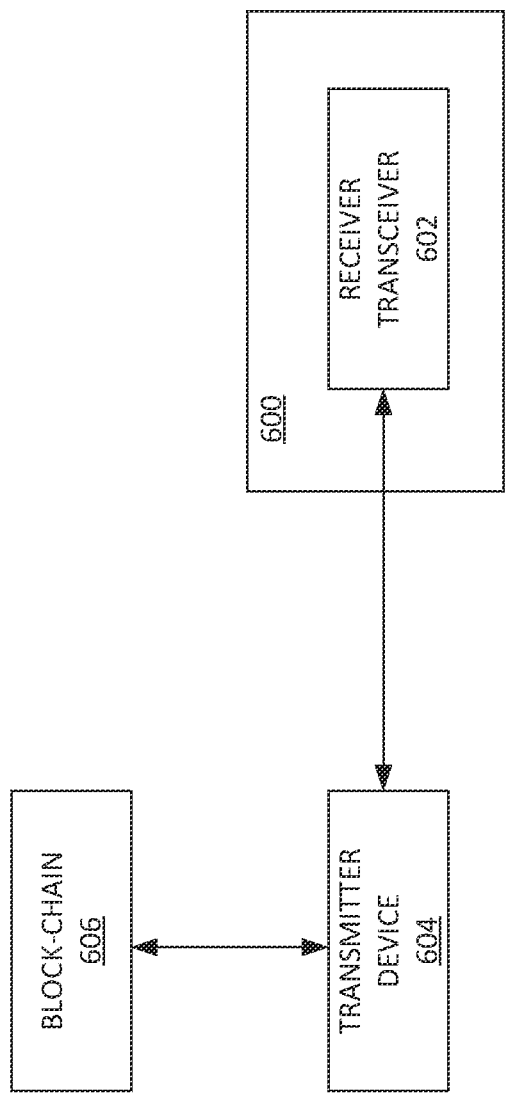
FIG. 6 is a block diagram of a receiver device for facilitating wireless power reception, in accordance with some embodiments.

FIG. 6 is a block diagram of a receiver device 600 for facilitating wireless power reception in accordance with some embodiments. The receiver device 600 comprises a receiver transceiver 602 configured for wirelessly communicating with at least one transmitter device 604. Further, the at least one transmitter device 604 may include one or more satellites. Further, the one or more satellites may include one or more low earth orbiting satellites. The receiver transceiver 602 may be configured for transmitting a registration request to the at least one transmitter device 604. Further, the registration request comprises a unique receiver device identifier. Further, the at least one transmitter device 604 may be configured for accessing a distributed block-chain 606 associated with wireless power transfer. Further, the at least one transmitter device 604 may be configured for analyzing the registration request, updating the distributed block-chain 606 based on the analyzing of the registration request and transmitting a registration response to the receiver device 600. Further, the receiver transceiver 602 may be configured for receiving the registration response. In an embodiment, the registration request comprises a wireless power transfer request comprising the unique receiver device identifier.

Figure 7:
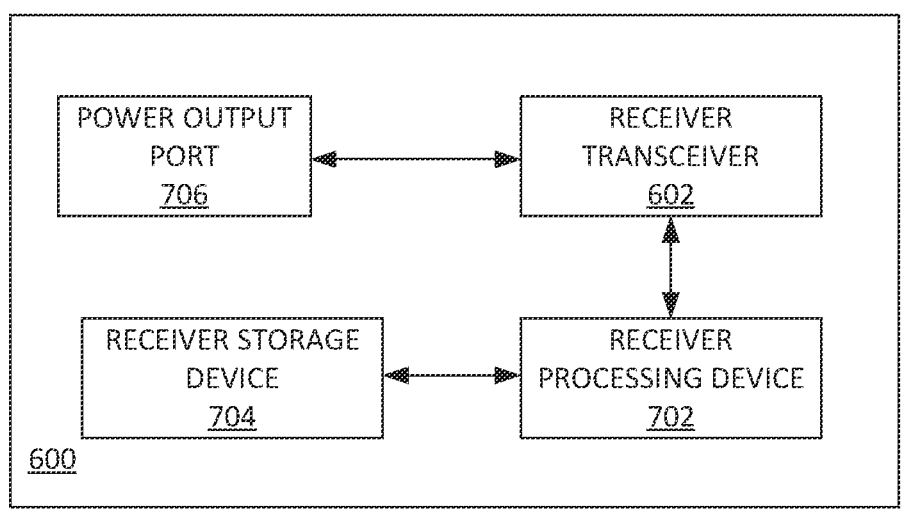
FIG. 7 is a block diagram of the receiver device for facilitating wireless power reception, in accordance with further embodiments.

FIG. 7 is a block diagram of the receiver device 600 for facilitating wireless power reception in accordance with some embodiments. The receiver transceiver 602 may be configured for wirelessly communicating with at least one transmitter device (such as the at least one transmitter device 604). Further, the at least one transmitter device may include one or more satellites. Further, the one or more satellites may include one or more low earth orbiting satellites. Further, the receiver transceiver 602 may be configured for receiving at least one transmitter characteristic data from the at least one transmitter device. Further, the receiver transceiver 602 may be configured for transmitting at least one receiver characteristic data to the at least one transmitter device. Further, the at least one transmitter device may be configured for controlling transmission of wireless power based on the at least one receiver characteristic data. Further, the receiver transceiver 602 may be configured for receiving wireless power transmission from the at least one transmitter device. Further, the receiver transceiver 602 may be configured for converting the wireless power transmission into electrical energy.

Further, the receiver device 600 may include a receiver processing device 702 communicatively coupled to the receiver transceiver 602. Further, the receiver processing device 702 may be configured for analyzing the at least one transmitter characteristic data. Further, the receiver processing device 702 may be configured for determining capability of the at least one transmitter device for transmitting wireless power receivable by the receiver device 600 based on the analyzing. Further, the receiver device 600 may include a receiver storage device 704 configured for storing the at least one receiver characteristic data.

Further, the receiver device 600 may include a power output port 706 communicatively coupled with the receiver transceiver 602. Further, the power output port 706 may be configured to be interfaced with at least one power input port of at least one electronic device. Further, the power output port 706 may be configured for supplying the electrical energy to the at least one electronic device.

In some embodiments, the receiver characteristic data may include receiver authentication data. Further, the at least one transmitter device may be configured for authenticating the receiver device 600 for wireless power transfer based on the receiver authentication data.

In some embodiments, the at least one transmitter characteristic may include transmitter authentication data. Further, the receiver processing device 702 may be configured for authenticating the at least one transmitter device based on the transmitter authenticating data. Further, the receiving of the wireless power from the at least one transmitter device may be based on the authenticating of the at least one transmitter device.

In some embodiments, the receiver device 600 may further include a microphone communicatively coupled to the receiver processing device 702. Further, the microphone may be configured for detecting a voice command. Further, the receiver processing device 702 may be further configured for analyzing the voice command. Further, the receiver processing device 702 may be configured for initiating the wireless communicating of the receiver device 600 with the at least one transmitter device based on the analyzing of the voice command.

In some embodiments, the wireless power transmission may include terahertz radiation.

In some embodiments, the receiver transceiver 602 may be further configured for pairing with at least one transmitter transceiver comprised in the at least one transmitter device based on one or more of the at least one transmitter characteristic data and the at least one receiver characteristic data. Further, the receiver transceiver 602 may be configured for establishing a wireless power transfer connection based on the pairing. Further, the wireless power transmission from the at least one transmitter device may be based on the wireless power transfer connection.

In some embodiments, the at least one receiver characteristic data may include a receiver device type of the receiver device 600, at least one distance between the receiver device 600 and the at least one transmitter device and an amount of power requested by the receiver device 600. Further, the at least one transmitter device may be configured for controlling the wireless power transmission based on one or more of the at least one distance and the receiver device type.

In some embodiments, the at least one transmitter characteristic data may include a transmitter device type of the at least one transmitter device, a transmission power level associated with the at least one transmitter device. Further, the receiver processing device 702 may be further configured for determining the at least one distance based on analyzing each of the transmitter device type of the at least one transmitter device, the transmission power level and at least one received power level corresponding to the wireless power transmission received from the at least one transmitter device.

In some embodiments, the at least one receiver characteristic data may include a receiver device type. Further, the at least one transmitter device may be configured for determining the at least one distance based on a measurement of loading created on at least one antenna corresponding to the at least one transmitter device due to the receiving of the wireless power transmission by the receiver device 600 from the at least one transmitter device.

In some embodiments, the receiver transceiver 602 may include a first receiver transceiver configured for communicating over a first frequency band and a second receiver transceiver configured for communicating over a second frequency band. Further, the first receiver transceiver may be configured for receiving at least one transmitter characteristic data and transmitting the at least one receiver characteristic data. Further, the second receiver transceiver may be configured for receiving the wireless power transmission from the at least one transmitter device. Further, the first frequency band may be characterized by frequencies lower than terahertz frequencies. Further, the second frequency band may be characterized by terahertz frequencies.

In some embodiments, the receiver transceiver 602 may be further configured for transmitting wireless power transmission to the at least one transmitter device. Further, the receiver processing device 702 may be further configured for analyzing the at least one transmitter characteristic data. Further, the receiver processing device 702 may be further configured for determining capability of the at least one transmitter device for receiving wireless power transmittable by the receiver device 600 based on the analyzing of the at least one transmitter characteristic data.

In some embodiments, the receiver device 600 may further include at least one sensor configured for sensing at least one variable associated with wireless power transfer between the at least one transmitter device and the receiver device 600. Further, the receiver processing device 702 may be further configured for analyzing the at least one variable. Further, the receiver processing device 702 may be further configured for generating a notification based on the analyzing of the at least one variable. Further, the receiver transceiver 602 may be further configured for transmitting the notification to a user device associated with the receiver device 600.

In some embodiments, the receiver processing device 702 may be further configured for determining an abnormal state of wireless power transfer based on the analyzing of the at least one variable. Further, the receiver device 600 further may include an input device configured for receiving an input from a user of the receiver device 600. Further, the wireless power reception may be based on the input.

In some embodiments, the receiver transceiver 602 may be further configured for transmitting a registration request to the at least one transmitter device. Further, the registration request may include a unique receiver device identifier. Further, the at least one transmitter device may be configured for accessing a distributed block-chain (such as the distributed block-chain 606) associated with wireless power transfer. Further, the at least one transmitter device may be further configured for analyzing the registration request. Further, the at least one transmitter device may be further configured for updating the distributed block-chain based on the analyzing of the registration request. Further, the at least one transmitter device may be further configured for transmitting a registration response to the receiver device 600. Further, the receiver transceiver 602 may be configured for receiving the registration response.

In some embodiments, the receiver device 600 may be associated with a domain. Further, the at least one transmitter device may be further configured for comparing the registration request with the distributed block-chain associated with the domain. Further, the transmitting of the registration response may be based on the comparing.

In some embodiments, the at least one receiver characteristic data may include a wireless power transfer request including the unique receiver device identifier. Further, the at least one transmitter device may be configured for accessing the distributed block-chain based on the wireless power transfer request. Further, the at least one transmitter device may be configured for authenticating the receiver device 600 based on a result of the accessing. Further, the at least one transmitter device may be configured for granting the wireless power transfer request based on the authenticating. Further, the wireless power transmission may be based on the granting.

In some embodiments, the distributed block-chain may include a trust level associated with the receiver device 600. Further, the authenticating of the receiver device 600 may be based on the trust level.

In some embodiments, the receiver device 600 may further include at least one sensor configured for sensing at least one variable associated with wireless power transfer between the at least one transmitter device and the receiver device 600. Further, the receiver may be further configured for storing the at least one variable in the distributed block-chain. Further, the at least one transmitter device may be further configured for retrieving the at least one variable from the distributed block-chain analyzing the at least one variable. Further, the at least one transmitter device may be further configured for determining a behavior of the receiver device 600 based on the analyzing of the at least one variable.

In some embodiments, the at least one transmitter device may be further configured for generating a trust level associated with the receiver device 600 based on the behavior. Further, the at least one transmitter device may be further configured for updating the distributed block-chain with the trust level associated with the receiver device 600.

In some embodiments, the at least one sensor may include a receiver location sensor configured to determine a geographical location of the receiver device 600. Further, the registration request may include the geographical location. Further, the at least one transmitter device may be further configured for updating the distributed block-chain with the geographical location of the receiver device 600.

Further disclosed is a transmitter device for facilitating wireless power reception. The transmitter device may include a transmitter transceiver configured for wirelessly communicating with at least one receiver device such as the receiver device 600. Further, the transmitter transceiver may be configured for receiving at least one receiver characteristic data from the at least one receiver device. Further, the transmitter transceiver may be configured for transmitting at least one transmitter characteristic data to the at least one receiver device. Further, the at least one transmitter device may be configured for controlling transmission of wireless power based on the at least one receiver characteristic data. Further, the transmitter transceiver may be configured for transmitting wireless power transmission to the at least one receiver device. Further, the receiver transceiver 602 may be configured for converting the wireless power transmission into electrical energy. Further, the transmitter device may include a transmitter processing device communicatively coupled to the transmitter transceiver. Further, the transmitter processing device may be configured for analyzing the at least one receiver characteristic data. Further, the transmitter processing device may be configured for determining capability of the at least one receiver device for receiving wireless power transmittable by the transmitter device based on the analyzing. Further, the transmitter device may include a transmitter storage device configured for storing the at least one transmitter characteristic data.

Further disclosed is an electronic device comprising a receiver device (such as the receiver device 600) for facilitating wireless power reception. The electronic device may include, for example, but not limited to, a stationary computing device (a desktop computer), a mobile computing device (smartphone, tablet computer, a laptop computer, etc.), an IoT device, a wearable computing device (e.g. fitness band, smart glasses, VR headset etc.). The receiver device may include a receiver transceiver (such as the receiver transceiver 602) configured for wirelessly communicating with at least one transmitter device. Further, the receiver transceiver may be configured for receiving at least one transmitter characteristic data from the at least one transmitter device. Further, the receiver transceiver may be configured for transmitting at least one receiver characteristic data to the at least one transmitter device. Further, the at least one transmitter device may be configured for controlling transmission of wireless power based on the at least one receiver characteristic data. Further, the receiver transceiver may be configured for receiving wireless power transmission from the at least one transmitter device. Further, the receiver transceiver may be configured for converting the wireless power transmission into electrical energy. Further, the receiver device may include a receiver processing device (such as the receiver processing device 702) communicatively coupled to the receiver transceiver. Further, the receiver processing device may be configured for analyzing the at least one transmitter characteristic data. Further, the receiver processing device may be configured for determining capability of the at least one transmitter device for transmitting wireless power receivable by the receiver device based on the analyzing. Further, the receiver device may include a receiver storage device (such as the receiver storage device 704) configured for storing the at least one receiver characteristic data. Further, the receiver device may include a power output port (such as the power output port 706) communicatively coupled with the receiver transceiver. Further, the power output port may be configured to be interfaced with at least one power input port of the electronic device. Further, the power output port may be configured for supplying the electrical energy to the electronic device. In an instance, the electronic device may include a battery configured for storing electrical energy and providing power to the electronic device. Accordingly, the power output port may be electrically coupled to the battery in order to store the electrical energy in the battery.

Figure 8:
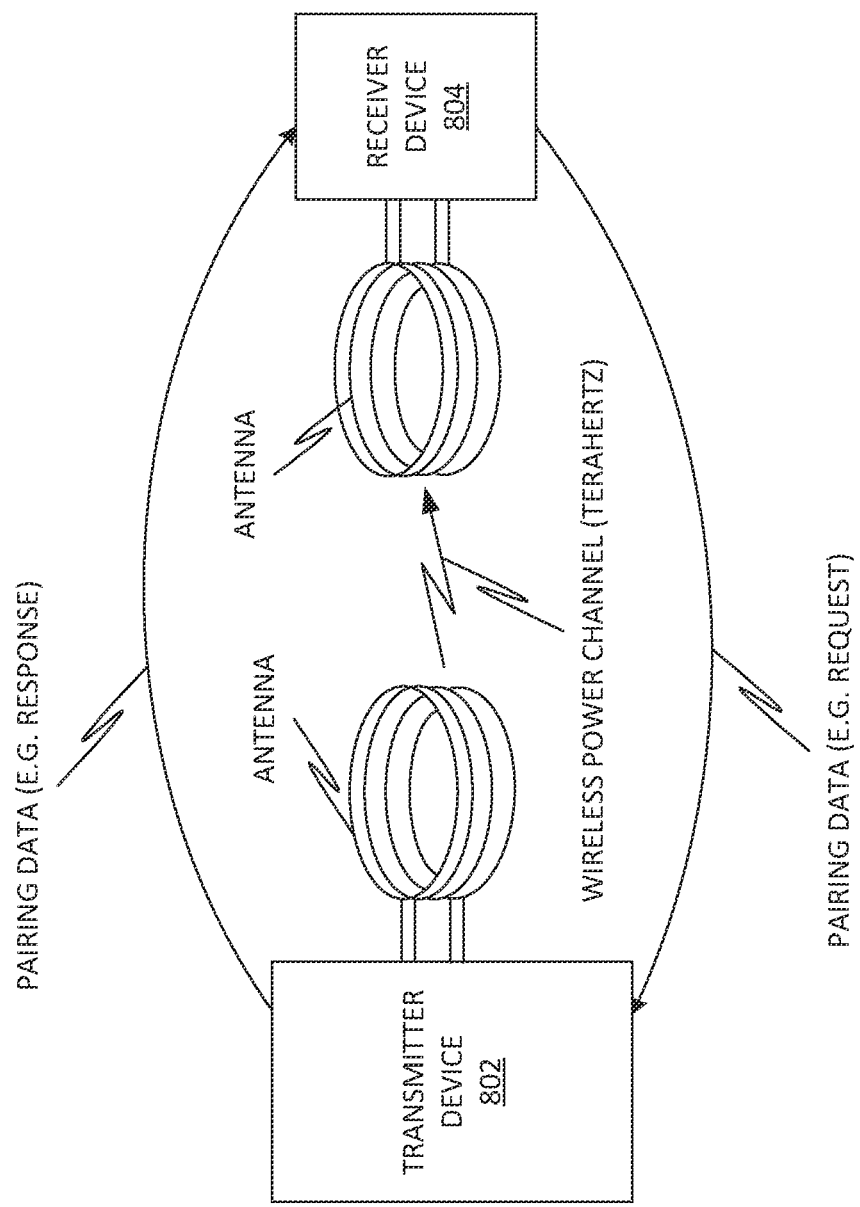
FIG. 8 illustrates exchange of pairing data between a wireless transmitter device and a wireless receiver device for facilitating wireless power transfer using terahertz frequencies, in accordance with some embodiments.

FIG. 8 illustrates exchange of pairing data between a wireless transmitter device and a wireless receiver device for facilitating wireless power transfer using terahertz frequencies, in accordance with some embodiments. As illustrated, in an embodiment, both the transmitter device 802 and the receiver device 804 may be configured to broadcast a functionality of transmitting and/or receiving wireless power transfer over one or more frequency bands (e.g. terahertz frequencies). Further, the transmitter device 802 may include one or more satellites. Further, the one or more satellites may include one or more low earth orbiting satellites. Further, the broadcast may also include a unique identifier (i.e. a WPN-ID) associated with each of the transmitter device 802 and the receiver device 804. Accordingly, based on a mutual detection of the functionality, the receiver device 804 may transmit a pairing data (e.g. power transfer request) to the transmitter device 802. Accordingly, the transmitter device 802 may transmit a corresponding pairing data (e.g. a response) to the receiver device 804. In an instance, a mutually known code may be exchanged between the transmitter device 802 and the receiver device 804 in order to establish a pairing (similar to the pairing process of Bluetooth). Subsequently, wireless power transfer may be initiated.

Figure 13:
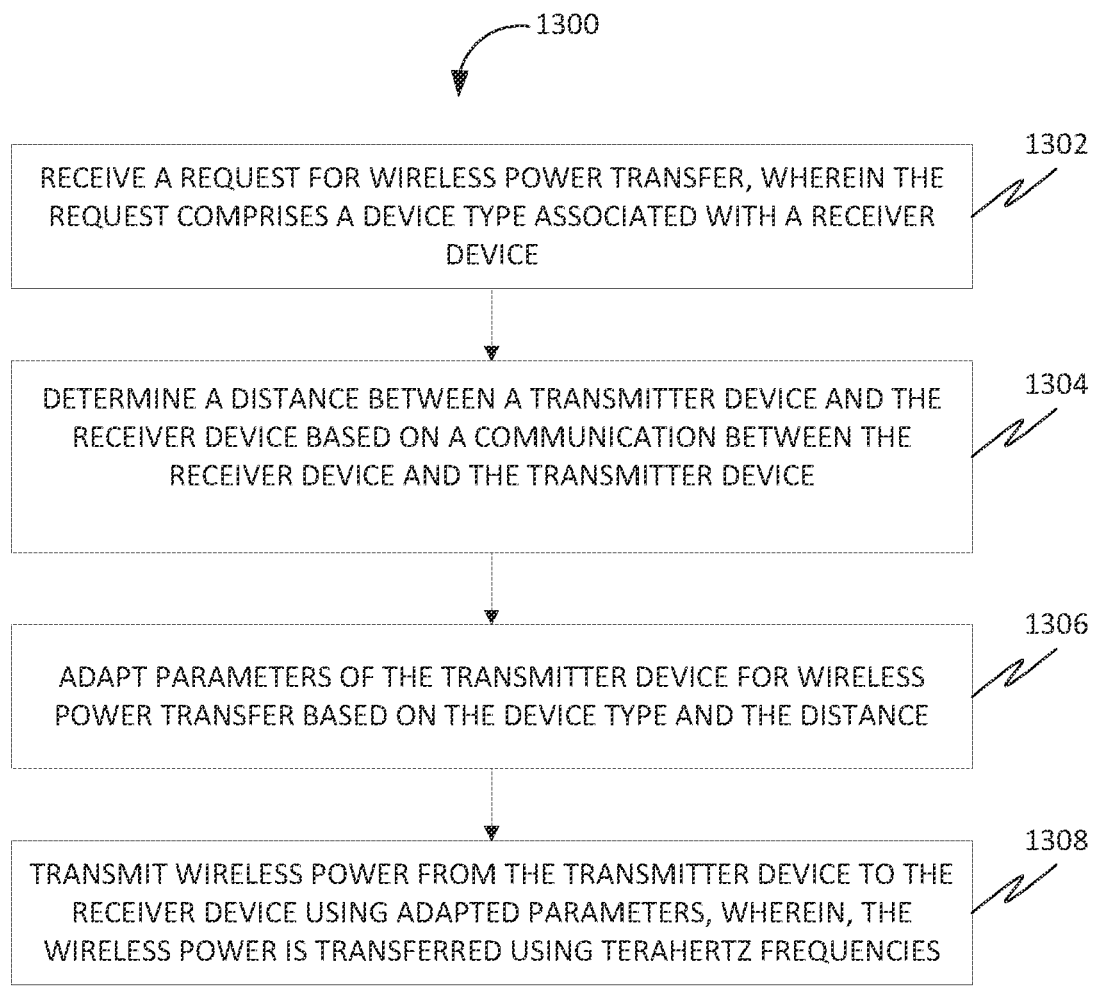
FIG. 13 illustrates a flowchart of a method of performing wireless power transfer using terahertz frequencies, in accordance with some embodiments.

FIG. 9 illustrates a system 900 for facilitating wireless transfer of power configured to adapt wireless transmission of power from a transmitter device 902 to a plurality of receiver devices 904-908 based on a plurality of device types and/or a plurality of distances 910-914 of the plurality of receiver devices 904-908 from the transmitter device 902, in accordance with some embodiments. As shown, the transmitter device 902 may be configured to wirelessly transfer power to the receiver devices 904-908 corresponding to a plurality of types and situated at the plurality of distances 910-914. Accordingly, the transmitter device 902 may first determine a device type corresponding to a receiver device. In an instance, the device type may be comprised in a request for wireless power transfer from the receiver device. Further, the transmitter device 902 may also be configured to determine a distance of the receiver device from the transmitter device 902. In an instance, the transmitter device 902 may determine the distance by determining an amount of loading present on a transmitter antenna 916 by the receiver device along with information about the device type. Accordingly, based on the device type and the distance, the transmitter device 902 may adapt parameters of wireless power transfer (e.g. frequency, voltage, current, phase, power factor, etc.). Further, the transmitter device 902 may include one or more satellites. Further, the one or more satellites may include one or more low earth orbiting satellites. Further, FIG. 13 illustrates a flowchart of a corresponding method 1300 of performing wireless power transfer using terahertz frequencies based on adaptively varying parameters of the transmitter device 902, as shown in FIG. 9 according to a device type of a receiver device and a distance of the receiver device from the transmitter device 902, in accordance with some embodiments. At 1302, the method 1300 includes receiving a request for wireless power transfer, wherein the request comprises a device type associated with a receiver device. At 1304, the method 1300 may include determining a distance between a transmitter device and the receiver device based on a communication between the receiver device and the transmitter device. At 1306, the method 1300 may include adapting parameters of the transmitter device for wireless power transfer based on the device type and the distance. At 1308, the method 1300 may include transmitting wireless power from the transmitter device to the receiver device using adapted parameters, wherein, the wireless power is transferred using terahertz frequencies.

Figure 14:
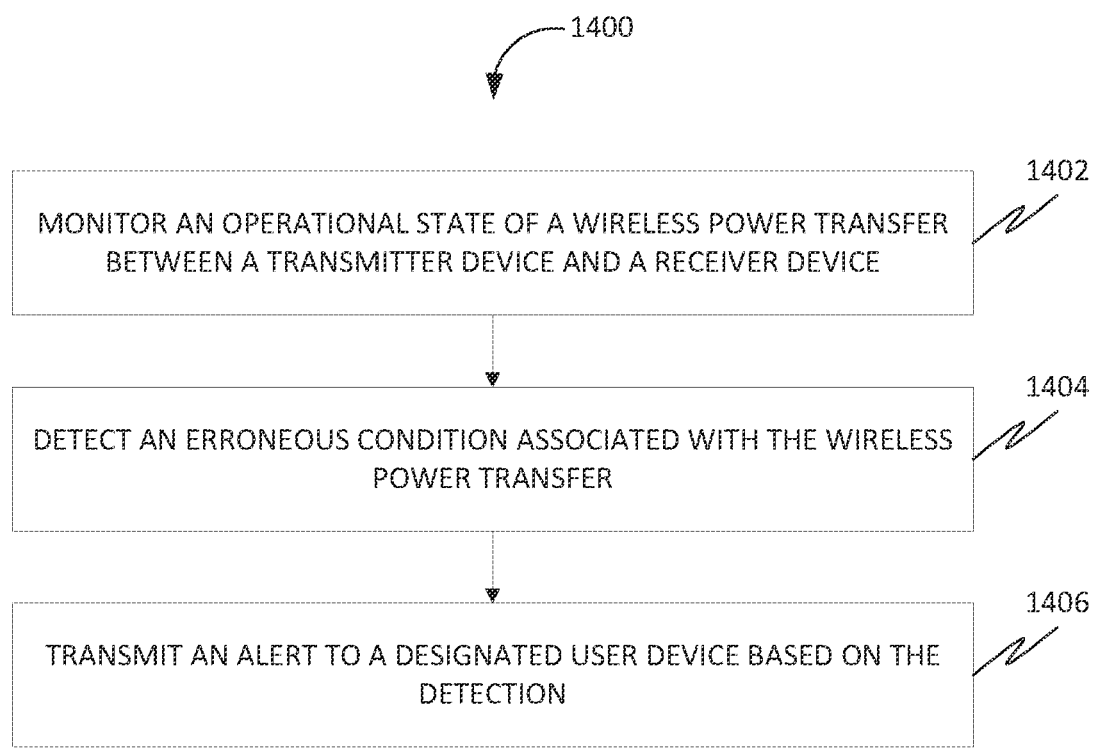
FIG. 14 illustrates a flowchart of a method of performing wireless power transfer using terahertz frequencies by transmitting an alert to a user device, in accordance with some embodiments.

FIG. 10 illustrates a system 1000 for facilitating wireless transfer of power configured to transmit an alert to a user device 1002 regarding the wireless transmission of power from a transmitter device 1004 to a receiver device 1006, in accordance with some embodiments. The alert may indicate an operational state of the wireless power transfer. For instance, during the pairing process, if there is any error, then the alert may be generated. As another example, if the receiver device 1006 is not receiving sufficient wireless power within a time period, the alert may be generated. The transmitter device 1004 and the receiver device 1006 are connected the WPN server 1008. Further, FIG. 14 illustrates a flowchart of a corresponding method 1400 of performing wireless power transfer using terahertz frequencies by transmitting an alert to a user device based on a detection of an erroneous condition associated with wireless power transfer, in accordance with some embodiments. Further, the transmitter device 1004 may include one or more satellites. Further, the one or more satellites may include one or more low earth orbiting satellites.

FIG. 11 illustrates wireless power transfer protocol stacks 1102-1104 associated with the transmitter device (such as the transmitter device 802, as shown in FIG. 8) and the receiver device (such as the receiver device 804, as shown in FIG. 8), in accordance with some embodiments. With reference to FIG. 11, a terahertz wireless power-based system may include a terahertz transmitter device (such as the transmitter device 802) and a terahertz receiver device (such as the receiver device 804). Further, the terahertz transmitter device may include one or more satellites. Further, the one or more satellites may include one or more low earth orbiting satellites. The terahertz transmitter device 802 may be connected and paired with the terahertz receiver device 804, and may send power to the terahertz receiver device 804 using a terahertz wireless signal according to a user instruction. The terahertz receiver device 804 may be used for receiving power sent by the terahertz transmitter device 802. The terahertz receiver device 804 may be within a terahertz wireless signal search range of the terahertz transmitter device 802.

Further, the terahertz transmitter device 802 and the terahertz receiver device 804 may be devices that support terahertz wireless power transmission. The terahertz transmitter device 802 and the terahertz receiver device 804 may be provided with three enabled functions: a first function, a second function, and a third function. As shown in FIG. 11, in order to distinguish conveniently, a first function, a second function and a third function of the terahertz transmitter device 802 may be respectively marked as 1106-1110 in the wireless power transfer protocol stack 1102. Similarly, a first function, a second function and a third function of the terahertz receiver device 804 may be marked as 1112-1116 in the wireless power transfer protocol stack 1104.

The first function 1106 and/or the first function 1112 may be a hardware layer, which may include a terahertz transceiver connected to WPN storage medium, wherein the terahertz transceiver 802 may be used for receiving and sending data using a terahertz wireless signal, and the WPN storage medium may be used for storing the terahertz receiver data. A storage medium may be a non-volatile data medium.

The second function 1108 and/or the second function 1114 may be a software layer, which may be used for implementing a function of a first function, such as a hardware layer. The second function 1108 and/or the second function 1114 may include a terahertz communication interface drive, a terahertz protocol stack, a data packing, and security engine, a file system and/or a storage drive.

Further, a terahertz communication interface drive may be used for controlling a terahertz transceiver to receive and send power and data. A terahertz transceiver may be used for receiving and sending power and data. A terahertz protocol stack may be used for performing protocol layer data processing on data. For example, a terahertz protocol stack may be used for performing such protocol layer data registration processing as a unique match, retransmission, unpacking or recombination and the like. A data packing and security engine may be used for packing, unpacking, encrypting and decrypting data, which may include packing, unpacking, encrypting and decrypting original data from the view of transmission efficiency and security.

Further, a store function may follow an existing storage mode. For example, a cloud-based storage may call a file access interface of a storage medium for a file system. A file system may provide a standard file access interface, such as a bulk transmission service manager or an application interactive interface, to a top-level function layer in an operating system.

When the terahertz transmitter device 802 externally transmits a data file, a storage drive may call a file access interface of a storage medium for a file system so as to read data stored in a storage medium. Data, after reading, may be transmitted to a data packing and security engine through a standard file access interface of a file system. Transmitted data may be packed and encrypted by a data packing and security engine and may flow in a terahertz communication protocol stack. After a terahertz communication protocol stack performs protocol layer data processing on data, a terahertz communication interface drive may control a terahertz transceiver to send the power transmission. When a terahertz storage device receives data, a terahertz communication interface drive may control a terahertz transceiver to receive the data, and may process the data using a terahertz communication protocol stack. Afterwards, data may be decrypted and unpacked by a data packing and security engine module to acquire original data. Data may be written in a storage medium through a file system and storage drive, thus, implementing storage of the data.

The third function 1110 and/or the third function 1116 may be an application interactive interface for user operation. A user may perform such operations as enabling, pausing or interrupting a data transmission process on an application interactive interface. During a power transmission process, the terahertz transmitter device 802 may prompt a user of a state and a parameter of a data transmission process. For example, a user may be presented some related indexes, such as power transmission progress, power transmission rate, error instruction, remaining time or file path, etc.

Further, the second function 1108 and/or the second function 1114 may include a specialized service layer, which may manage a wireless power transmission function to a terahertz receiver device. A service layer may be referred to bulk power transmission managed on the wireless power network (WPN). A WPN manages the bulk power transmission may be responsible for performing priority scheduling on power to be transmitted, and particularly, may manage structured bulk power transmission. For example, WPN power bulk transmission may preferentially transmit important or urgent power according to situations when a terahertz transmitter device transmits a lot of bulk power to a terahertz receiver device. When a terahertz transmitter device externally transmits power, WPN may manage the bulk power transmission may call a file access interface of a file system to read the data. Data to be read may be packed and encrypted by a data packing and security engine and may flow in a terahertz communication protocol stack. A terahertz communication protocol stack may perform protocol layer data processing on the data, and a terahertz communication interface drive may control a terahertz transceiver to send the data. The WPN connected to terahertz transmitter device may receive a data file according to a reverse of the foregoing process, wherein a terahertz communication interface drive may receive data, and may process the data using a terahertz communication protocol stack. Afterwards, data may be decrypted and unpacked by a data packing and security engine module to acquire original data, and the data may be written in a storage medium through a file system and a storage drive, thus, implementing storage of the data.

Compared with traditional relational databases, a bulk power transmission (WPN) may manage a structured bulk power transmission process and meet demands of structured bulk power processing and mining. Power Transmission may be based on structured bulk data, which may be information stored in a file system rather than a database. In mobile Internet development, a growing rate of unstructured data is far greater than that of structured data (e.g., data based on a relational database). A method for power transmission of the present disclosure may be based on unstructured bulk data, which caters to the mobile Internet development trend, and can better meet demands of unstructured bulk data processing and mining.

Further, terahertz wireless power-based methods and systems for power transmission may include a terahertz transmitter device and a terahertz receiver device placed within an effective distance to each other, and, by means of connection and neural match unique match between the terahertz transmitter device and the terahertz receiver device, power in the terahertz transmitter device may be transmitted to the terahertz receiver device via a terahertz wireless signal. Rapid transmission of data and power between terahertz devices is implemented, matched with a novel data interactive model in a terahertz WPN, and may perform data interaction quickly, stably and securely. In addition, optimization on a physical structure of a product may be implemented using WPN, thus, allowing completion of transmission and exchange of data in a scenario in which a transmission medium cannot be released.

Figure 12:
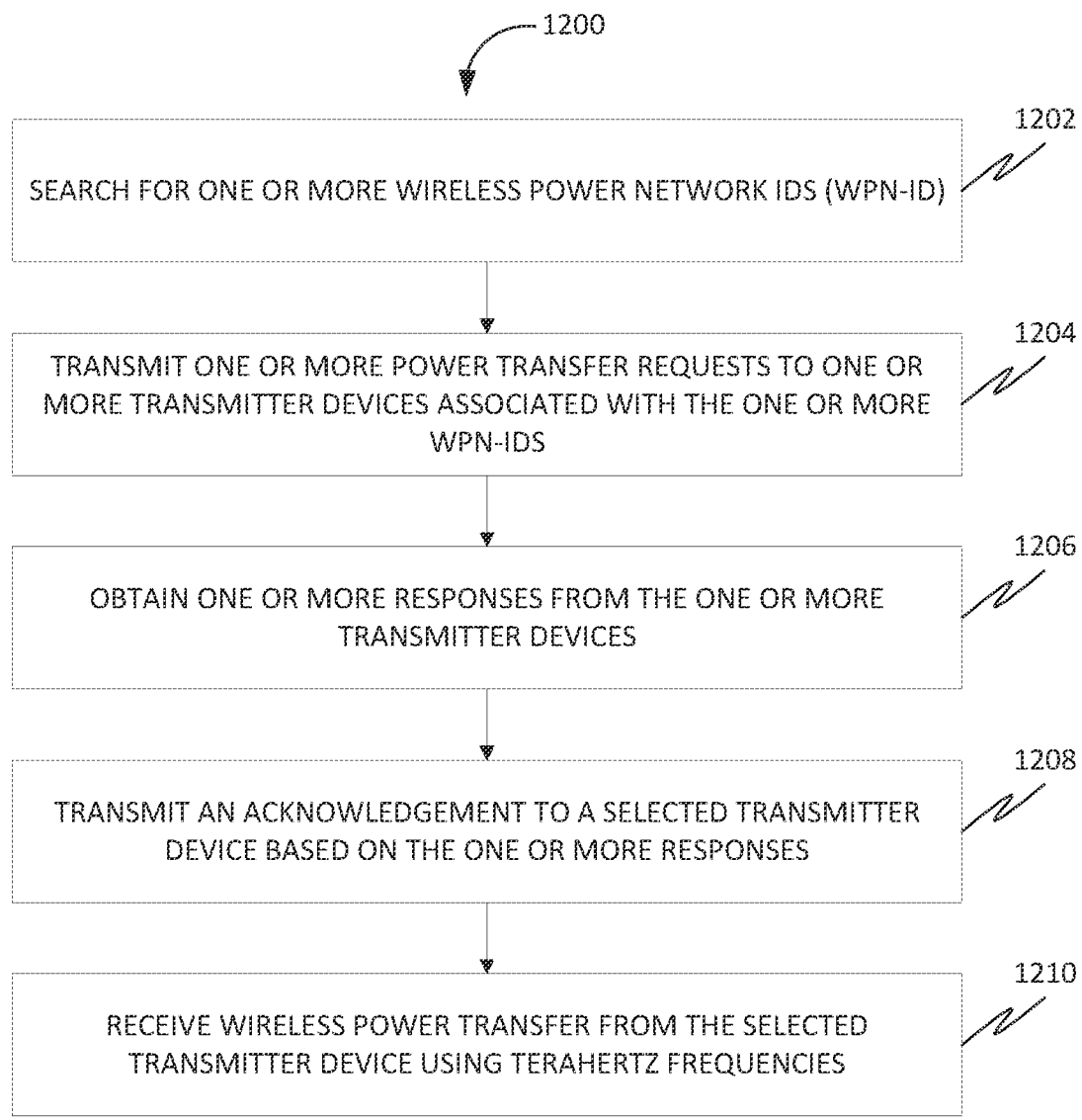
FIG. 12 illustrates a flowchart of a method of performing wireless power transfer using terahertz frequencies, in accordance with some embodiments.

FIG. 12 illustrates a flowchart of a method 1200 of performing wireless power transfer using terahertz frequencies based on a search for transmitter devices and pairing between a transmitter device (such as the transmitter device 802, as shown in FIG. 8) and a receiver device (such as the receiver device 804, as shown in FIG. 8), in accordance with some embodiments.

At 1202, the method 1200 may include searching for one or more Wireless Power Network IDs (WPN-ID). Further, at 1204, the method 1200 may include transmitting one or more power transfer requests to one or more transmitter devices associated with the one or more WPN-IDs. Further, the one or more transmitter devices may include one or more satellites. Further, the one or more satellites may include one or more low earth orbiting satellites. Further, at 1206, the method 1200 may include obtaining one or more responses from the one or more transmitter devices. Then, at 1208, the method 1200 may include transmitting an acknowledgment to a selected transmitter device based on the one or more responses. Next, at 1210, the method 1200 may include receiving wireless power transfer from the selected transmitter device using terahertz frequencies.

Also provided herein, is a connection and unique match process for use in a terahertz wireless power-based method for power transmission is depicted. The process may include detecting, by a terahertz transmitter device, whether a terahertz receiver device includes a function for transmitting power through a terahertz wireless signal. This method uniquely matches two or more system elements using a terahertz signal or a waveform.

When a terahertz transmitter and terahertz receiver device are placed within an effective distance, the terahertz transmitter device may detect whether the terahertz receiver device is effective. The former may detect whether the latter may receive power through a terahertz wireless signal. The process may be mutual. A terahertz receiver device may detect whether a terahertz transmitter device is effective.

When a terahertz transmitter device and terahertz receiver device are matched, the first and the terahertz receiver devices may respectively receive an operation instruction from a user to perform connection and unique match. When a terahertz transmitter device and terahertz receiver device are not matched, a user may be presented with an error. Subsequent to an initial failure to be matched, a user may select to retry.

When a terahertz receiver device is an effective one, the connection and unique match may be performed between a terahertz transmitter device and the terahertz receiver device. The unique match may be performed through exchanging unique match registration codes between terahertz transmitter and terahertz receiver devices. Unique match registration codes exchange may refer to two devices mutually validating unique match registration codes. When unique match registration codes of terahertz transmitter device and terahertz receiver device are identical to each other, the two may be mutually validated. Security validation for power transmission may be acquired such that power transmission may be performed securely. A connection and unique match process may ensure security and reliability of a power transmission. When it is detected that a terahertz receiver device does not have a function for transmitting data and receiving power through a terahertz wireless signal, invalidity of the terahertz receiver device may be presented to a user, and the user may select whether to retry.

Further disclosed herein, is a power transmission process for use in a terahertz wireless power-based method for power transmission. When connection and paring are successful, a terahertz transmitter device may select data according to a user instruction. A user may select data to be transmitted in advance, and a terahertz transmitter device may select data according to the selection of the user.

Further, the power transmission process may include enabling a terahertz transmitter device according to user instruction. Subsequent to a user selecting power to be transmitted, a terahertz transmitter device may prompt the user whether to enable a power transmission process, and may perform a power transmission process if the user selects yes. Alternatively, a user, after finding that selected power is wrong, may select to not enable a power transmission process, and may correct data for transmission.

Further, the power transmission process may include determining, by a terahertz transmitter device, whether a state of a power transmission process is normal. For example, a terahertz transmitter device may determine whether a state of a power transmission process is normal. Indices for reference may include transmission progress, transmission rate, and the like. A user may view whether a power transmission process is normal, and when a problem exists, the user may correct the problem.

When a state of a power transmission process is normal, a terahertz transmitter device may continue, pause or interrupt the data transmission process according to a user instruction. When a state of a power transmission process is abnormal, a user may be presented a power transmission error and/or may be prompted to retry power transmission. Subsequent to an initial power transmission error, a user may reselect data so as to realize power transmission. A user may be provided with an application interactive interface on which the user may perform such operations as enabling, pausing or interrupting a power transmission process. A terahertz transmitter device may prompt a user of a state and a parameter of a power transmission process. For example, a user may be prompted with some related indexes, such as power transmission progress, power transmission rate, error instruction, or remaining time, etc.

Further, a terahertz transmitter device may function as a master. A terahertz receiver device may not function as a master. A user may operate a terahertz receiver device, and the terahertz receiver device may enable, continue, pause or interrupt a power transmission process according to a user instruction. Alternatively, a terahertz receiver device may detect a state of a power transmission process. Two terahertz devices operate as a master-slave relationship with the transmitter being the master.

Further, in some embodiments, the method of performing wireless power transfer using terahertz frequencies may include transmitting an alert to a user device based on a detection of an erroneous condition associated with wireless power transfer, as illustrated in FIG. 8. Accordingly, one or more of the transmitter device and the receiver device may monitor an operational state of the wireless power transfer process at 1402. Further, based on the monitoring, an erroneous condition may be detected at 1404. For example, if the receiver device does not receive a response from the transmitter device within a predetermined time period of transmitting a request for power transfer, the receiver device may detect the erroneous condition. Similarly, as another example, the transmitter device may sense a load on the transmitter antenna during the wireless transfer process and based on the sensing, the transmitter device may determine an erroneous condition at the receiver device that is preventing normal power transfer. Accordingly, based on the detection of the erroneous condition, one or more of the transmitter device and the receiver device may generate and transmit an alert to a designated user device through a WPN server at 1406.

Figure 15:
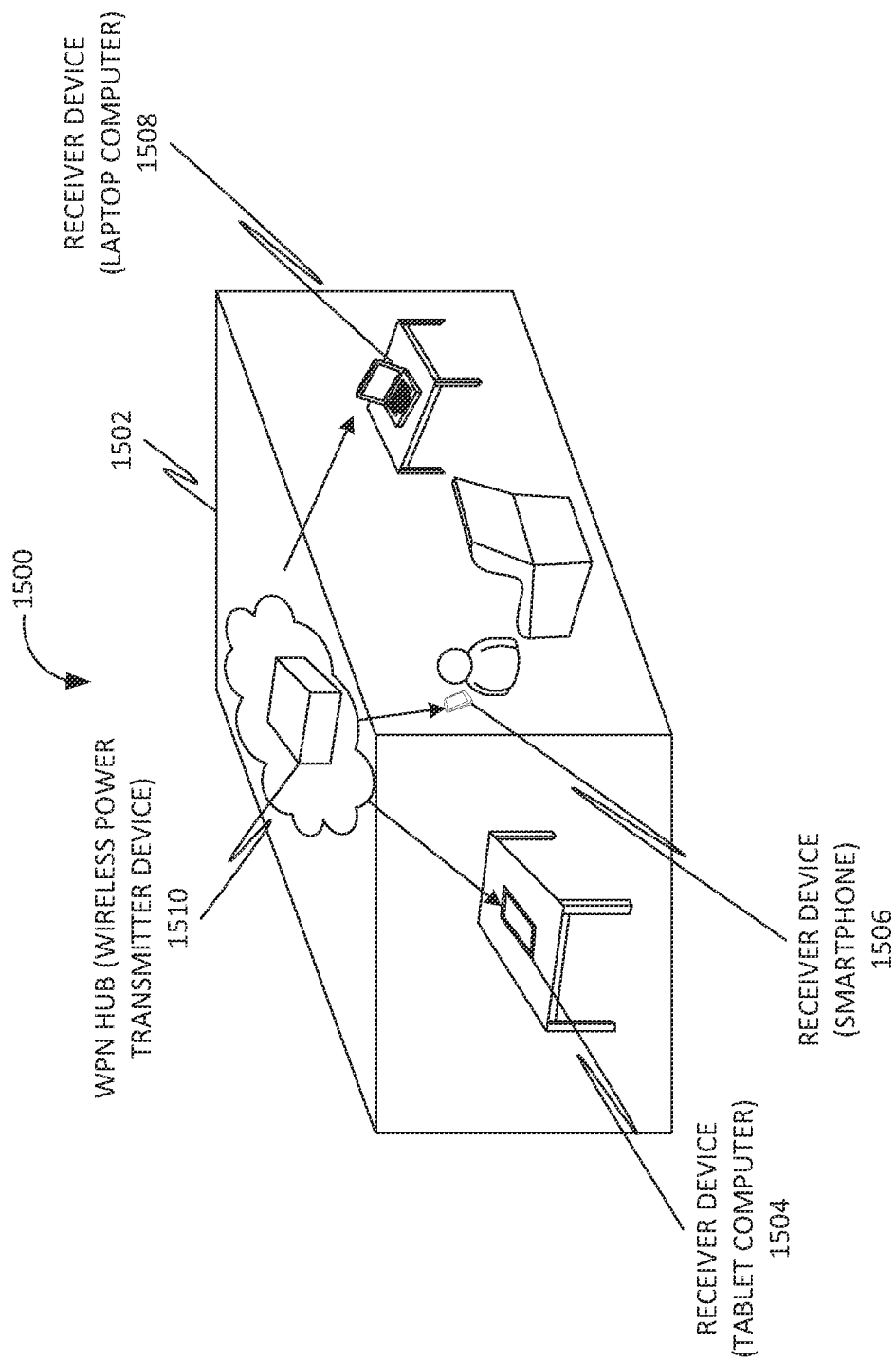
FIG. 15 illustrates an environment in which the disclosed systems and methods may operate, in accordance with some embodiments.

FIG. 15 illustrates an environment 1500 in which the disclosed systems and methods may operate, in accordance with some embodiments. The environment 1500 may include a room 1502 in which there is are multiple receiver devices 1504-1508 (electronic devices). Further, the environment 1500 may include a transmitter device 1510 configured to wirelessly transmit power (using terahertz frequencies) to the multiple receiver devices 1504-1508. Further, the transmitter device 1510 may include one or more satellites. Further, the one or more satellites may include one or more low earth orbiting satellites.

Figure 16:
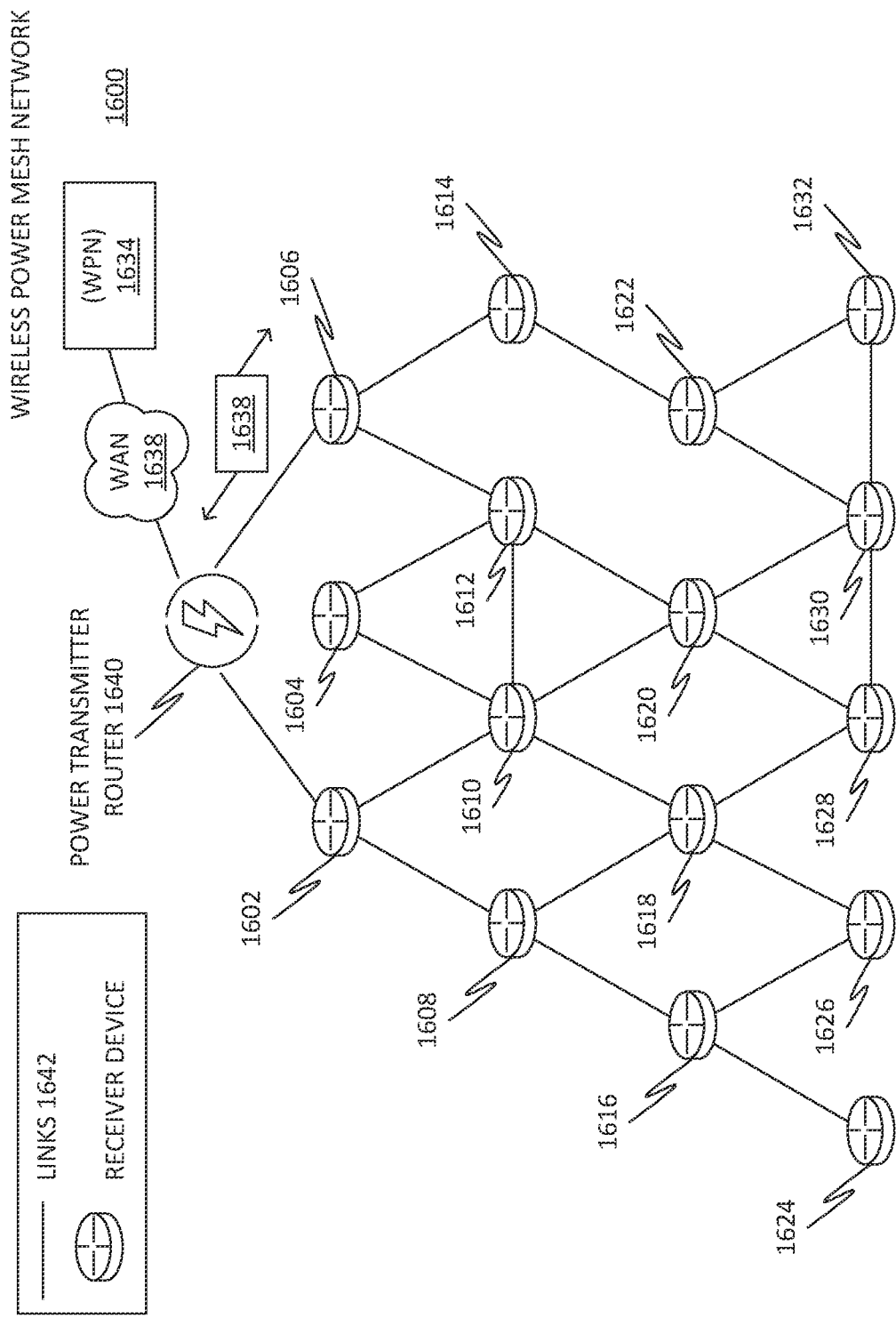
FIG. 16 illustrates an example of a blockchain based wireless power mesh network that enables a far field and near field ultra-fast wireless power transmission, in accordance with some embodiments.

According to some embodiments, the present disclosure provides an example of a blockchain-based wireless power transmission network. FIG. 16 is a schematic block diagram of an exemplary computer network 1600 illustratively comprising one or more nodes/devices 1640, receiver devices 1602-1632, and a wireless power mesh network (WPN) server 1634, all of which may be interconnected by various methods of communication. For instance, they may be interconnected via wired links or shared media such as wireless links, PLC links, and so on (links 1642), where certain receiver devices in the receiver devices 1602-1632, such as, e.g., drones, sensors, smartphones, notebook computers, etc., may be in communication with other receiver devices in the receiver devices 1602-1632 based on distance, signal strength, current operational status, location, etc. Further, the receiver devices 1602-1632 may communicate with any number of external devices, such as wireless power mesh network server(s) 1634 over a network 1636, which may be a WAN in some implementations. For example, the receiver device 1126 may send sensor data to WPN server 1634 for further processing, either via a local network or via a WAN. WPN server 1634 may include but may not be limited to wireless power mesh network management system (WPNMS) devices, supervisory control, and data acquisition (SCADA) devices, enterprise resource planning (ERP) servers, other network administration devices, or the like. Further, one or more utility tokens, that may represent access to one or more products or services may reside on any one or more receiver devices in the receiver devices 1602-1632, such as Internet of Things (IoT) devices, drones, mobile electronic devices, smartphones, wearables, tablets, gaming consoles and controllers, e-book readers, remote controls, sensors (in automobiles or such as thermostats), autonomous vehicles and so on. The one or more nodes 1640, and the receiver devices 1602-1632 may exchange data packets 1638 (e.g., location and/or messages sent between the devices/nodes) using predefined network communication protocols such as certain known wired protocols, wireless protocols (e.g., IEEE Std. 802.15. 4, Wi-Fi, Bluetooth, and so on), PLC protocols, or other shared media protocols where appropriate. In this context, a protocol may consist of a set of rules that may define how the one or more nodes/devices may interact with each other.

Figure 17:
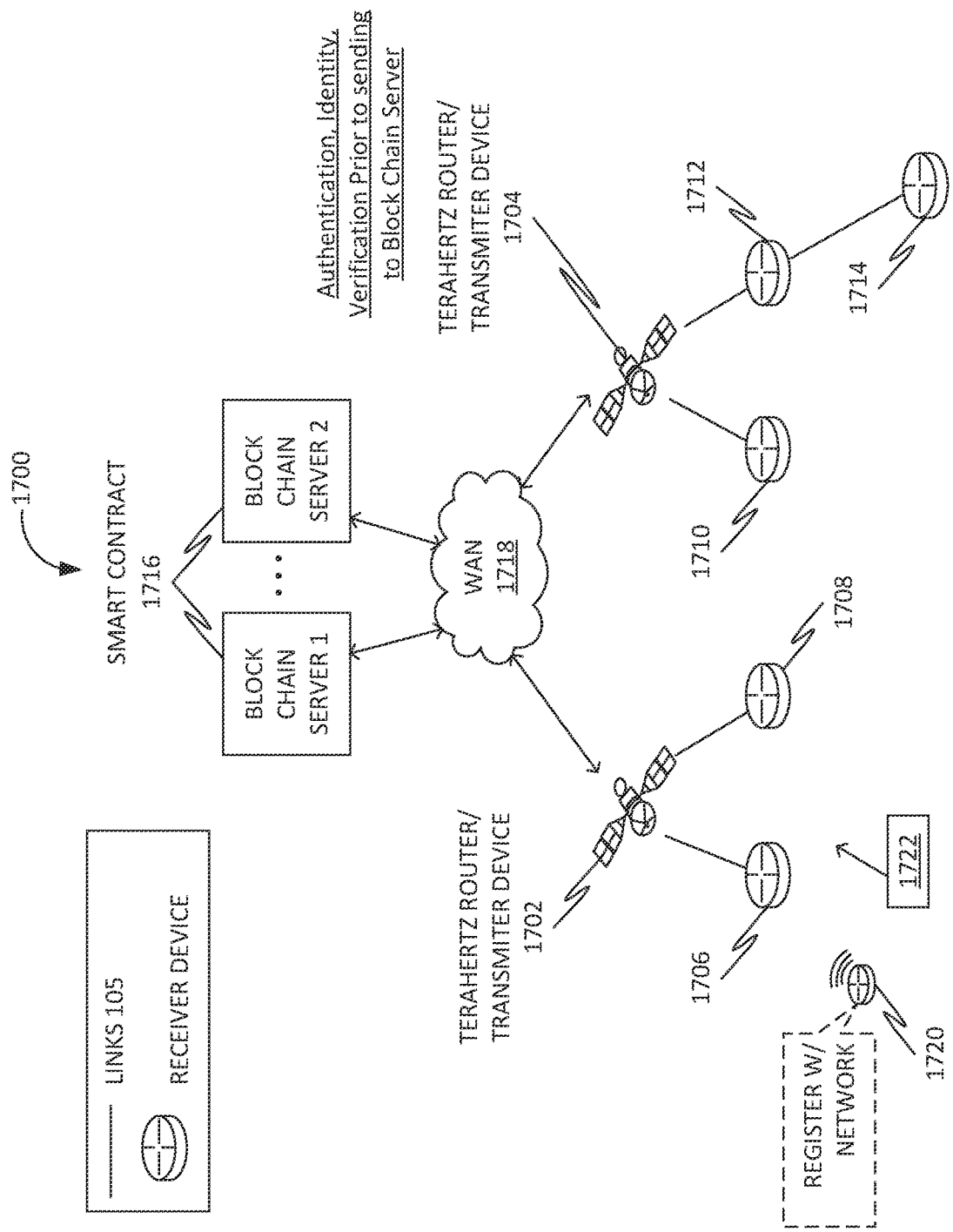
FIG. 17 illustrates blockchain receiver node registration with a wireless power mesh network, in accordance with an exemplary embodiment.
Figure 18:
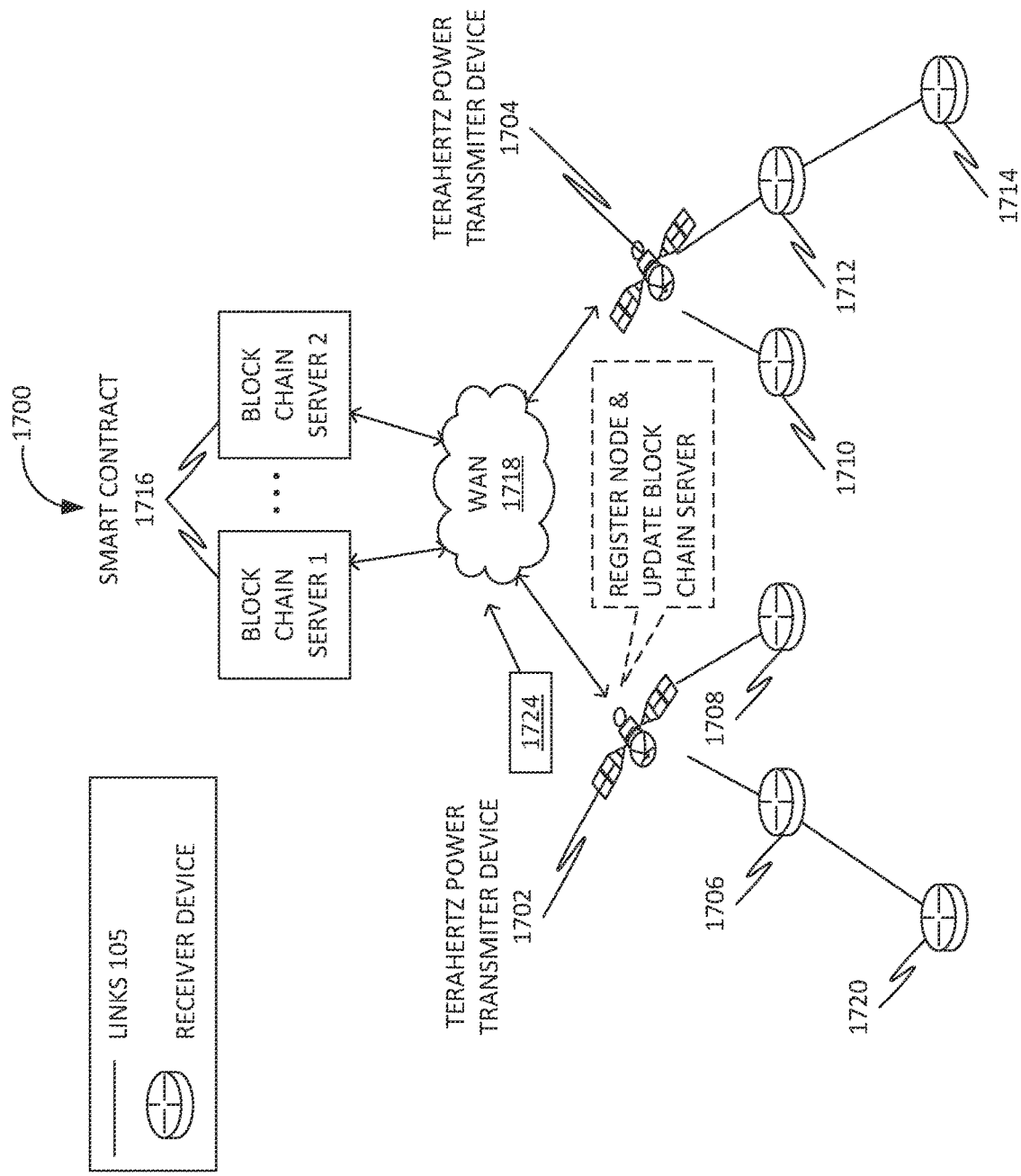
FIG. 18 illustrates blockchain receiver node registration with a wireless power mesh network, in accordance with the exemplary embodiment.
Figure 19:
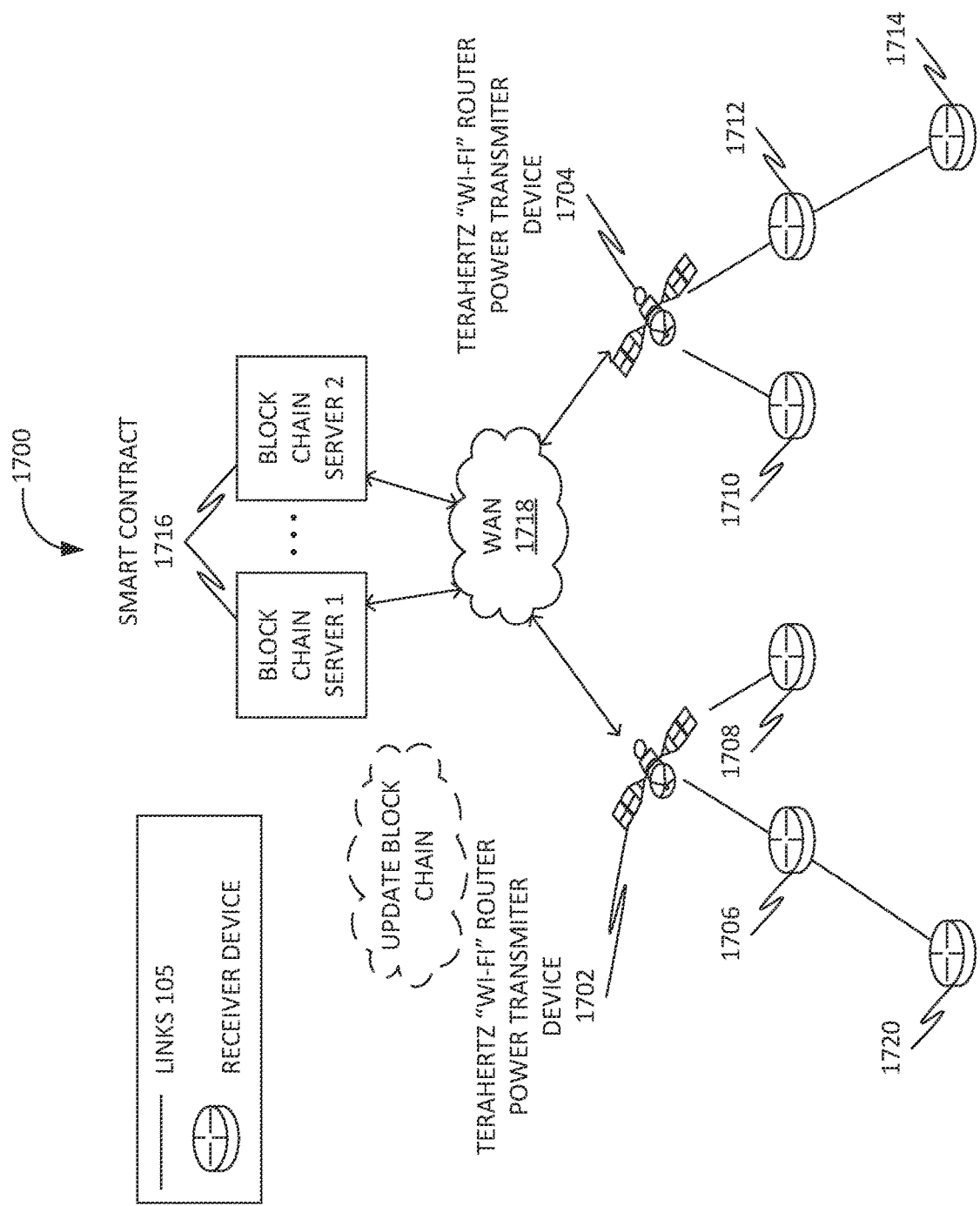
FIG. 19 illustrates blockchain receiver node registration with a wireless power mesh network, in accordance with the exemplary embodiment.

FIGS. 17-19 show an exemplary embodiment of a system 1700 to facilitate wireless charging of IoT devices and electronic devices, displaying one or more receiver devices registering with a network. Accordingly, as shown in FIG. 17, a network may include one or more power transmitter devices 1702-1704. Further, the one or more power transmitter devices 1702-1704 may include one or more satellites. Further, the one or more satellites may include one or more low earth orbiting satellites. In some embodiments, the devices 1702-1704 may include routers (e.g., terahertz power transmitter/router etc.) located on the edges of local networks may comprise of one or more IoT nodes or receiver devices. For instance, receiver devices 1706-1708 may be registered with the power transmitter device 1702 forming a first local network and receiver devices 1710-1714 may be registered with the power transmitter device 1704 forming a second local network. Further, as shown, the power transmitter devices 1702-1704 may be in communication with one or more blockchain servers 1716 through WAN 1718, that may host a blockchain network. In some embodiments, the one or more blockchain servers 1716 may be configured as smart-contracts, as self-executing pieces of code, which may be stored in the blockchain network. The smart contracts may stipulate one or more terms of the agreement between one or more devices of the network, such as receiver devices, power transmitter routers, and so on. Smart contracts may further define which actions may be executed upon fulfillment of certain conditions and may be configured to communicate in a peer-to-peer manner to share blockchain information with one or more blockchain servers. The smart contracts may mandate maintaining constant receiver connection thus eliminating sleep mode resulting in constant power stream. This may help enhance power battery storage resulting with increased functionality. The smart contract may be incorporated in a Wireless Power Protocol. Moreover, artificial intelligence (AI) may be used to perform one or more of enhance power transmission efficiency and enhance power storage.

Generally, the blockchain may comprise information about one or more devices that may join the network, such as through registration with the power transmitter devices 1702-1704. In some embodiments, the blockchain may be stored on one or more devices registered on the network, such as power transmitter devices, power receiver devices, and so on. Further, if a new receiver device, such as the receiver device 1720 attempts to register with the power transmitter device 1702, the receiver device 1720 may send a registration request 1722 that may include identification information for the receiver device 1720 and/or any other metadata relating to the receiver device 1720 towards the power transmitter device 1702. For instance, a registration request 1722 may include one or more of receiver device ID, receiver device type, and information about one or more access tokens or utility tokens, group ID, identity trust level, timestamp, and so on.

Further, as shown in FIG. 18, the power transmitter device 1702 may process registration request 1722 from the node and register the transaction with the blockchain by sending a notification 1724 to the blockchain server 1716. In some embodiments, the power transmitter device 1702 may already be registered and present in the blockchain (e.g., as updated via a registrar) with a high trust level (e.g., based on the transaction). The power transmitter device 1702 may include any or all of the receiver device information from registration request in the notification 1724. Further, the power transmitter device 1702 may also include any other information regarding node 1720 obtained from the local network or independently by the power transmitter/router device 1702. In some embodiments, the notification 1724 may also include one or more digital signatures, for purposes of ensuring that edge device 1702 actually sends the notification 1724, ensuring that the information was originally provided by the node 1720, etc. Based on the notification 1724, any number of network devices (e.g., blockchain server 1716, other devices, etc.) may validate the information regarding the receiver device 1720. For example, as shown in FIG. 19, a blockchain server 1716 or another device in communication therewith (e.g., a power transmitter device, etc.) may act as a validator for the information included in the notification 1724. In some embodiments, a local validator may be used by the device seeking validation (e.g., power transmitter device 1, receiver device A, etc.), to restrict public key distribution. Further, in other embodiments, a standalone validator may be used for validation. To process the notification 1724, the validator may use of one or more public keys associated with a digital signature in the notification 1724, thereby ensuring that the notification 1724 may have been sent by the trusted power transmitter 1702. Then, in turn, the validator may compare the information regarding the receiving device 1720 to the blockchain, to ensure the validity in view of what may be already known about the receiver device 1720 in the blockchain.

Finally, as shown in FIG. 19, the blockchain server 1716 may update the blockchain through a smart contract and add the details regarding the receiver device 1720 to the blockchain based on the validation. Further, all the other nodes/devices in the network may have access to the information about the receiver device 1720 through the blockchain. Accordingly, the distribution of the blockchain may allow all nodes/devices to verify the identity of the receiver device 1720 such as when the receiver device 1720 may migrate to another local network, to detect anomalies (such as by comparing profile information or other behavioral information regarding the receiver device 1720 stored in the blockchain to an observed behavior of the receiver device 1720 and to perform other functions using the shared information about the receiver device 1720.

Further, upon of registration of the receiver device 1720 with the power transmitter device 1702, the receiver device 1720 may be able to receive power wirelessly from the power transmitter device 1702. Accordingly, the resultant change in power and all similar updates related to the power level of the receiver device 1720 may be updated on the blockchain. The updates in the blockchain may be made by the power transmitter device 1702. Alternatively, the receiver device 1720 may also update the blockchain. However, in some embodiments, the receiver device 1720 may not have enough power to update the blockchain. Accordingly, the change in power and all similar updates related to the power level of the receiver device 1720 may be stored on an intermediary device and may be updated on the blockchain.

Further, in some embodiments, the blockchain may be hosted on one or more receiver devices on the network based on a power level of the one or more receiver devices. Accordingly, one more power transmitter devices to which the one or more receiver devices may be connected may constantly retrieve a power level of the one or more receiver devices. Accordingly, if the one or more receiver devices are below a predetermined level of power, the blockchain may not be hosted on the one or more receiver devices.

Further, in some embodiments, the blockchain may not be hosted on one or more receiver devices on the network owing to a possibility that the one or more receiver devices may not have a required power level to stay connected on the network, which may lead to an unreliable blockchain network, which may not be accessible when the one or more receiver devices do not have enough power level to stay powered on to be able to host the blockchain.

Further, in an embodiment, a blockchain network may also include a cryptocurrency associated with the blockchain network. The cryptocurrency tokens may be stored on one or more receiver devices. Accordingly, the one or more receiver devices may have to transmit one or more cryptocurrency tokens to a wallet associated with one or more power transmitter devices to receive power. The number of tokens that may need to be transferred to the one or more wallets of the one or more power transmitting devices may depend on the amount of power that the one or more power receiver devices may need to receive. Accordingly, details about the transfer of the one or more cryptocurrency tokens may be stored on the blockchain network.

Figure 20:
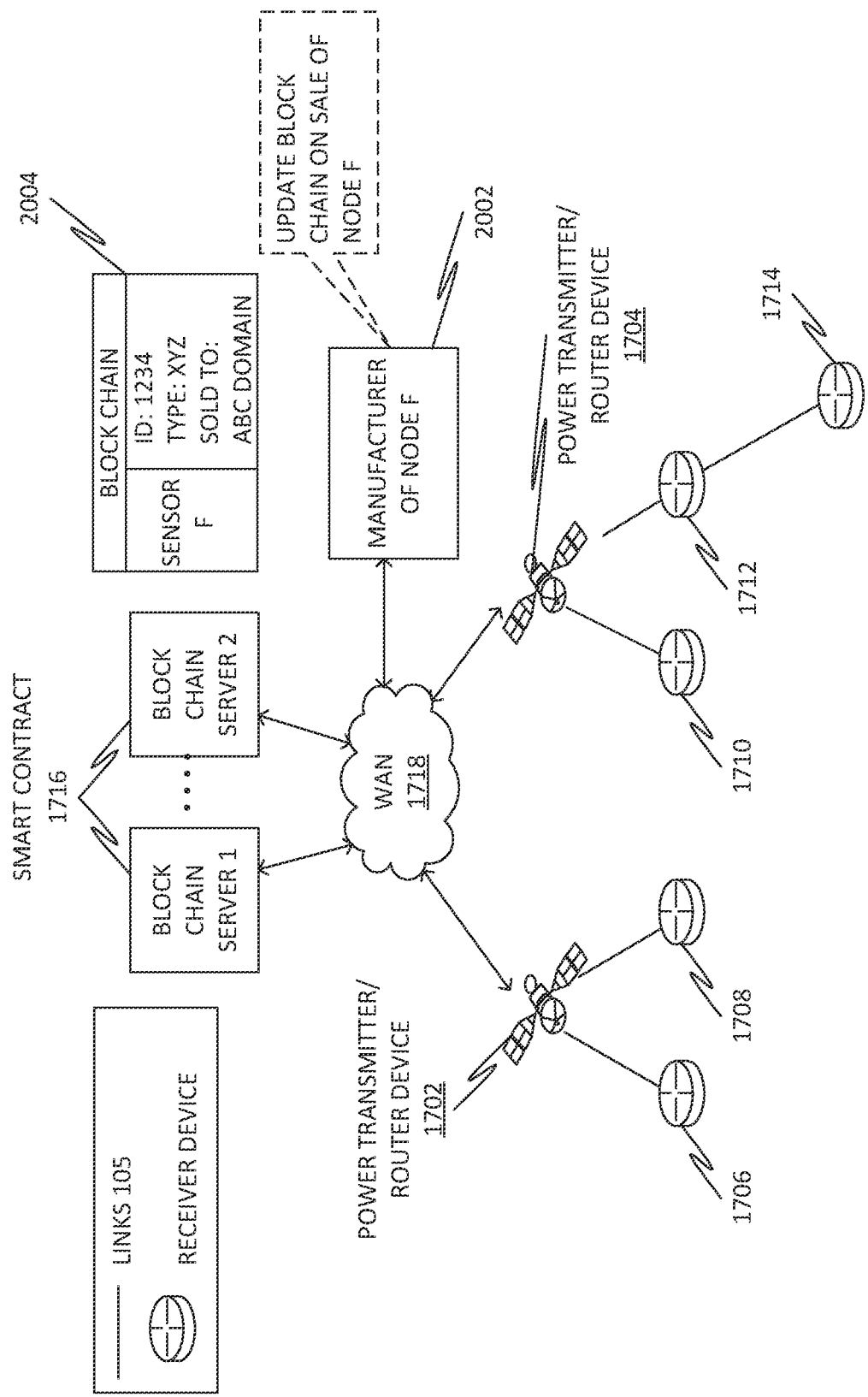
FIG. 20 illustrates power transmitter node validation using a blockchain, in accordance with an exemplary embodiment.

FIGS. 20-24 illustrate further examples of receiver device validation using a blockchain, according to various embodiments. As shown in FIG. 20, a server 2002 may be associated with a manufacturer of the receiver device 1720 (node F) and the server 2002 may have a high level of trust in the blockchain. In some embodiments, the server 2002 may update the blockchain (e.g., blockchain 2004) to record information regarding the receiver device 1720 as part of a sales transaction. For example, the server 2002 may send a blockchain update that may record that the receiver device 1720 may have an ID of 1234, is of node type XYZ, and was sold to the ABC domain. In some embodiments, the server 2002 may also digitally sign the update using a private key, allowing one or more validators to verify that the update may have been performed by the server 2002 using a corresponding public key of the server 2002.

Figure 21:
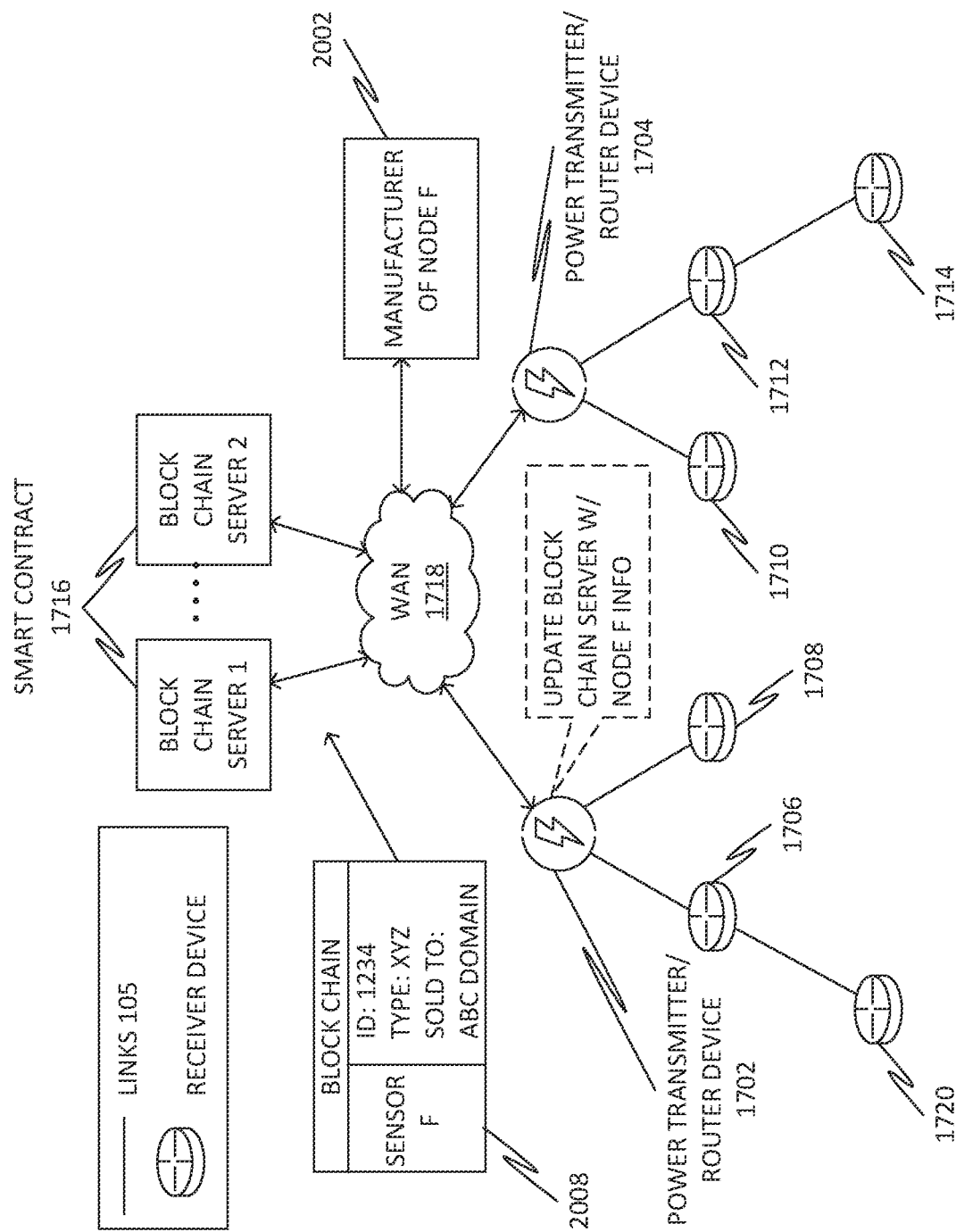
FIG. 21 illustrates power transmitter node validation using a blockchain, in accordance with the exemplary embodiment.

Further, as shown in FIG. 21, if receiver device 1720 attempts to register with a local domain of the power transmitter device 1702, in a similar manner as illustrated in FIGS. 17-19. In response to the registration request from the receiver device 1720, the power transmitter 1702 may send a notification 2008 that may include information from the registration request and/or any additional information regarding receiver device 1720, such as the identity of the local domain of transmitter/router 1702. Particularly, the notification 2008 may include information regarding network registration transaction, to update the blockchain. Further, the power transmitter 1702 may also use the information from receiver device 1720 to validate against any existing details that may already be available in the blockchain, such as existing details set by the manufacturer of the receiver device 1720. Once the receiver device 1720 is registered to the local domain of the power transmitter device 1702, the power device 1702 may then update the information pertaining to the receiver device 1720 in the blockchain accordingly.

Figure 22:
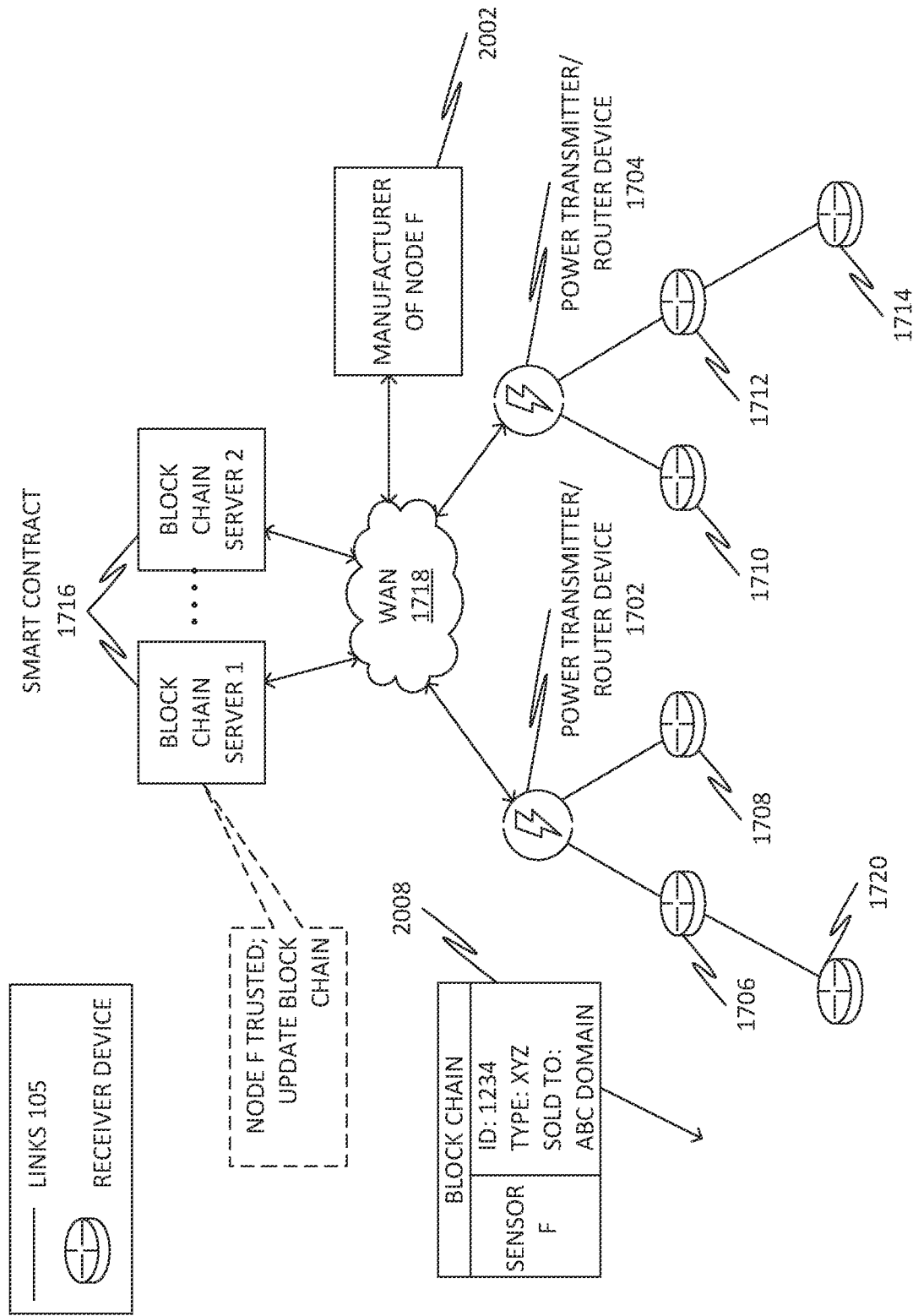
FIG. 22 illustrates power transmitter node validation using a blockchain, in accordance with the exemplary embodiment.
Figure 23:
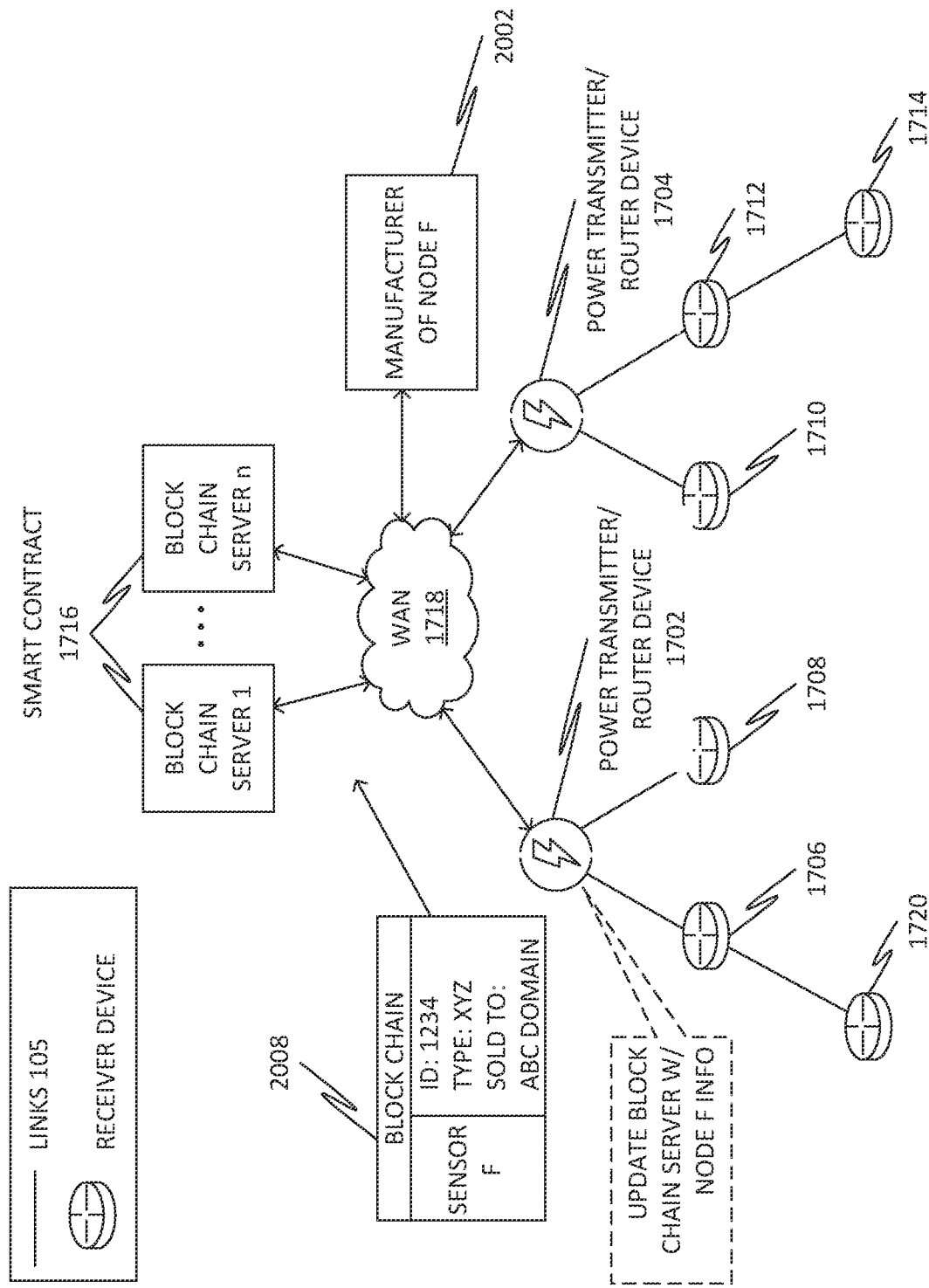
FIG. 23 illustrates power transmitter node validation using a blockchain, in accordance with the exemplary embodiment.
Figure 24:
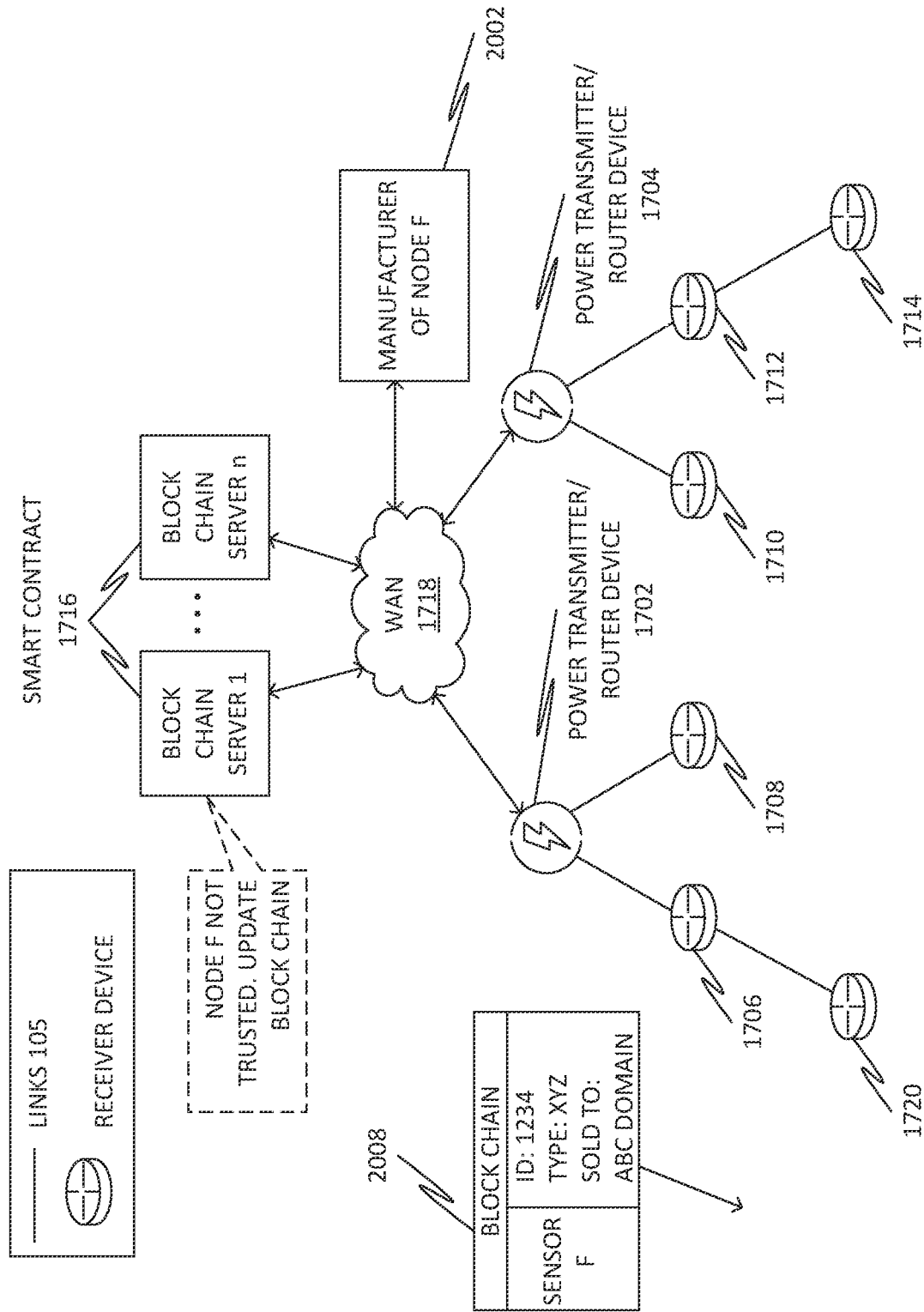
FIG. 24 illustrates power transmitter node validation using a blockchain, in accordance with the exemplary embodiment.

FIG. 22 shows a comparison of the information present in the notification 2008 from the power transmitter device 1702 against the blockchain by a validator to determine a level of trust for receiver device 1720. For instance, if the server 2002 updates the blockchain to indicate that the manufacturer of receiver device 1720 may have sold the receiver device 1720 to the operator of a particular domain. In turn, the validator may compare the reported domain in the notification 2008 against the existing blockchain, to determine whether information about the two domains may match. If a match is found in the compared information, the validator may update the blockchain with the information in the notification 2008 and set a high trust level for node 1720 in the blockchain. Alternatively, as shown in FIG. 23, if the reported domain in the notification 2008 is different than the existing information stored on the blockchain, the validator may determine that there is a mismatch between the reported domain and the existing information in the blockchain regarding the receiver device 1720. In particular, based on the blockchain, the validator may determine that the receiver device 1720 may be attempting to register with a domain that may differ from the domain previously reported by the manufacturer of the receiver device 1720 in the blockchain. In turn, the validator may update the blockchain with the information about receiver device 1720 and also assign a low level of trust to the receiver device 1720 due to the discrepancy. Further, validator devices in the network may leverage the information stored in the blockchain regarding the one or more receiver devices to control and assess the behavior of the one or more receiver devices. For instance, a validator device may prevent a receiver device with a low level of trust from performing certain functions (e.g., communicating with certain devices, etc.). In one embodiment, a device that receives a request from a particular receiver device may make use of the blockchain to authenticate the requesting receiver device. Based on the results of the authentication, the device may control how the request may be processed. In further cases, the blockchain may carry behavioral information regarding a particular receiver device, such as the location profile of the one or more receiver devices or other observations regarding the one or more receiver devices. In some embodiments, devices in the network may then use the behavioral information to assess whether the current behavior of the one or more receiver devices may be anomalous or otherwise unexpected. FIG. 24 illustrates power transmitter node validation using a blockchain, in accordance with the exemplary embodiment.

Figure 25:
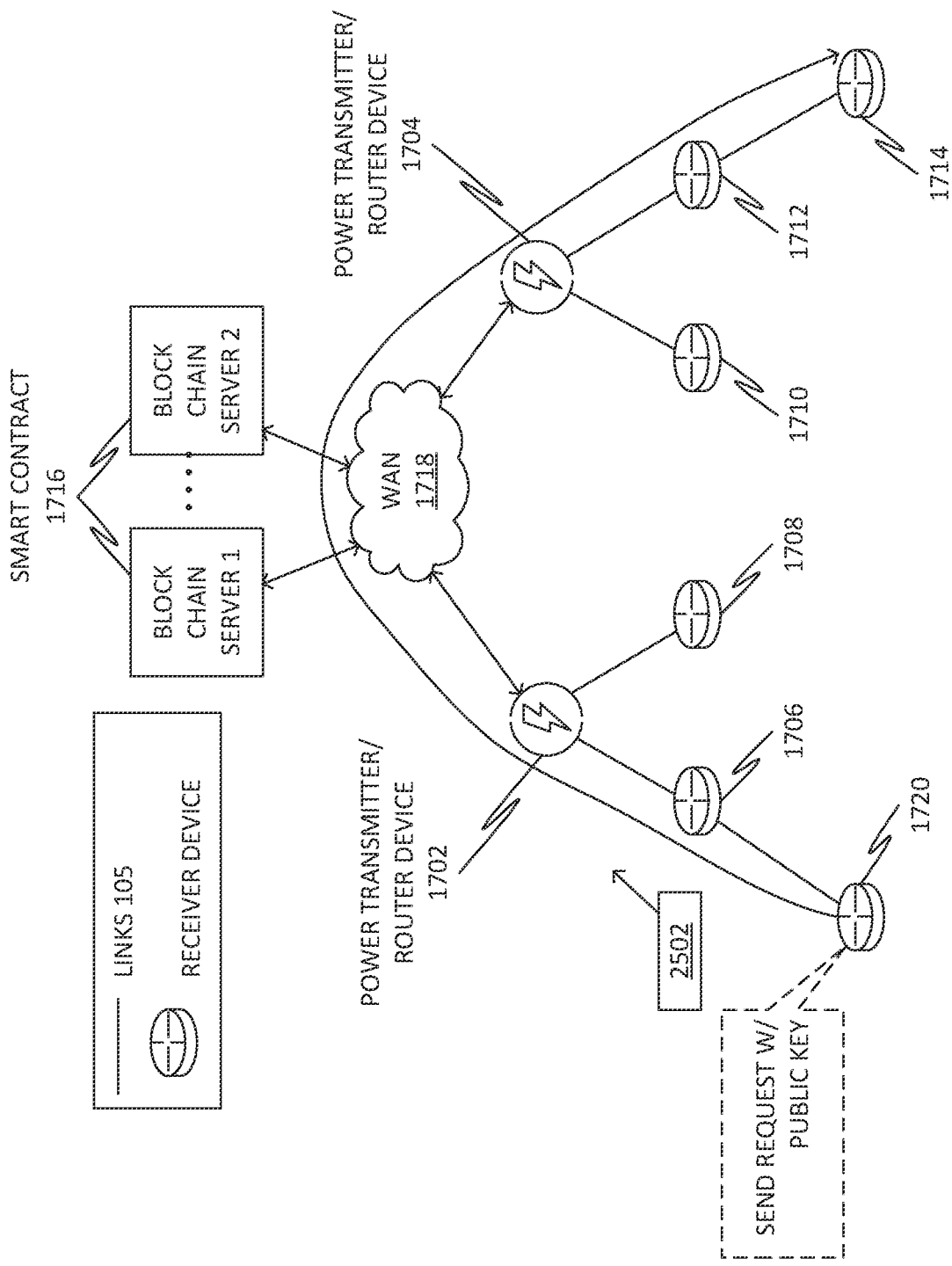
FIG. 25 illustrates power transmitter device node using blockchain to authenticate, identify, and verify a unique paring request, in accordance with an exemplary embodiment.
Figure 26:
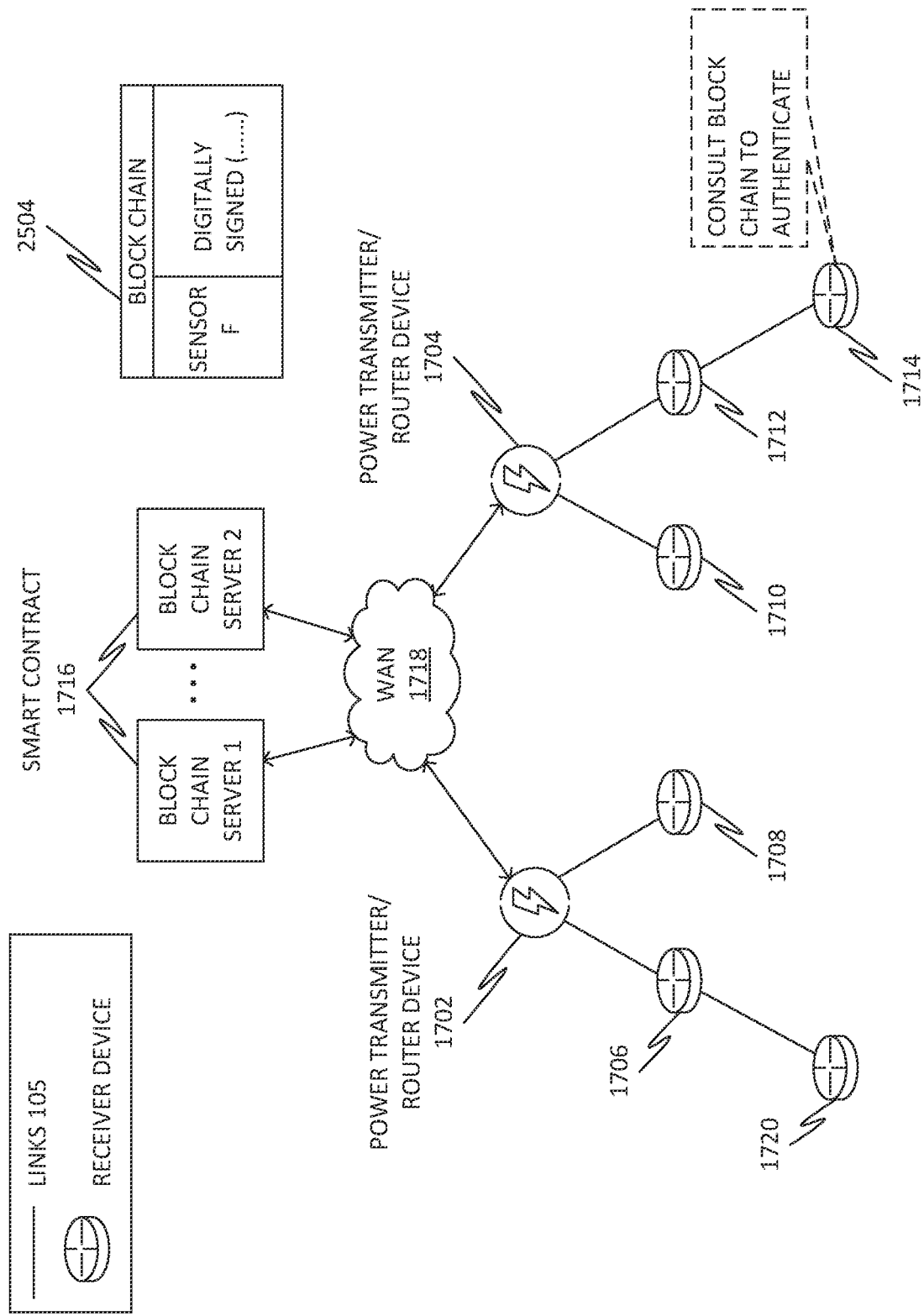
FIG. 26 illustrates power transmitter device node using blockchain to authenticate, identify, and verify a unique paring request, in accordance with the exemplary embodiment.

FIGS. 25-26 illustrate examples of a device using a blockchain to authenticate a request, according to various embodiments. As shown in FIG. 25, if the receiver device 1720 registers with a local network associated with power transmitter device, the receiver device 1720 may transmit one or more requests or messages (e.g., reporting sensor data, etc.) to one or more receiver devices either in the same local network or in a remote network. For instance, if receiver device 1720 sends a request 2502 to receiver device 1714 in the remote network associated with power transmitter device, as part of the request 2502, the receiver device 1720 may also send or otherwise publish a public key. For example, receiver device 1714 may challenge receiver device 1720 the public key of receiver device 1720, which the receiver device 1720 may send through a corresponding application program interface (API)-based response.

As shown in FIG. 26, the receiver device 1714 may use the public key from the receiver device 1720 to decipher the information in the blockchain regarding the receiver device 1720. For instance, the receiver device 1714 may validate and confirm the identity of the receiver device 1720 by using the public key to decipher the digitally signed data regarding the receiver device 1720 in blockchain 2504. If the receiver device 1714 is unable to do so, the receiver device 1714 may take any number of remediation measures, such as dropping the request 2502, sending a security alert to a supervisory device, etc. Conversely, if the receiver device 1714 is able to authenticate the identity of the receiver device 1720, the receiver device 1714 may authorize the data session with the receiver device 1720. In some embodiments, the receiver device 1714 may further assess the trust level of the receiver device 1720 in the blockchain and apply a lower weight to any data from the receiver device 1720.

Figure 27:
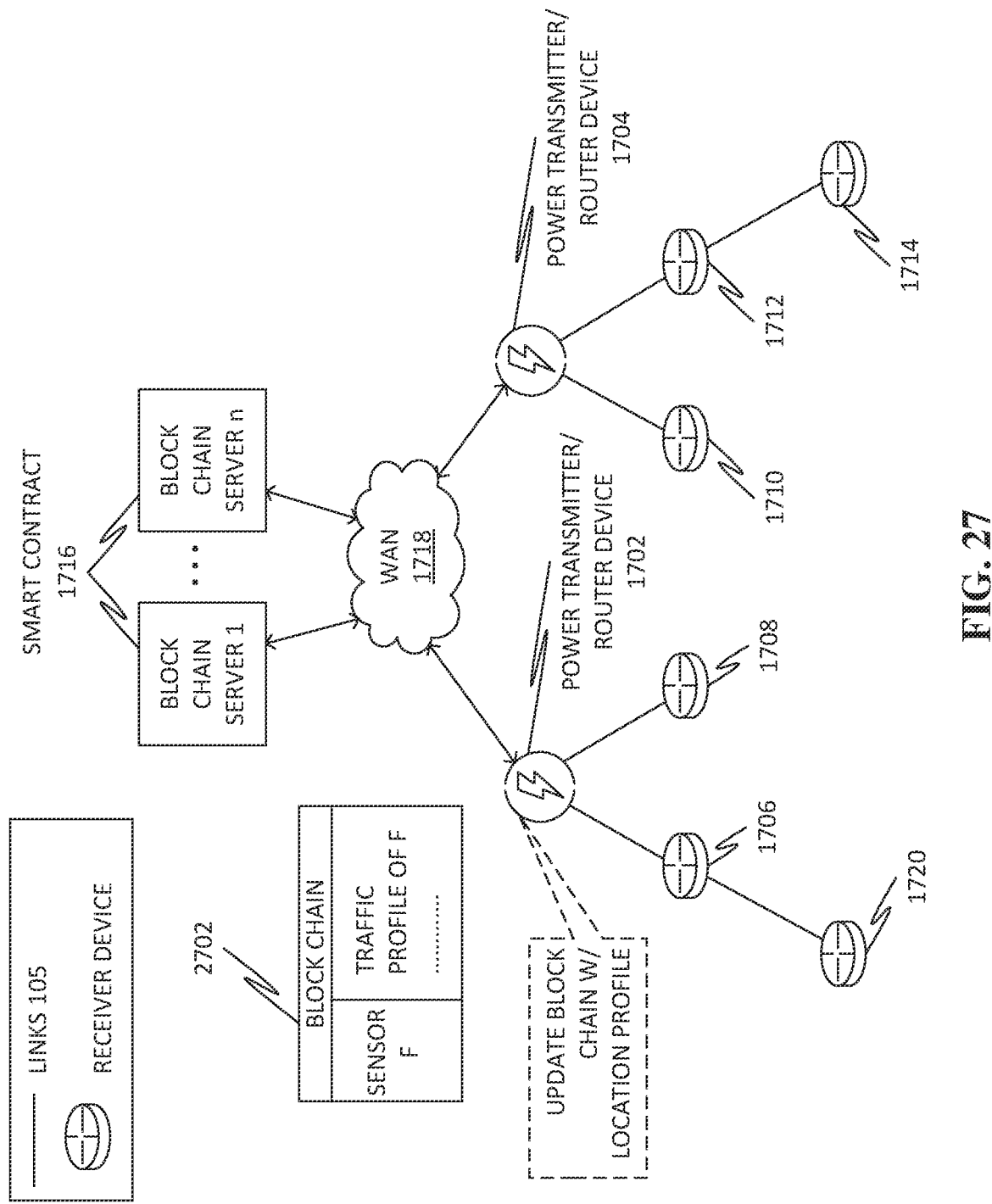
FIG. 27 illustrates power transmitter device node and receiver node using a bock chain to authenticate to detect a unique paring request for power transmission, in accordance with an exemplary embodiment.
Figure 28:
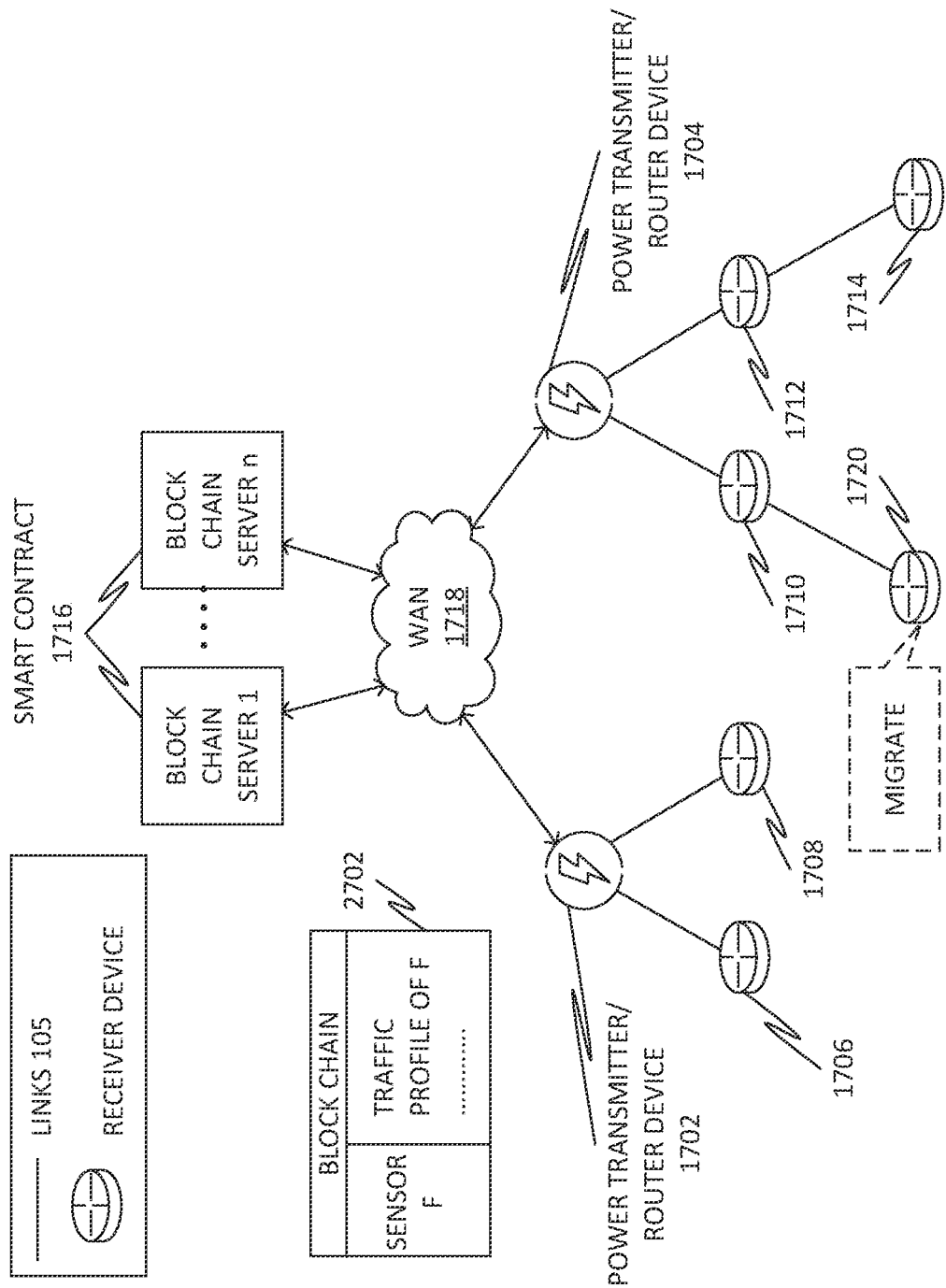
FIG. 28 illustrates power transmitter device node and receiver node using a bock chain to authenticate to detect a unique paring request for power transmission, in accordance with the exemplary embodiment.
Figure 29:
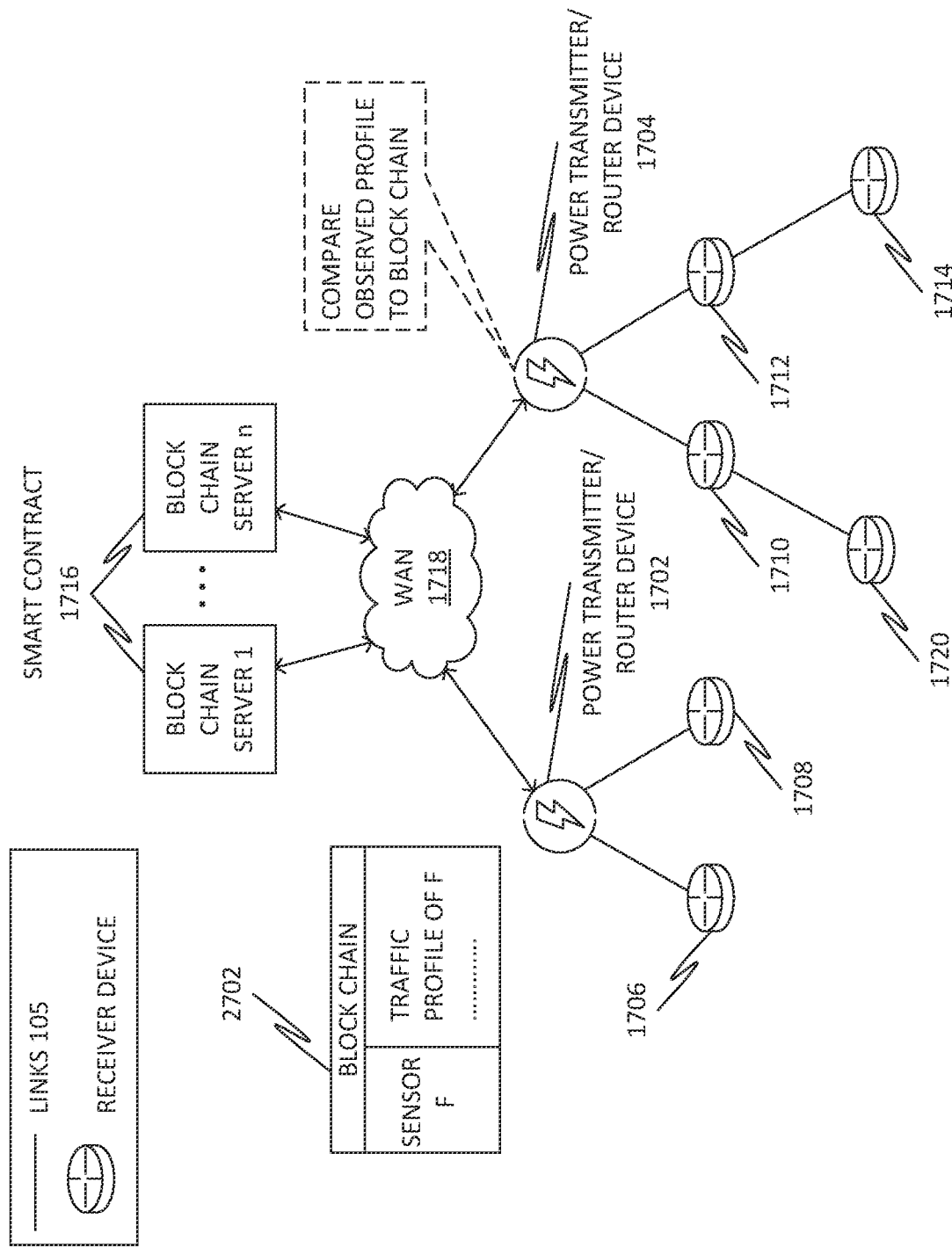
FIG. 29 illustrates power transmitter device node and receiver node using a bock chain to authenticate to detect a unique paring request for power transmission, in accordance with the exemplary embodiment.

FIGS. 27-29 illustrate examples of a device using a blockchain for authentication, identification, and verification, according to various embodiments. As shown in FIG. 27, the receiver device 1720 may be registered to a local network of power router device 1702. In some embodiments, the power transmitter device 1702 or another device in the local network may occasionally update the blockchain to indicate the observed behavior of the receiver device 1720. For example, the power transmitter 1702 may monitor the location profile of the receiver device 1720 (e.g., if the receiver device 1720 sends data, the size of the sent data, the destination of the sent data, etc.). In turn, the power transmitter 1702 may initiate a blockchain update 2702 that may include the observed location profile of the receiver device 1720.

Further, as shown in FIG. 28, if the receiver device 1720 later migrates to another local network, for example, if the receiver device 1720 is a mobile or wearable device, the receiver device 1720 may move away from the local network of the power transmitter device 1702 and into proximity of a local network of the power transmitter device 1704. In such a case, the receiver device 1720 may attempt to register with the local network of the power transmitter device 1704. As a part of this migration, one or more connected devices in the local network of power transmitter device F may use the blockchain to ensure that the receiver device attempting to register with the local domain may indeed be the receiver device 1720 which may previously have been registered in the local domain of the power transmitter device 1702 (e.g., by deciphering digitally signed information in the blockchain using the public key of the receiver device 1720, and so on etc.). In some embodiments, the power transmitter device 1704 may use any behavioral information in the blockchain regarding the receiver device 1720, to determine whether an anomalous condition exists. For example, after the receiver device 1720 is registered to the local network of the power transmitter device 1704, the power transmitter device 1704 may observe the location profile of the receiver device 1720. In turn, the power transmitter device 1704 may compare the observed location profile to that may have been previously recorded in the blockchain by the power transmitter device 1702. If a discrepancy is found in the location profiles, the power transmitter device 1704 may determine that an anomaly exists and take any number of remediation measures (e.g., blocking location, sending alerts, etc.). For example, if the receiver device 1720 is a sensor that sends sensory data every hour to a particular service. If the receiver device 1720 suddenly stops sending the sensor data on time, or sends the sensory data to a different service, the power transmitter device 1704 may determine that the receiver device 1720 may be behaving abnormally and take corrective measures based on the location profile in the blockchain. FIG. 29 illustrates power transmitter device node and receiver node using a bock chain to authenticate to detect a unique paring request for power transmission, in accordance with the exemplary embodiment.

Figure 30:
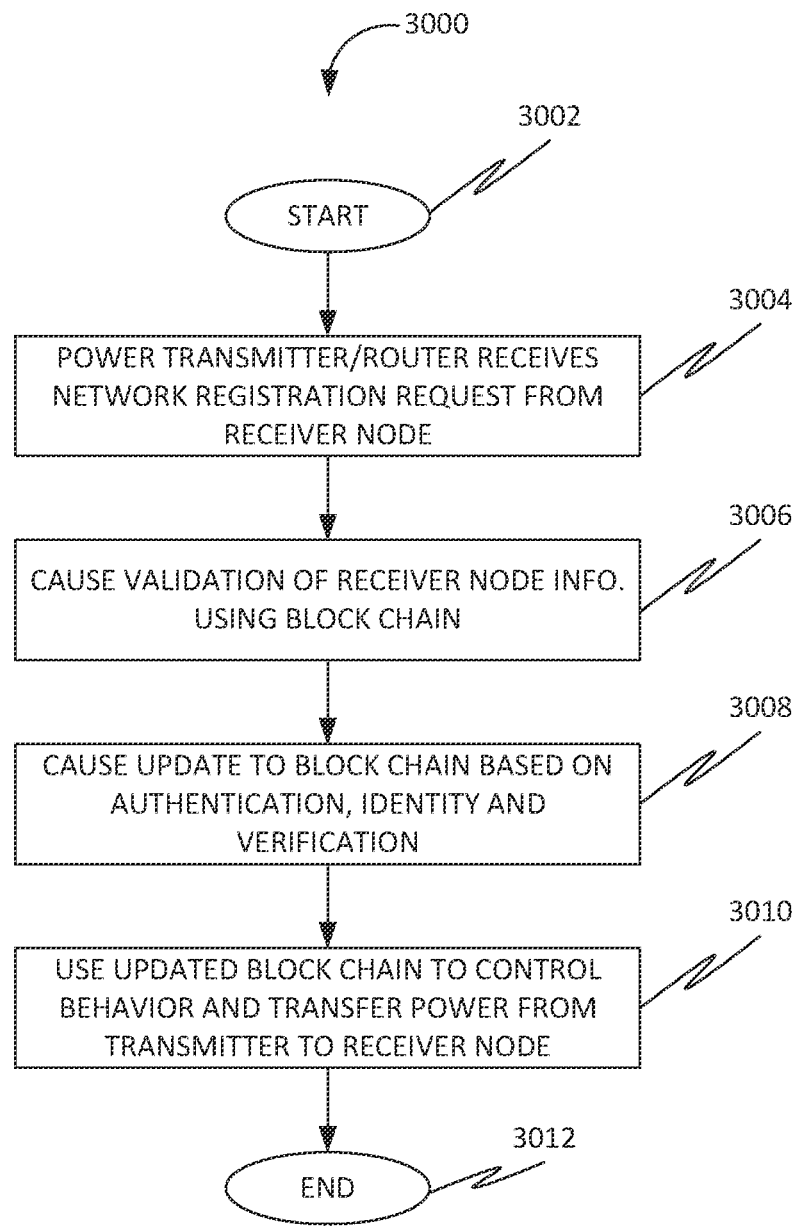
FIG. 30 is a flowchart of a method of wireless charging using blockchain in a network, in accordance with some embodiments.

FIG. 30 is a flowchart of a method 3000 of wireless charging using blockchain in a network, in accordance with some embodiments. In some embodiments, a specialized computing device may perform the method 3000 by executing stored instructions. For example, a power transmitter may perform the method 3000 by executing stored instructions. The method 3000 may start at step 3002, and may continue to step 3004, where, as described in greater detail in conjunction with figures above, a power transmitter device may receive a network registration request from a particular receiver device. For example, a sensor, actuator, or an IoT node, etc., may attempt to register with a local network of the power transmitter device. In various embodiments, the registration request may include information about the particular receiver device such as the type of the receiver device (e.g., type of sensor, etc.), a group identifier, a unique receiver device identifier, an indication of the network to which the receiver device requests registration, or any other information about the particular receiver device. In one embodiment, the receiver device may also apply a digital signature to the request, allowing the device or any other interested device to decipher the contents of the request using the corresponding public key of the receiver device.

At step 3006, as detailed above, the power transmitter device may cause the performance of a validation of the information about the receiver device using a blockchain. In various embodiments, the blockchain may include receiver device information regarding the particular receiver device and any number of other receiver devices. For example, in some cases, the manufacturer of the particular receiver device may create an initial entry in the blockchain that includes details about the particular receiver device. In turn, validation of the receiver device's information may entail comparing the information from the registration request to any existing information about the receiver device in the blockchain. In some embodiments, the power transmitter device itself may perform the validation. In other embodiments, the power transmitter device may cause another validation device to perform the validation, such as a blockchain server, a devoted validation device, etc.

At step 3008, the power transmitter device may cause an update to the blockchain-based on the validation in step 3006 and the information about the receiver device received in step 3004. For example, if the power transmitter device a transmitter/router, the router may cause the blockchain to be updated to reflect that the particular receiver device is attached to the network of the router. In some cases, a level of trust for the particular receiver device may be included in the update. For example, if certain information about the receiver device does not match that in the blockchain, the update to the blockchain may indicate a low level of trust for the receiver device.

At step 3010, as detailed above, the power transmitter device may use the updated blockchain to control the behavior of the particular receiver device and one or more other receiver devices. Notably, since the blockchain includes identification information for the particular receiver device and potentially additional metadata regarding the receiver device (e.g., the receiver device's location profile, etc.), the power transmitter device may use the identification and/or additional metadata to control how one or more receiver devices may operate in the network. In some cases, the power transmitter device may use the blockchain to prevent a receiver device from migrating to its local network. In another embodiment, the power transmitter device may limit or restrict traffic flows of the receiver device based on the blockchain. In a further embodiment, the power transmitter device may use metadata about the receiver device in the blockchain to detect anomalous conditions. The method 3000 may then end at step 3012.

It should be noted that while certain steps within the method 3000 may be optional as described above, the steps shown in FIG. 30 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage blockchain to update node identity information, as well as potentially other metadata about a node. In some aspect, a power transmitter/router node may act as a proxy to update the blockchain information on behalf of the node, which allows low-power devices to conserve resources. In another aspect, a validator may use the existing information in the blockchain about a particular node to validate any new information about the node and update the blockchain accordingly. Other nodes in the network can also leverage the blockchain information to facilitate movement of the node across local networks, confirming the identity of the node, performing anomaly detection, etc.

While there have been shown and described illustrative embodiments that provide for the use of a blockchain to convey device information, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain functions are depicted as performed by certain devices, other embodiments provide for these functions to be distributed as desired across one or more devices.

Figure 31:
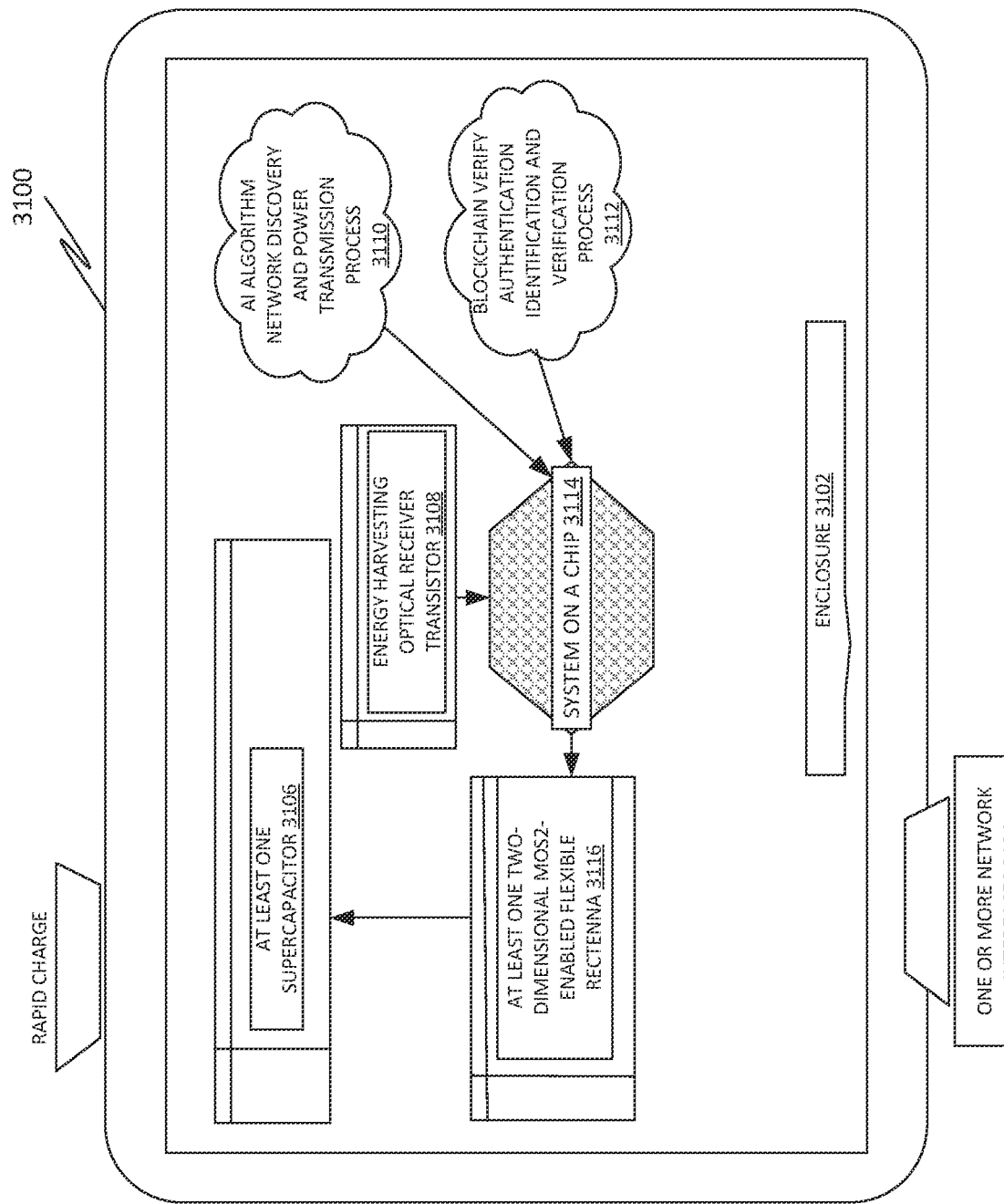
FIG. 31 is a schematic block diagram of an example node/device, in accordance with some embodiments.

FIG. 31 is a schematic block diagram of an example node/device 3100 that may be used with one or more embodiments described herein, e.g., as any of the nodes shown in FIG. 16. Further, the node/device 3100 may include the receiver device 200, the receiver device 400, and the receiver device 600. Further, the device 3100 may include an enclosure 3102. Further, the enclosure 3102 may be comprised of at least one material. Further, the at least one material may include multiple active graphene materials that enable the device 3100 to operate at high voltages. Further, the enclosure 3100 may be able to conduct electricity because of the graphene. Further, the at least one material of the enclosure 3102 may allow RF waves to be harvested and stored onto the supercapacitor.

Further, the device 3100 may include a plurality of device internal components. Further, the plurality of device internal components may include one or more network interfaces 3104 (e.g., wired, wireless, PLC, etc.), at least one supercapacitor 3106 for energy storage and fast charging, at least one two-dimensional MoS2-enabled flexible rectenna 3116 and at least one energy harvesting optical receiver transistor 3108 interconnected by an AI algorithm and blockchain process 3110-3112. The rapid charge interface(s) contain the mechanical, electrical, and signaling circuitry for communicating and accepting power transmission and data over links 1642, as shown in FIG. 16, coupled to the wireless power network.

The one or more network interfaces 3104 contain the mechanical, electrical, and signaling circuitry for communicating data and power over links 1642 coupled to the exemplary computer network 1600. The one or more network interfaces 3104 may be configured to transmit and/or receive data and a power transmission using a variety of different communication protocols. Note, further, that the nodes may have two different types of network connections, e.g., wireless and wired/physical connections, and that the view herein is merely for illustration.

In various embodiments, the AI algorithm and blockchain process 3110-3112 may be configured to perform node/device identification and authentication using a distributed blockchain that includes information regarding the various nodes/devices in the network.

An example implementation of LLNs is an "Internet of Things" network. Loosely, the term "Internet of Things" or "IoT" may be used by those in the art to refer to uniquely identifiable objects (things) and their virtual representations in a wireless powered network-based architecture. Further, the wireless powered network-based architecture may be a wireless powered space network-based architecture. Further, the wireless powered space network-based architecture may include a network of low earth orbit satellites and a space station (international space station). Further, the network of low earth orbit satellites and the space station (international space station) is linked using at least one link.

In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Also, the next frontier in the evolution of power transmission is low earth orbit satellites wireless power transmission space networks and space stations with the ability to connect more than just computers and communications devices, but rather the ability to connect and power "objects" in general, such as lights, appliances, vehicles, smart cities, etc. With the emergence of a myriad of sensors, such as the smart grid, smart cities, flying cars, autonomous cars, drones, solar cell panels, building and industrial automation, and autonomous cars (e.g., that can interconnect millions of objects for sensing things like power quality, tire pressure, and temperature and that can actuate engines and lights), it has also been of the utmost importance to extend the IP protocol suite for these networks.

Particularly in the context of the IoT and similar networks, device identity and management is a key building block for a viable end-to-end solution. Depending on the particular use case, a "thing" (e.g., a node) may have to register or authenticate its identity with different service enablers that may use various service-specific procedures.

Block Chain Based IoT Device Identity Verification and Power Transmission.

The techniques herein provide for the use of a blockchain-based mechanism that conveys information regarding the identity of nodes and/or other metadata regarding the nodes, to control the behavior of the nodes in the networks. In some aspects, a superconducting receiver device may act as a proxy to update node information in the block chain on behalf of the nodes, so as not to require nodes with constrained resources to perform the updates themselves. In another aspect, any new and unconfirmed information regarding a particular node can be validated against the block chain before updating the block chain, accordingly. In a further aspect, devices in the network can also use the blockchain to control the behavior of a node in the network, e.g., by confirming the identity of the node, associating a trust level with the node, performing anomaly detection, and the like.

Specifically, according to one or more embodiments of the disclosure, as described in detail below, a device in a network receives a network registration request from a particular node. The network registration request comprises information about the particular node. The device causes performance of a validation of the information about the particular node via comparison of the information about the particular node to a distributed blockchain that includes information regarding the particular node and one or more other nodes. The device causes an update to the blockchain-based on upon the information about the particular node and the validation of the information about the particular node. The device uses the updated blockchain to control behavior of the particular node and the one or more other nodes.

Illustratively, the techniques described herein may be performed by hardware, software, and/or firmware, such as in accordance with the AI Algorithm and blockchain process 3110-3112, which may contain computer-executable instructions executed by the system on a chip 3114 to perform functions relating to the techniques described herein. For example, the techniques herein may be treated as extensions to conventional protocols, such as the various wireless communication protocols, and as such, may be processed by similar components understood in the art that execute those protocols, accordingly.

Operationally, the techniques herein leverage the blockchain concept to register and update profile and trust information about network nodes (e.g., IoT sensors, etc.). A superconducting receiver device or a stand-alone proxy may sign this information before updating the block chain servers, ensuring a chain of trust. Any validator can then use the corresponding public key to validate the node information and create/update the block chain with the information. This allows devices in the network to use the blockchain to quickly identify a given node and use any relevant information in the block chain about the node to control how the node is handled in the network.

Figure 32:
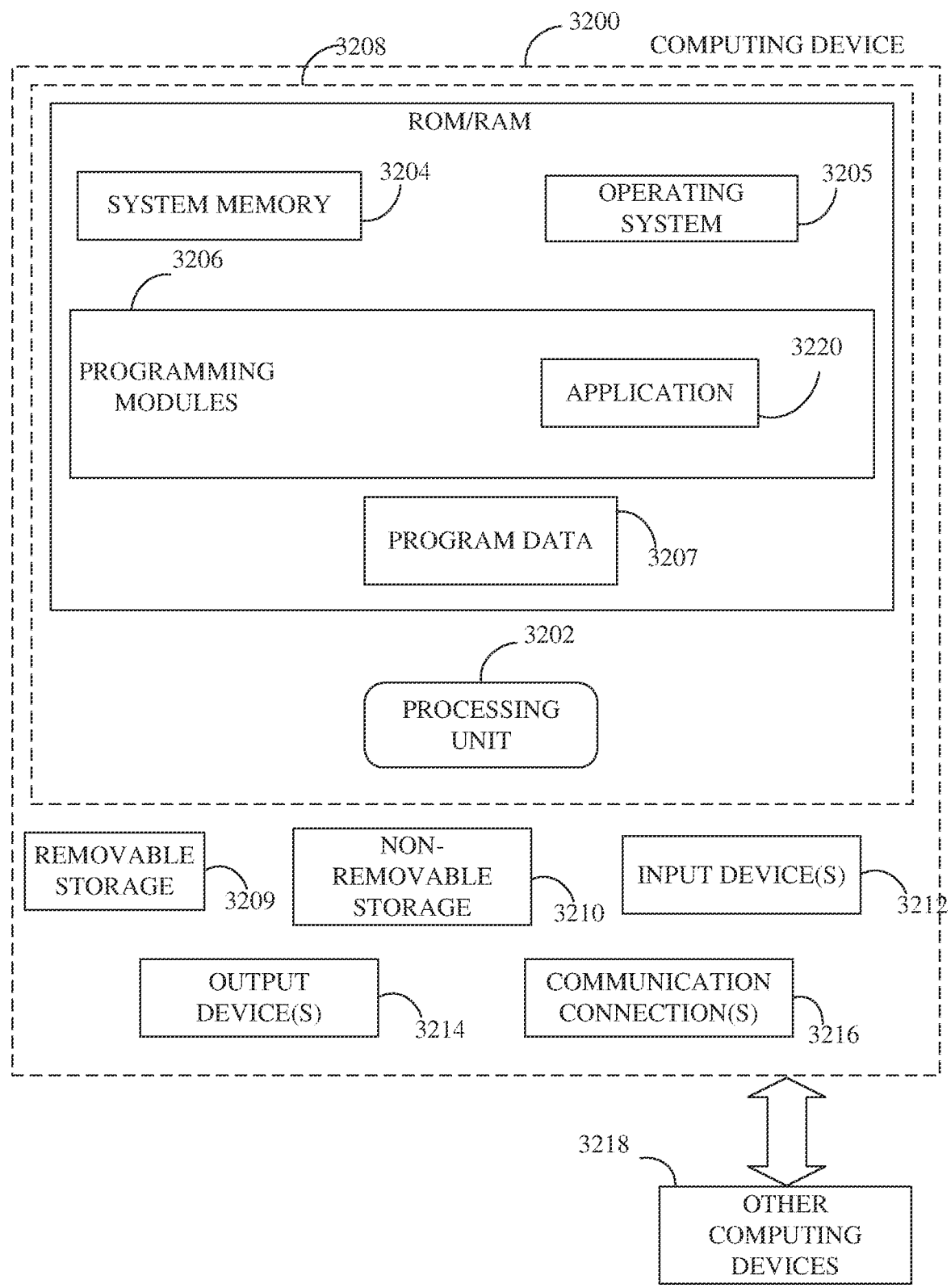
FIG. 32 is a block diagram of a computing device for implementing the methods disclosed herein, in accordance with some embodiments.

With reference to FIG. 32, a system consistent with an embodiment of the disclosure may include a computing device or cloud service, such as computing device 3200. In a basic configuration, computing device 3200 may include at least one processing unit 3202 and a system memory 3204. Depending on the configuration and type of computing device, system memory 3204 may comprise, but is not limited to, volatile (e.g. random-access memory (RAM)), non-volatile (e.g. read-only memory (ROM)), flash memory, or any combination. System memory 3204 may include operating system 3205, one or more programming modules 3206, and may include a program data 3207. Operating system 3205, for example, may be suitable for controlling computing device 3200's operation. In one embodiment, programming modules 3206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 32 by those components within a dashed line 3208.

Computing device 3200 may have additional features or functionality. For example, computing device 3200 may also include additional data storage devices (removable and/or non-removable) such as, for example, magnetic disks, optical disks, or tape. Such additional storage is illustrated in FIG. 32 by a removable storage 3209 and a non-removable storage 3210. Computer storage media may include volatile and non-volatile, removable and non-removable media implemented in any method or technology for storage of information, such as computer-readable instructions, data structures, program modules, or other data. System memory 3204, removable storage 3209, and non-removable storage 3210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3200. Any such computer storage media may be part of device 3200. Computing device 3200 may also have input device(s) 3212 such as a keyboard, a mouse, a pen, a sound input device, a touch input device, a location sensor, a camera, a biometric sensor, etc. Output device(s) 3214 such as a display, speakers, a printer, etc. may also be included. The aforementioned devices are examples and others may be used.

Computing device 3200 may also contain a communication connection 3216 that may allow device 3200 to communicate with other computing devices 3218, such as over a network in a distributed computing environment, for example, an intranet or the Internet. Communication connection 3216 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 3204, including operating system 3205. While executing on processing unit 3202, programming modules 3206 (e.g., application 3220 such as a media player) may perform processes including, for example, one or more stages of methods, algorithms, systems, applications, servers, databases as described above. The aforementioned process is an example, and processing unit 3202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a quantum computer process (method), a quantum computing system, a quantum energy system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 33:
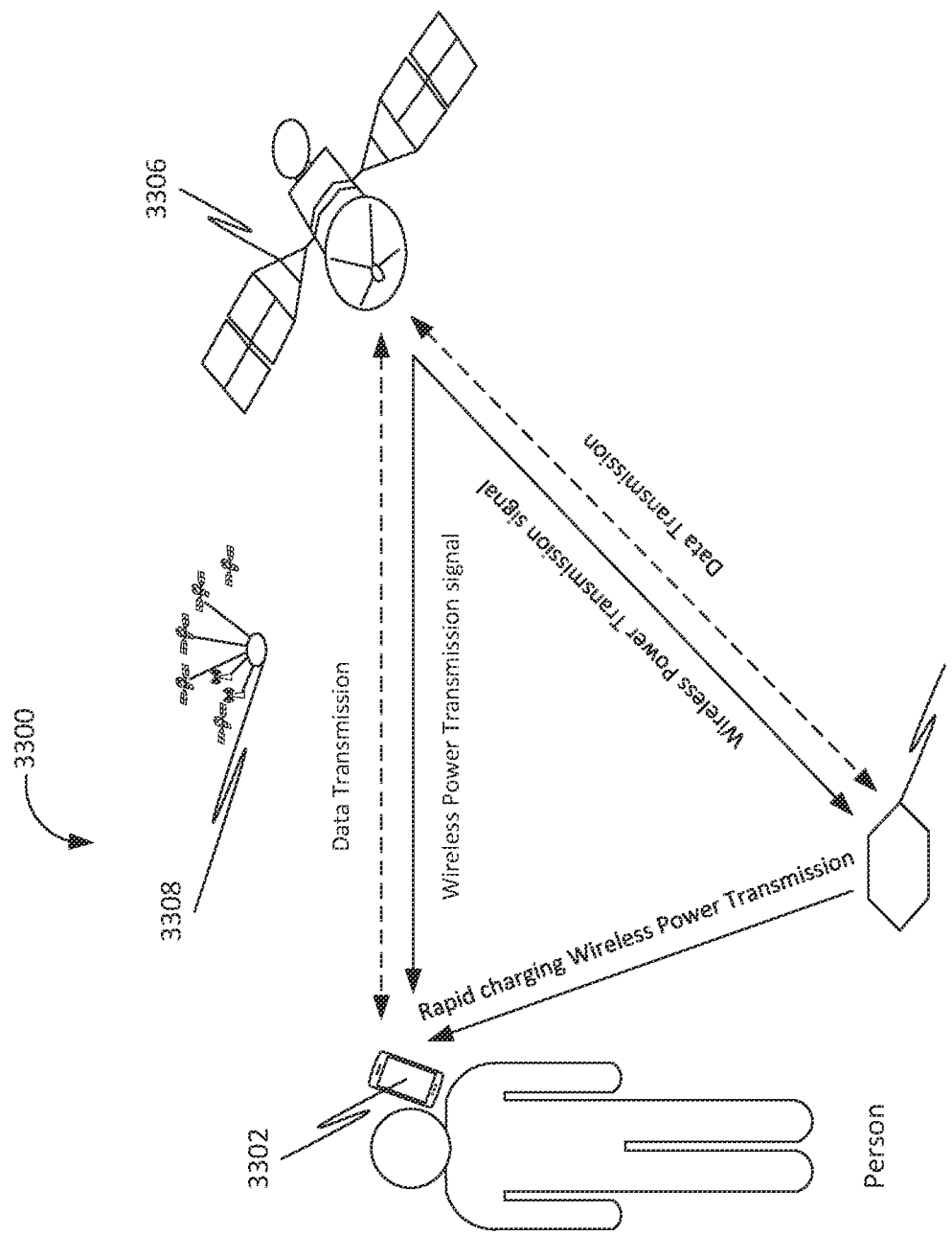
FIG. 33 is a schematic illustrating a system for facilitating wireless power transmission, in accordance with some embodiments.

FIG. 33 is a schematic illustrating a system 3300 for facilitating wireless power transmission, in accordance with some embodiments. Further, the system 3300 may include a smartphone receiver device 3302, an energy harvesting receiver 3304, and a low earth orbiting satellite (LEO) 3306. Further, the smartphone receiver device 3302 (e.g., a smartphone) and the energy harvesting receiver 3304 may be configured for receiving wireless power transmission signals from the low earth orbiting satellite (LEO) 3306. Further, the receiving of the wireless power transmission signals may facilitate wireless energy receiving. Further, the wireless power transmission signals may include a global positioning system (GPS) signal from conventional navigation satellites. Further, the global positioning system (GPS) signal may include a protected GPS signal and/or an unprotected GPS signal.

Further, the smartphone receiver device 3302 and the energy harvesting receiver 3304 may be configured for receiving wireless power transmission signals from at least one satellite. Further, the at least one satellite may include the low earth orbiting satellite (LEO) 3306. Further, the system 3300 may include a wireless power network 3308. Further, the smartphone receiver device 3302 and the energy harvesting receiver 3304 may be configured for receiving the wireless power transmission signals from the wireless power network 3308. Further, the wireless power network 3308 may include a cellular network, an Internet network, a WiFi network, and/or other networks.

Further, the wireless power transmission signals may include a precision wireless power transmission signal. Further, the wireless power transmission signals may include additional aiding information such as, for example, orbit information associated with the low earth orbiting satellite (LEO) 3306. Further, the precision wireless power transmission signal may be associated with a precision process. Further, the precision process may be performed using an AI algorithm and a blockchain process.

Further, the smartphone receiver device 3302 may be configured for updating blockchain to control the behavior of the particular node and the one or more other nodes. Further, the smartphone receiver device 3302 may be configured for determining a profile of the particular node and comparing the determined location, identity of the type of device, calculating the distance from the power transmitter to the receiver of the node and detect how much of a battery charge the receiver device needs to initiating of a wireless power transmission.

Further, in some embodiments, the low earth orbiting satellite (LEO) 3306 may be a part of an integrated high-performance Wireless Power Network and blockchain enabled communication system such as an iGPS system. Further, the low earth orbiting satellite (LEO) 3306 may also be a part of any other positioning system satellite, including the Global Orbiting Navigation System.

Further, in some embodiments, the low earth orbiting satellite (LEO) 3306 may be implemented as a LEO communication satellite, the LEO communication satellite may be configured to support wireless power transmission and communication signals as well as navigation signals. In this regard, such navigation signals may be implemented to account for various factors such as registration and authentication.

Further, the smartphone receiver device 3302 may include a multi-frequency antenna adapted to receive the wireless power transmission signals from one or more satellites.

Further, in some embodiments, the energy harvesting receiver 3304 may include a plurality of device internal components. Further, the plurality of device internal components may include one or more network interfaces (such as the one or more network interfaces 3104, as shown in FIG. 31). Further, the one or more network interfaces may include a wired interface, a wireless interface, a PLC interface, etc. Further, the energy harvesting receiver 3304 may include at least one supercapacitor for facilitating energy storage and a rapid charging wireless power transmission to the smartphone receiver device 3302. Further, the rapid charging wireless power transmission may include transmission of the wireless energy. Further, the energy harvesting receiver 3304 may be interconnected with the smartphone receiver device 3302 for facilitating the rapid charging wireless power transmission using an AI algorithm and a blockchain process.

Further, in some embodiments, the energy harvesting receiver 3304 may facilitate a near field ultra-fast wireless power transmission to the smartphone receiver device 3302. Further, the near field ultra-fast wireless power transmission may include transmission of the wireless energy. Further, the near field ultra-fast wireless power transmission may be facilitated between the energy harvesting receiver 3304 and the smartphone receiver device 3302. Further, the energy harvesting receiver 3304 and the smartphone receiver device 3302 may be interconnected via wired links, wireless links, PLC links, and so on. Further, at least one of the wired links, the wireless links, the PLC links may facilitate the near field ultra-fast wireless power transmission. Further, the energy harvesting receiver 3304 may facilitate the near field ultra-fast wireless power transmission to the smartphone receiver device 3302 based on distance, signal strength, current operational status, location, etc. Further, the energy harvesting receiver 3304 may facilitate the near field ultra-fast wireless power transmission to with the smartphone receiver device 3302 over a network (such as the network 1636, as shown in FIG. 16). Further, the near field ultra-fast wireless power transmission may include the rapid charging wireless power transmission.

Further, in some embodiments, the smartphone receiver device 3302 may include a receiver device 200, as shown in FIG. 2.

Further, in some embodiments, the energy harvesting receiver 3304 may include a receiver device 200, as shown in FIG. 2.

Figure 34:
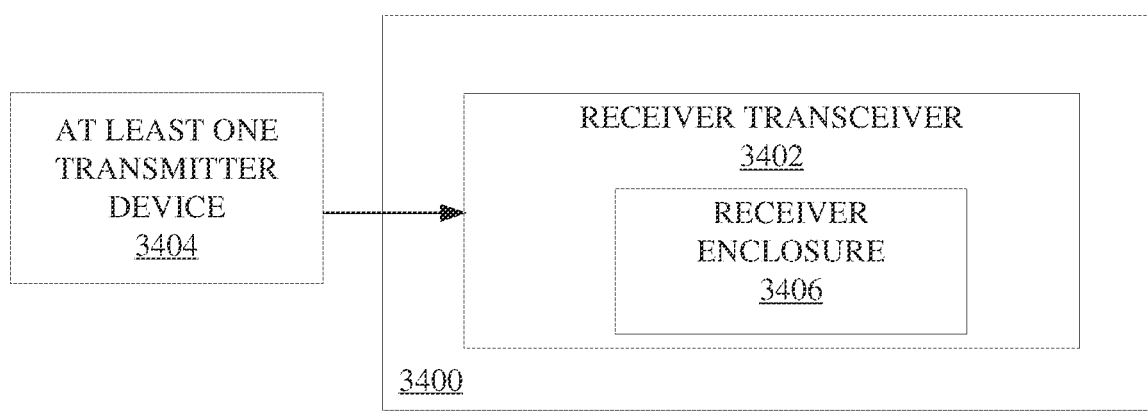
FIG. 34 is a block diagram of a receiver device for facilitating wireless energy reception, in accordance with some embodiments.
Figure 37:
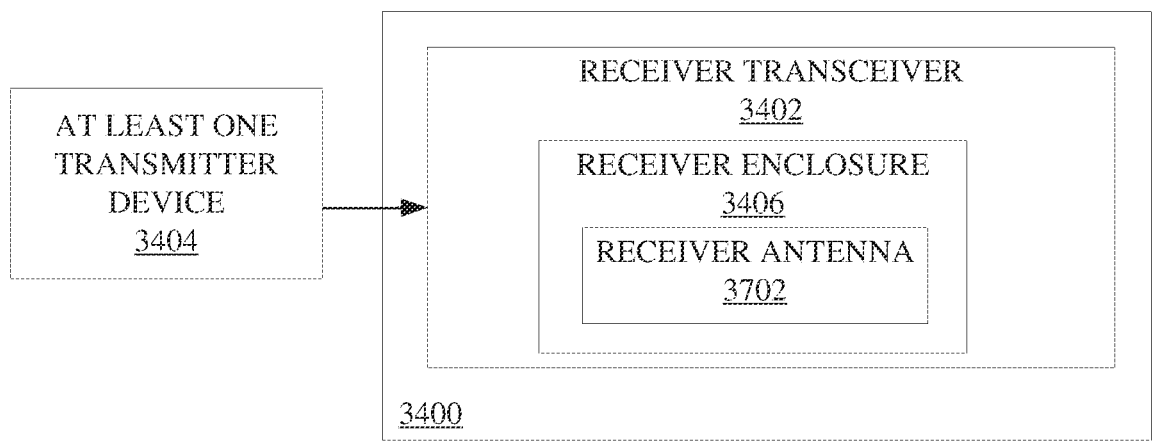
FIG. 37 is a block diagram of the receiver device for facilitating wireless energy reception, in accordance with some embodiments.

FIG. 34 is a block diagram of a receiver device 3400 for facilitating wireless energy reception, in accordance with some embodiments. Accordingly, the receiver device 3400 may include a receiver transceiver 3402 configured for receiving energy wirelessly from at least one transmitter device 3404. Further, the receiver transceiver 3402 may include a receiver enclosure 3406. Further, the receiver enclosure 3406 may include at least one metamaterial. Further, the energy may include terahertz electromagnetic wave energy. Further, the receiver enclosure 3406 may be configured for storing the terahertz electromagnetic wave energy based on the receiving of the energy. Further, the receiver enclosure 3406 may be configured for converting the terahertz electromagnetic wave energy into electrical energy. Further, the electrical energy may be transferable to at least one electronic device based on the converting. Further, the at least one electronic device may include at least one battery, at least one capacitor, etc. Further, the receiver enclosure 3406 may include a receiver antenna 3702 (as shown in FIG. 37) configured for facilitating the receiving of the energy wirelessly. Further, the receiver antenna 3702 may include at least one superconducting material. Further, the receiver transceiver 3402 may be configured for transmitting a registration request to the at least one transmitter device 3404. Further, the registration request may include a unique receiver device identifier. Further, the at least one transmitter device 3404 may be configured for analyzing the registration request. Further, the at least one transmitter device 3404 may be configured for accessing a distributed block-chain associated with wireless energy transfer based on the analyzing. Further, the at least one transmitter device 3404 may be configured for authenticating the receiver device 3400 based on the accessing. Further, the at least one transmitter device 3404 may be configured for transmitting the energy wirelessly to the receiver transceiver 3402 based on the authenticating.

Further, in some embodiments, the at least one metamaterial forms at least one two-dimensional metamaterial layer. Further, at least one enclosure surface of the receiver enclosure 3406 may include the at least one two-dimensional metamaterial layer.

Further, in some embodiments, the receiver enclosure 3406 may include the at least one enclosure surface. Further, the receiver antenna 3702 may include a wideband high-efficiency multimode transceiver antenna. Further, the wideband high-efficiency multimode transceiver antenna may include the at least one superconducting material. Further, the wideband high-efficiency multimode transceiver antenna may be configured for receiving terahertz electromagnetic waves for facilitating the receiving of the terahertz electromagnetic wave energy based on the receiving of the terahertz electromagnetic waves.

Figure 35:
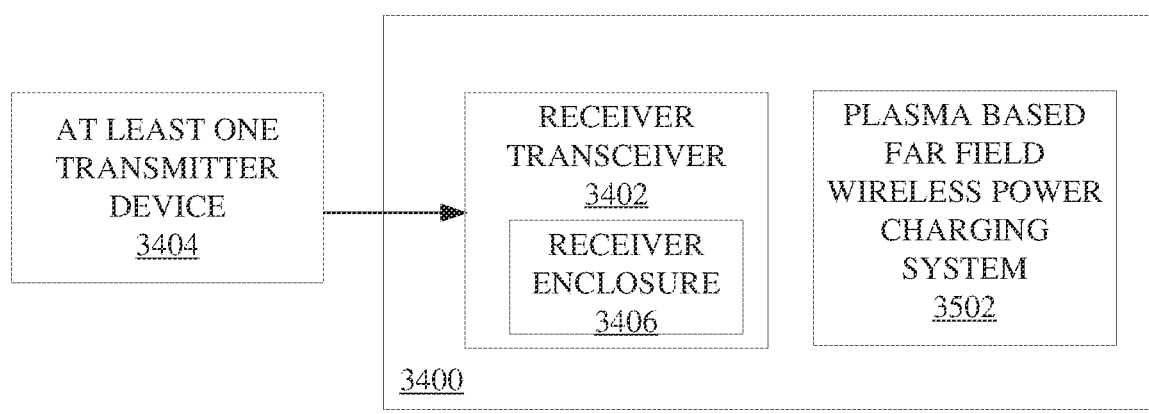
FIG. 35 is a block diagram of the receiver device for facilitating wireless energy reception, in accordance with some embodiments.

In further embodiments, the receiver device 3400 may include a plasma-based far-field wireless power charging system 3502 (as shown in FIG. 35) coupled with the wideband high-efficiency multimode transceiver antenna. Further, the plasma-based far-field wireless power charging system 3502 may be configured for harvesting the terahertz electromagnetic wave energy based on the receiving of the terahertz electromagnetic waves.

Further, in some embodiments, the receiver enclosure 3406 may include a two-dimensional MoS2-enabled flexible rectenna.

Figure 36:
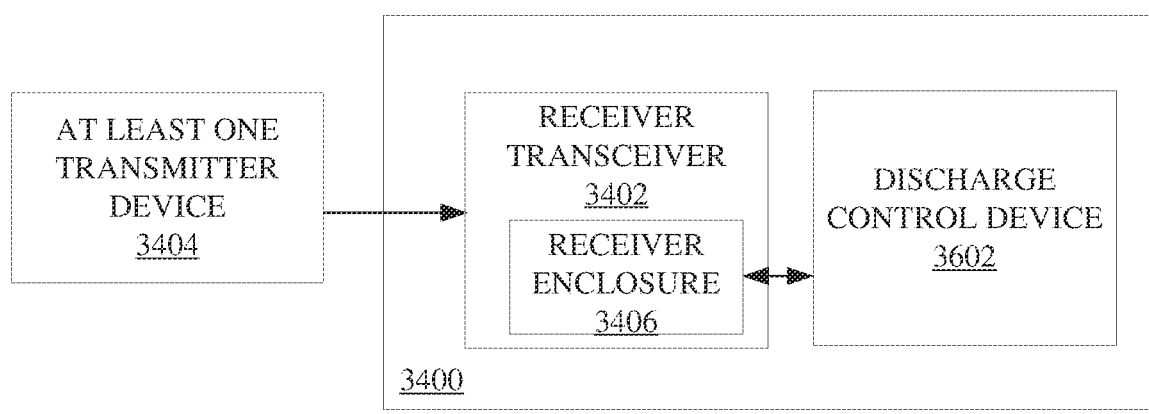
FIG. 36 is a block diagram of the receiver device for facilitating wireless energy reception, in accordance with some embodiments.

In further embodiments, the receiver device 3400 may include a discharge control device 3602 (as shown in FIG. 36) electrically coupled with the receiver enclosure 3406. Further, the discharge control device 3602 may include a switch. Further, the switch may be associated with a switch state of a plurality of switch states. Further, the plurality of switch states may include an on state and an off state. Further, the switch may be configured to be transitionable between the plurality of switch states. Further, the discharge control device 3602 may be configured for transferring an amount of the electrical energy to the at least one electronic device based on the switch state. Further, the at least one electronic device may be electrically couplable to the discharge control device 3602.

Further, in some embodiments, the switch may be configured for receiving at least one voice command from a user. Further, the switch may be configured for transitioning the switch state based on the at least one voice command. Further, the switch transitions from the off state to the on state based the transitioning.

Figure 38:
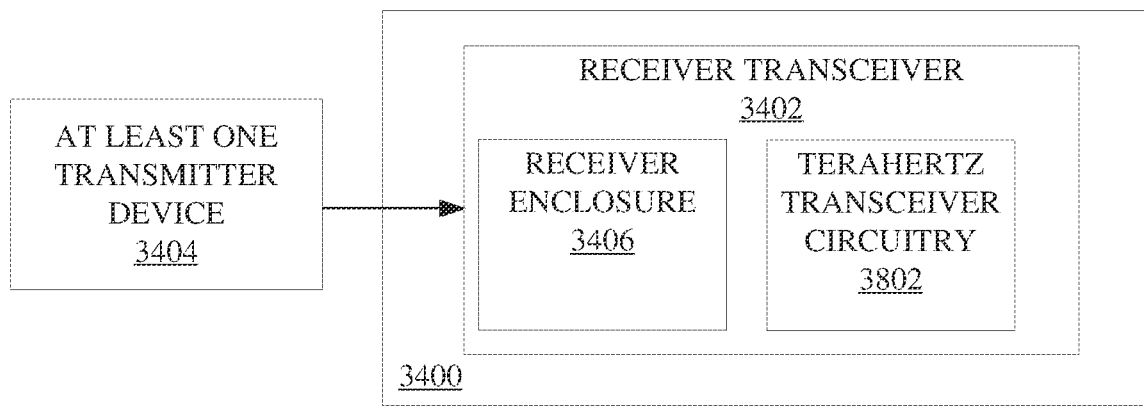
FIG. 38 is a block diagram of the receiver device for facilitating wireless energy reception, in accordance with some embodiments.

Further, in some embodiments, the receiver transceiver 3402 may include a terahertz transceiver circuitry 3802 (as shown in FIG. 38). Further, the at least one transmitter device 3404 may include a plurality of transmitter devices. Further, the terahertz transceiver circuitry 3802 may be configured for receiving a plurality of power transmission signals from the plurality of transmitter devices. Further, the terahertz transceiver circuitry 3802 may be configured for identifying the plurality of transmitter devices. Further, the terahertz transceiver circuitry 3802 may be configured for classifying the plurality of transmitter devices into a plurality of transmitter device types based on the identifying. Further, the receiving of the energy from the at transmitter device of a transmitter device type of the plurality of transmitter device types may be based on the classifying.

Figure 39:
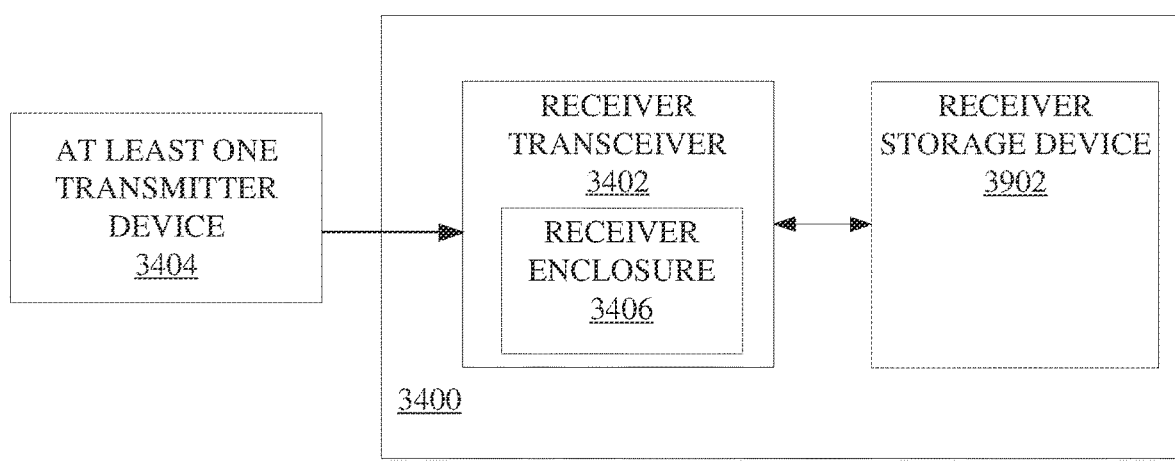
FIG. 39 is a block diagram of the receiver device for facilitating wireless energy reception, in accordance with some embodiments.

Further, in some embodiments, the terahertz transceiver circuitry 3802 may be configured for implementing at least one wireless power transmission algorithm. Further, the terahertz transceiver circuitry 3802 may be configured for accelerating the classifying of the plurality of transmitter devices using an artificial intelligence deep learning model based on the implementing. Further, the receiver device 3400 may include a receiver storage device 3902 (as shown in FIG. 39) communicatively coupled with the receiver transceiver 3402. Further, the receiver storage device 3902 may be configured for storing the at least one wireless power transmission algorithm and the artificial intelligence deep learning model.

Further, in some embodiments, the receiver transceiver 3402 may include the terahertz transceiver circuitry 3802. Further, the terahertz transceiver circuitry 3802 may be configured for accelerating the converting of the terahertz electromagnetic wave energy into DC electrical energy.

Further, in some embodiments, the at least one transmitter device 3404 may be configured for identifying a receiver device type of the receiver device 3400 based on the analyzing of the registration request. Further, the at least one transmitter device 3404 may be configured for locating the receiver device 3400 based on the receiving of the registration request. Further, the at least one transmitter device 3404 may be configured for determining a distance between the at least one transmitter device 3404 and the receiver device 3400. Further, the at least one transmitter device 3404 may be configured for calculating an energy requirement of the receiver device 3400 based on the distance and the receiver device type. Further, the transmitting of the energy to the receiver device 3400 may be based on the energy requirement.

Further, in some embodiments, the energy requirement may include a number of energy units. Further, the energy may include the number of energy units. Further, the at least one transmitter device 3404 may be configured for retrieving an energy rate of an energy unit from the distributed block-chain based on the calculating. Further, the at least one transmitter device 3404 may be configured for calculating a cost for the number of energy units based on the retrieving and the determining. Further, the at least one transmitter device 3404 may be configured for generating a cost statement based on the calculating of the cost. Further, the at least one transmitter device 3404 may be configured for transmitting the cost statement to the receiver device 3400. Further, the receiver device 3400 may include a presentation device configured for presenting the cost statement. Further, in an embodiment, the at least one transmitter device 3404 may be configured for receiving a payment from the receiver transceiver 3402. Further, the at least one transmitter device 3404 may be configured for processing a transaction for the cost using the payment. Further, the transmitting of the energy may be based on the processing. Further, the payment may include a blockchain energy asset. Further, the blockchain energy asset may be a blockchain quantum energy asset. Further, the blockchain energy asset may include a digital currency (such as a cryptocurrency). Further, in an embodiment, the receiver device 3400 enables the blockchain energy asset to be bundled and stored onto a Cryptocurrency application on the receiver transceiver 3402 for facilitating wireless energy reception as an energy asset. Further, the energy asset may be a quantum energy asset. Further, the receiver transceiver 3402 may be configured for receiving a request (such as a voice command request, an application request, etc.) from the user. Further, the receiver transceiver 3402 may be configured for identifying the user based on the receiving of the request. Further, the receiver transceiver 3402 may be configured for authenticating the user based on the identifying of the user. Further, the receiver transceiver 3402 may be configured for transmitting the digital currency to the at least one transmitter device 3404 based on the authenticating of the user. Further, the wireless energy reception may be based on the transmitting of the digital currency.

Further, in some embodiments, the at least one transmitter device 3404 may be configured for retrieving a wireless power transfer protocol from the distributed block-chain based on the accessing. Further, at least one of the authenticating and the transmitting may be based on the wireless power transfer protocol.

Further, in some embodiments, the wireless power transfer protocol may include a Deep Neural Network (DNN) algorithm. Further, the DNN algorithm operates with at least 99 percent accuracy on a single neural network framework for at least one of locating, detecting, classifying, and identifying a plurality of receiver device types of the receiver device 3400.

Further, in some embodiments, the at least one transmitter device 3404 may include at least one low earth orbit satellite. Further, the at least one low earth orbit satellite may be configured for comparing the registration request with a low earth orbit satellite information. Further, the low earth orbit satellite may be configured for retrieving the low earth orbit satellite information from the distributed block-chain based on the accessing.

Further, in some embodiments, the at least one transmitter device 3404 may include a plurality of low earth orbit satellites. Further, a constellation of the plurality of low earth orbit satellites forms a mesh network. Further, a low earth orbit satellite of the plurality of low earth orbit satellites corresponds to a node of the mesh network. Further, the receiver transceiver 3402 may be configured for communicating with the constellation of the plurality of low earth orbit satellites using a terahertz frequency band associated with an inter-satellite link. Further, the receiver transceiver 3402 may be configured for locating at least one low earth orbit satellite of the plurality of low earth orbit satellites based on the communicating. Further, the transmitting of the registration request may be based on the locating.

Further, in some embodiments, the at least one transmitter device 3404 may include at least one of a plurality of 6G cellular towers and a plurality of 5G cellular towers. Further, a constellation of the at least one of the plurality of 6G cellular towers and the plurality of 5G cellular towers forms a mesh network. Further, at least one of a 6G cellular tower of the plurality of 6G towers and a 5G cellular tower of the plurality of 5G cellular towers corresponds to a node of the mesh network. Further, the receiver transceiver 3402 may be configured for communicating with the constellation of the at least one of the plurality of 6G cellular towers and the plurality of 5G cellular towers using a terahertz frequency band associated with an inter-satellite link. Further, the receiver transceiver 3402 may be configured for locating at least one of at least one 6G tower and at least one 5G tower based on the communicating. Further, the transmitting of the registration request may be based on the locating.

Further, in some embodiments, the at least one transmitter device 3404 may include a plurality of transmitter devices. Further, the plurality of transmitter devices may be configured for communicating between the plurality of transmitter devices for forming a blockchain network. facilitating network positioning based on the forming of the blockchain network. Further, the plurality of transmitter devices may be configured for detecting the receiver device 3400 based on the network positioning. Further, the transmitting of the energy to the receiver device 3400 may be based on the detecting.

FIG. 35 is a block diagram of the receiver device 3400 for facilitating wireless energy reception, in accordance with some embodiments.

FIG. 36 is a block diagram of the receiver device 3400 for facilitating wireless energy reception, in accordance with some embodiments.

FIG. 37 is a block diagram of the receiver device 3400 for facilitating wireless energy reception, in accordance with some embodiments.

FIG. 38 is a block diagram of the receiver device 3400 for facilitating wireless energy reception, in accordance with some embodiments.

FIG. 39 is a block diagram of the receiver device 3400 for facilitating wireless energy reception, in accordance with some embodiments.

Figure 40:
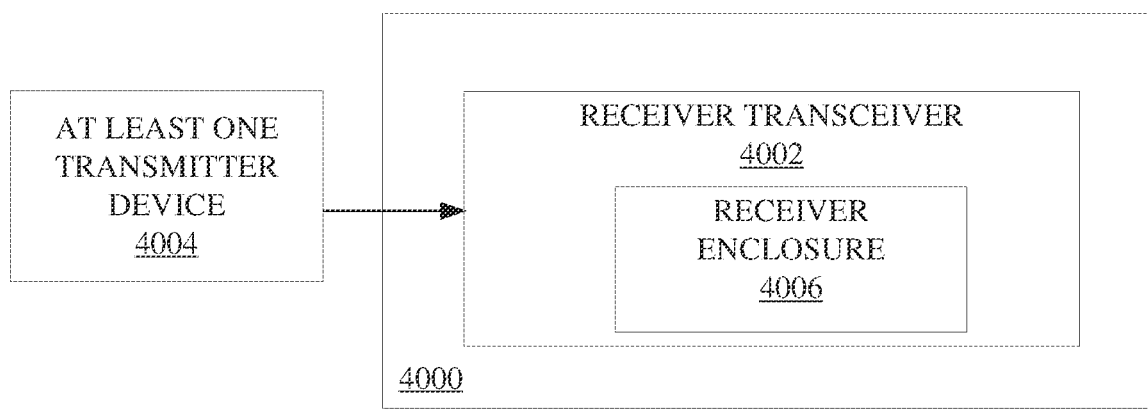
FIG. 40 is a block diagram of a receiver device for facilitating wireless energy reception, in accordance with some embodiments.

FIG. 40 is a block diagram of a receiver device 4000 for facilitating wireless energy reception, in accordance with some embodiments. Accordingly, the receiver device 4000 may include a receiver transceiver 4002 configured for receiving energy wirelessly from at least one transmitter device 4004. Further, the receiver transceiver 4002 may include a receiver enclosure 4006. Further, the receiver enclosure 4006 may include at least one metamaterial. Further, the at least one metamaterial forms at least one two-dimensional metamaterial layer. Further, at least one enclosure surface of the receiver enclosure 4006 may include the at least one two-dimensional metamaterial layer. Further, the energy may include terahertz electromagnetic wave energy. Further, the receiver enclosure 4006 may be configured for storing the terahertz electromagnetic wave energy based on the receiving of the energy. Further, the receiver enclosure 4006 may be configured for converting the terahertz electromagnetic wave energy into electrical energy. Further, the electrical energy may be transferable to at least one electronic device based on the converting. Further, the receiver enclosure 4006 may include a receiver antenna configured for facilitating the receiving of the energy wirelessly. Further, the receiver antenna may include at least one superconducting material. Further, the receiver transceiver 4002 may be configured for transmitting a registration request to the at least one transmitter device 4004. Further, the registration request may include a unique receiver device identifier. Further, the at least one transmitter device 4004 may be configured for analyzing the registration request. Further, the at least one transmitter device 4004 may be configured for accessing a distributed block-chain associated with wireless energy transfer based on the analyzing. Further, the at least one transmitter device 4004 may be configured for authenticating the receiver device 4000 based on the accessing. Further, the at least one transmitter device 4004 may be configured for transmitting the energy wirelessly to the receiver transceiver 4002 based on the authenticating.

Figure 41:
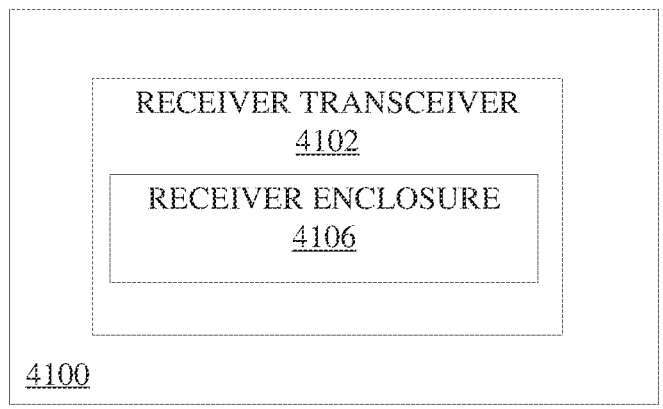
FIG. 41 is a block diagram of a receiver device for facilitating transaction of energy wirelessly received by the receiver device, in accordance with some embodiments.
Figure 42:
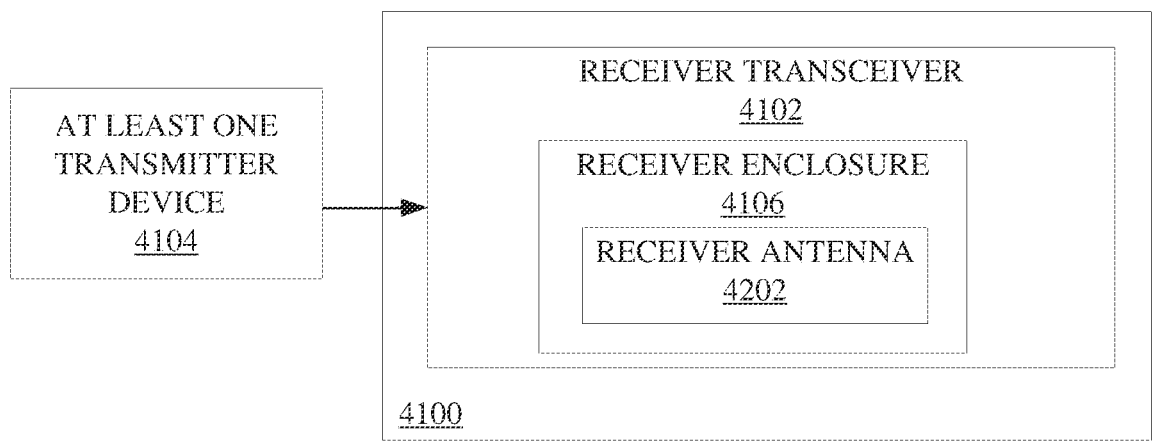
FIG. 42 is a block diagram of the receiver device for facilitating the transaction of the energy wirelessly received by the receiver device, in accordance with some embodiments.

FIG. 41 is a block diagram of a receiver device 4100 for facilitating transaction of energy wirelessly received by the receiver device 4100, in accordance with some embodiments. Accordingly, the receiver device 4100 may include a receiver transceiver 4102. Further, the receiver transceiver 4102 may be configured for receiving energy wirelessly from at least one transmitter device 4104. Further, the receiver transceiver 4102 may include a receiver enclosure 4106. Further, the receiver enclosure 4106 may include at least one metamaterial. Further, the energy may include terahertz electromagnetic wave energy. Further, the receiver enclosure 4106 may be configured for storing the terahertz electromagnetic wave energy based on the receiving of the energy. Further, the receiver enclosure 4106 may be configured for converting the terahertz electromagnetic wave energy into electrical energy. Further, the electrical energy may be transferable to at least one electronic device based on the converting. Further, the receiver enclosure 4106 may include a receiver antenna 4202, as shown in FIG. 42, configured for facilitating the receiving of the energy wirelessly. Further, the receiver antenna 4202 may include at least one superconducting material. Further, the receiver transceiver 4102 may be configured for transmitting a registration request to the at least one transmitter device 4104. Further, the registration request may include a unique receiver device identifier. Further, the receiver transceiver 4102 may be configured for transmitting the electrical energy associated with at least one energy asset to at least one electrical load based on the creating. Further, the at least one energy asset may be at least one quantum energy asset. Further, the at least one energy asset may be a fractional non-fungible token (F-NFT) energy asset. Further, the fractional non-fungible token (F-NFT) energy asset may be a fractional non-fungible token (F-NFT) quantum energy asset. Further, the fractional non-fungible token (F-NFT) energy asset may be defined as a fractional non-fungible energy token (F-NFT) that may be a unique and non-interchangeable unit of energy stored on a digital ledger. Further, the F-NFT may be used to represent an energy asset as a unique asset that utilizes the blockchain technology to establish a verified and a public proof of energy asset ownership. Further, the receiver device 4100 may be configured for generating the at least one energy asset based on the converting. Further, the receiver device 4100 may be configured for accessing a second distributed block-chain associated with at least one transaction of the at least one energy asset based on the generating of the at least one energy asset. Further, the receiver device 4100 may be configured for creating at least one entry for the at least one transaction of the at least one energy asset in the second distributed block-chain based on the accessing of the second distributed block-chain. Further, the at least one transmitter device 4104 may be configured for analyzing the registration request. Further, the at least one transmitter device 4104 may be configured for accessing a distributed block-chain associated with wireless energy transfer based on the analyzing. Further, the at least one transmitter device 4104 may be configured for authenticating the receiver device 4100 based on the accessing of the distributed block-chain. Further, the at least one transmitter device 4104 may be configured for transmitting the energy wirelessly to the receiver transceiver 4102 based on the authenticating.

Further, in some embodiments, the receiver enclosure 4106 may be configured for vibrating based on the receiving of the terahertz electromagnetic wave energy. Further, the converting of the terahertz electromagnetic wave energy into the electrical energy may be based on the vibrating.

Further, in an embodiment, the at least one metamaterial forms at least one two-dimensional metamaterial layer. Further, the receiver enclosure 4106 may include the at least one two-dimensional metamaterial layer. Further, the at least one two-dimensional metamaterial layer may be associated with at least one electrical conductivity. Further, the at least one two-dimensional metamaterial layer may include a first metamaterial layer associated with a first electrical conductivity and a second metamaterial layer associated with a second electrical conductivity. Further, the vibrating of the receiver enclosure 4106 may include vibrating of the first metamaterial layer in relation to the second metamaterial layer based on the receiving of the terahertz electromagnetic wave energy. Further, the converting of the terahertz electromagnetic wave energy into the electrical energy may be further based on the vibrating of the first metamaterial layer in relation to the second metamaterial layer.

Figure 43:
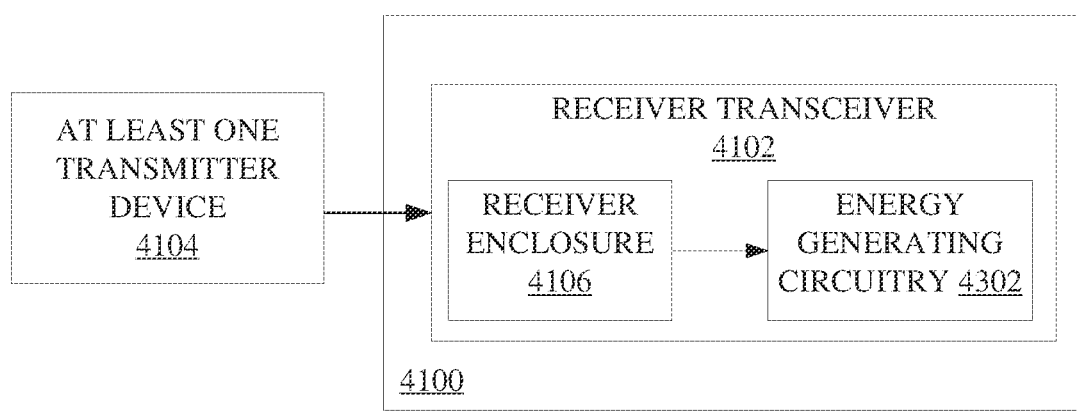
FIG. 43 is a block diagram of the receiver device for facilitating the transaction of the energy wirelessly received by the receiver device, in accordance with some embodiments.

Further, in an embodiment, the receiver transceiver 4102 further may include at least one energy generating circuitry 4302, as shown in FIG. 43. Further, the at least one energy generating circuitry 4302 may be mechanically coupled with the receiver enclosure 4106. Further, the at least one energy generating circuitry 4302 may be a quantum energy generating circuitry. Further, the at least one energy generating circuitry 4302 may be configured for generating alternating current electrical energy based on the vibrating. Further, the electrical energy may include the alternating current electrical energy. Further, in an embodiment, the at least one energy generating circuitry 4302 may be configured for converting the alternating current electrical energy into direct current electrical energy based on the generating of the alternating current electrical energy. Further, the direct current electrical energy may be transferrable to the at least one electronic device.

Further, in some embodiments, the generating of the at least one energy asset may include generating at least one quantum fractional non-fungible token (F-NFT) energy asset quantumly based on the converting. Further, the at least one quantum fractional non-fungible token (F-NFT) energy asset may be associated with at least one quantum energy asset storage digital wallet. Further, the at least one quantum fractional non-fungible token (F-NFT) energy asset may be defined as a quantum fractional non-fungible energy token that may be a unique and non-interchangeable unit of energy stored on a digital ledger. Further, the quantum F-NFT may be used to represent an energy asset as a unique asset, and use the blockchain technology to establish a verified and public proof of ownership with a quantum energy storage digital asset wallet.

Further, in some embodiments, the receiver device 4100 may be further configured for implementing at least one indistinguishability obfuscation algorithm during at least one of the accessing of the second distributed block-chain, the creating of the at least one entry, and the transmitting of the at least one energy asset. Further, the implementing of the at least one indistinguishability obfuscation algorithm indistinguishably obfuscate at least one of the accessing of the second distributed block-chain, the creating of the at least one entry, and the transmitting of the at least one energy asset.

Further, in some embodiments, the receiver transceiver 4102 may be comprised of at least one of graphene, molybdenum disulfide, molybdenum diselenide, tungsten disulfide, tungsten diselenide, rhenium disulfide, rhenium diselenide, boron nitride, and at least one compound. Further, the at least one compound satisfies a chemical formula MX2. Further, M may be a transition metal and X may be a non-metal.

Further, in some embodiments, the at least one metamaterial may include at least one layer of at least one graphene. Further, the receiver enclosure 4106 may include the at least one layer of the at least one graphene. Further, in an embodiment, the at least one graphene may include a first graphene, a second graphene, a third graphene, and a fourth graphene. Further, the first graphene may include a mono layer graphene, the second graphene may include a very few layer graphene, the third graphene may include a few layer graphene, and the fourth graphene may include a multi layer graphene. Further, in an embodiment, the receiver enclosure 4106 may include one layer of the first graphene, one to three layers of the second graphene, two to five layers of the third graphene, and one to ten layers of the fourth graphene.

Figure 44:
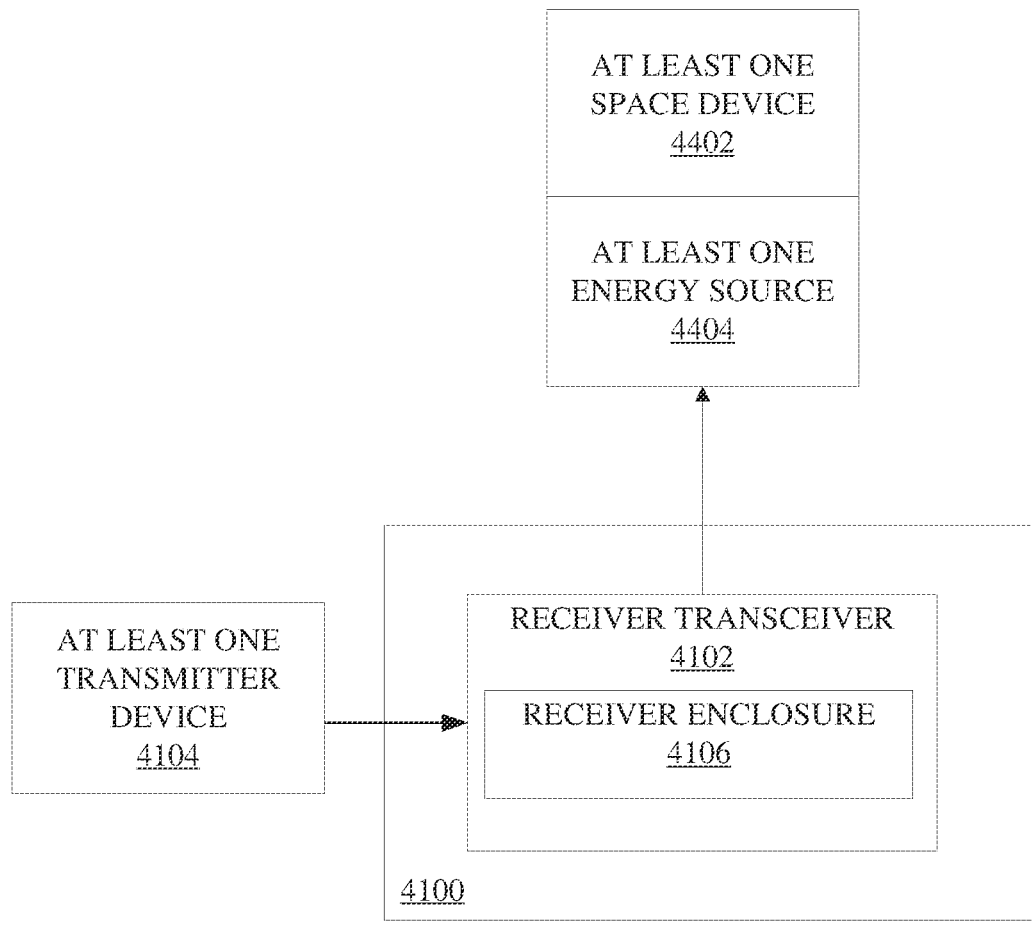
FIG. 44 is a block diagram of the receiver device for facilitating the transaction of the energy wirelessly received by the receiver device, in accordance with some embodiments.

Further, in some embodiments, the receiver device 4100 may be couplable to at least one space device 4402, as shown in FIG. 44. Further, the at least one space device 4402 may include a spacecraft, a space station, a space probe, etc. Further, the at least one space device 4402 traverses a space. Further, the at least one electronic device may include at least one energy source 4404, as shown in FIG. 44, of the at least one space device 4402. Further, the at least one energy source 4404 electrically powers the at least one space device 4402 in the space. Further, the electrically powering of the at least one space device 4402 may be based on transferring of the electrical energy to the at least one energy source 4404.

Figure 45:
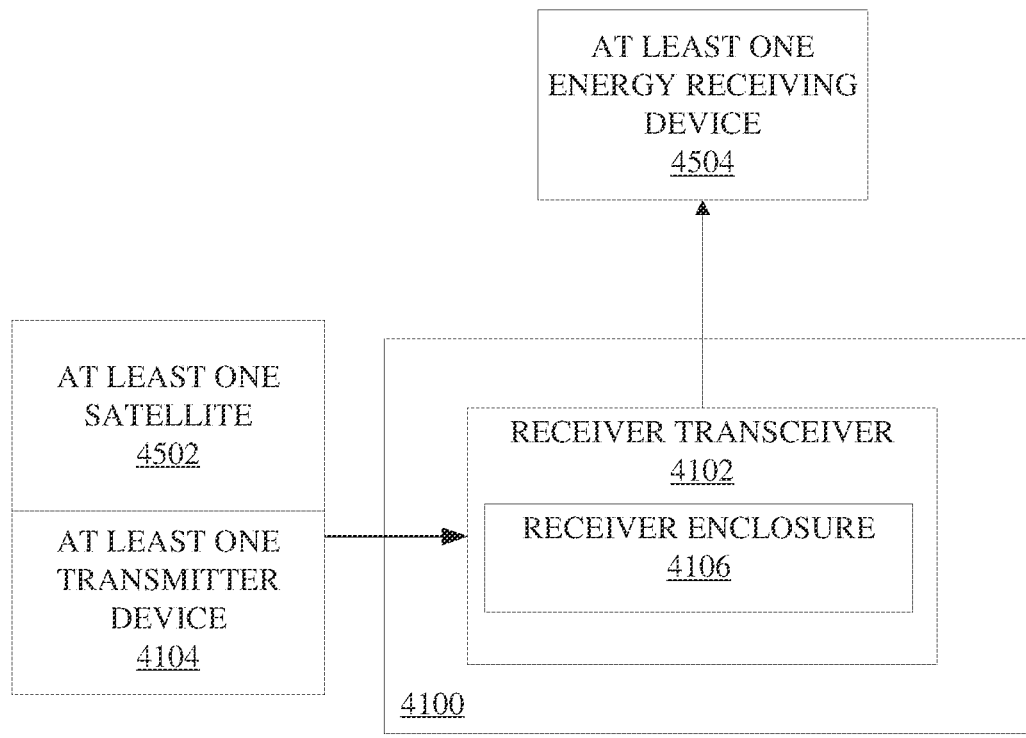
FIG. 45 is a block diagram of the receiver device for facilitating the transaction of the energy wirelessly received by the receiver device, in accordance with some embodiments.

Further, in some embodiments, the at least one transmitter device 4104 may be comprised in at least one satellite 4502, as shown in FIG. 45. Further, the at least one satellite 4502 orbits the earth. Further, the at least one satellite 4502 receives the terahertz electromagnetic wave energy from at least one terahertz electromagnetic energy source based on orbiting the earth. Further, the at least one terahertz electromagnetic energy source may include the sun. Further, the transmitting of the terahertz electromagnetic wave energy wirelessly to the receiver transceiver 4102 may be further based on receiving of the terahertz electromagnetic wave energy from the at least one terahertz electromagnetic energy source. Further, the at least one electronic device may include at least one energy receiving device 4504, as shown in FIG. 45. Further, the at least one energy receiving device 4504 may be disposed on the earth. Further, the receiver transceiver 4102 may be configured for wirelessly transferring the electrical energy to the at least one energy receiving device 4504.

FIG. 42 is a block diagram of the receiver device 4100 for facilitating the transaction of the energy wirelessly received by the receiver device 4100, in accordance with some embodiments.

FIG. 43 is a block diagram of the receiver device 4100 for facilitating the transaction of the energy wirelessly received by the receiver device 4100, in accordance with some embodiments.

FIG. 44 is a block diagram of the receiver device 4100 for facilitating the transaction of the energy wirelessly received by the receiver device 4100, in accordance with some embodiments.

FIG. 45 is a block diagram of the receiver device 4100 for facilitating the transaction of the energy wirelessly received by the receiver device 4100, in accordance with some embodiments.

Figure 46:
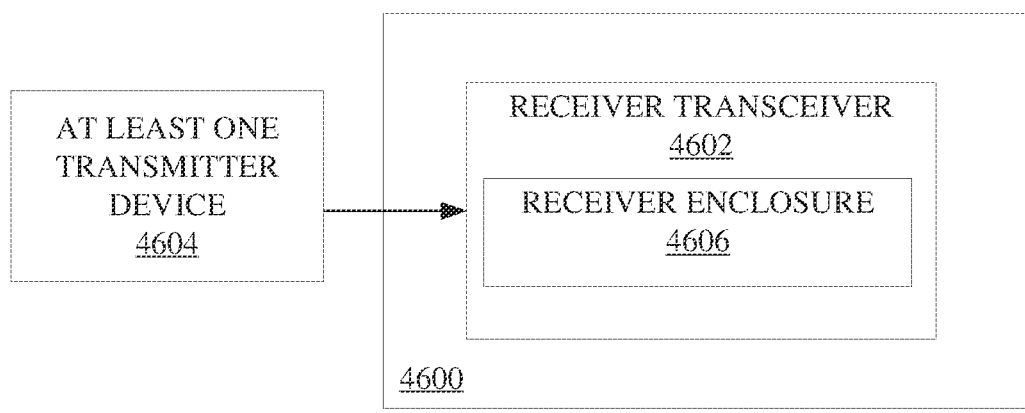
FIG. 46 is a block diagram of a receiver device for facilitating transaction of energy wirelessly received by the receiver device, in accordance with some embodiments.

FIG. 46 is a block diagram of a receiver device 4600 for facilitating transaction of energy wirelessly received by the receiver device 4600, in accordance with some embodiments. Accordingly, the receiver device 4600 may include a receiver transceiver 4602. Further, the receiver transceiver 4602 may be configured for receiving energy wirelessly from at least one transmitter device 4604. Further, the receiver transceiver 4602 may include a receiver enclosure 4606. Further, the receiver enclosure 4606 may include at least one metamaterial. Further, the energy may include terahertz electromagnetic wave energy. Further, the receiver enclosure 4606 may be configured for storing the terahertz electromagnetic wave energy based on the receiving of the energy. Further, the receiver enclosure 4606 may be configured for converting the terahertz electromagnetic wave energy into electrical energy. Further, the electrical energy may be transferable to at least one electronic device based on the converting. Further, the receiver enclosure 4606 may be configured for vibrating based on the receiving of the terahertz electromagnetic wave energy. Further, the converting of the terahertz electromagnetic wave energy into the electrical energy may be based on the vibrating. Further, the receiver enclosure 4606 may include a receiver antenna configured for facilitating the receiving of the energy wirelessly. Further, the receiver antenna may include at least one superconducting material. Further, the receiver transceiver 4602 may be configured for transmitting a registration request to the at least one transmitter device 4604. Further, the registration request may include a unique receiver device identifier. Further, the receiver transceiver 4602 may be configured for transmitting the electrical energy associated with at least one energy asset to at least one electrical load based on the creating. Further, the at least one energy asset may be a fractional non-fungible token (F-NFT) energy asset. Further, the fractional non-fungible token (F-NFT) energy asset may be defined as a fractional non-fungible energy token (F-NFT) that may be a unique and non-interchangeable unit of energy stored on a digital ledger. Further, the F-NFT may be used to represent an energy asset as a unique asset that utilizes the blockchain technology to establish a verified and a public proof of energy asset ownership. Further, the receiver device 4600 may be configured for generating the at least one energy asset based on the converting. Further, the receiver device 4600 may be configured for accessing a second distributed block-chain associated with at least one transaction of the at least one energy asset based on the generating of the at least one energy asset. Further, the receiver device 4600 may be configured for creating at least one entry for the at least one transaction of the at least one energy asset in the second distributed block-chain based on the accessing of the second distributed block-chain. Further, the at least one transmitter device 4604 may be configured for analyzing the registration request. Further, the at least one transmitter device 4604 may be configured for accessing a distributed block-chain associated with wireless energy transfer based on the analyzing. Further, the at least one transmitter device 4604 may be configured for authenticating the receiver device 4600 based on the accessing of the distributed block-chain. Further, the at least one transmitter device 4604 may be configured for transmitting the energy wirelessly to the receiver transceiver 4602 based on the authenticating.

Further, in some embodiments, the at least one metamaterial forms at least one two-dimensional metamaterial layer. Further, the receive enclosure may include the at least one two-dimensional metamaterial layer. Further, the at least one two-dimensional metamaterial layer may be associated with at least one electrical conductivity. Further, the at least one two-dimensional metamaterial layer may include a first metamaterial layer associated with a first electrical conductivity and a second metamaterial layer associated with a second electrical conductivity. Further, the vibrating of the receiver enclosure 4606 may include vibrating of the first metamaterial layer in relation to the second metamaterial layer based on the receiving of the terahertz electromagnetic wave energy. Further, the converting of the terahertz electromagnetic wave energy into the electrical energy may be further based on the vibrating of the first metamaterial layer in relation to the second metamaterial layer.

Further, in some embodiments, the receiver transceiver 4602 further may include at least one energy generating circuitry. Further, the at least one energy generating circuitry may be mechanically coupled with the receiver enclosure 4606. Further, the at least one energy generating circuitry may be configured for generating alternating current electrical energy based on the vibrating. Further, the electrical energy may include the alternating current electrical energy. Further, in an embodiment, the at least one energy generating circuitry may be configured for converting the alternating current electrical energy into direct current electrical energy based on the generating of the alternating current electrical energy. Further, the direct current electrical energy may be transferrable to the at least one electronic device.

Further, in some embodiments, the generating of the at least one energy asset may include generating at least one quantum fractional non-fungible token (F-NFT) energy asset quantumly based on the converting. Further, the at least one quantum fractional non-fungible token (F-NFT) energy asset may be associated with at least one quantum energy asset storage digital wallet. Further, the at least one quantum fractional non-fungible token (F-NFT) energy asset may be defined as a quantum fractional non-fungible energy token that may be a unique and non-interchangeable unit of energy stored on a digital ledger. Further, the quantum F-NFT may be used to represent an energy asset as a unique asset, and use the blockchain technology to establish a verified and public proof of ownership with a quantum energy storage digital asset wallet.

Further, in some embodiments, the receiver device 4600 may be further configured for implementing at least one indistinguishability obfuscation algorithm during at least one of the accessing of the second distributed block-chain, the creating of the at least one entry, and the transmitting of the at least one energy asset. Further, the implementing of the at least one indistinguishability obfuscation algorithm indistinguishably obfuscate at least one of the accessing of the second distributed block-chain, the creating of the at least one entry, and the transmitting of the at least one energy asset.

Further, in some embodiments, the receiver transceiver 4602 may be comprised of at least one of graphene, molybdenum disulfide, molybdenum diselenide, tungsten disulfide, tungsten diselenide, rhenium disulfide, rhenium diselenide, boron nitride, and at least one compound. Further, the at least one compound satisfies a chemical formula $MX_2$. Further, M may be a transition metal and X may be a non-metal.

Figure 47:
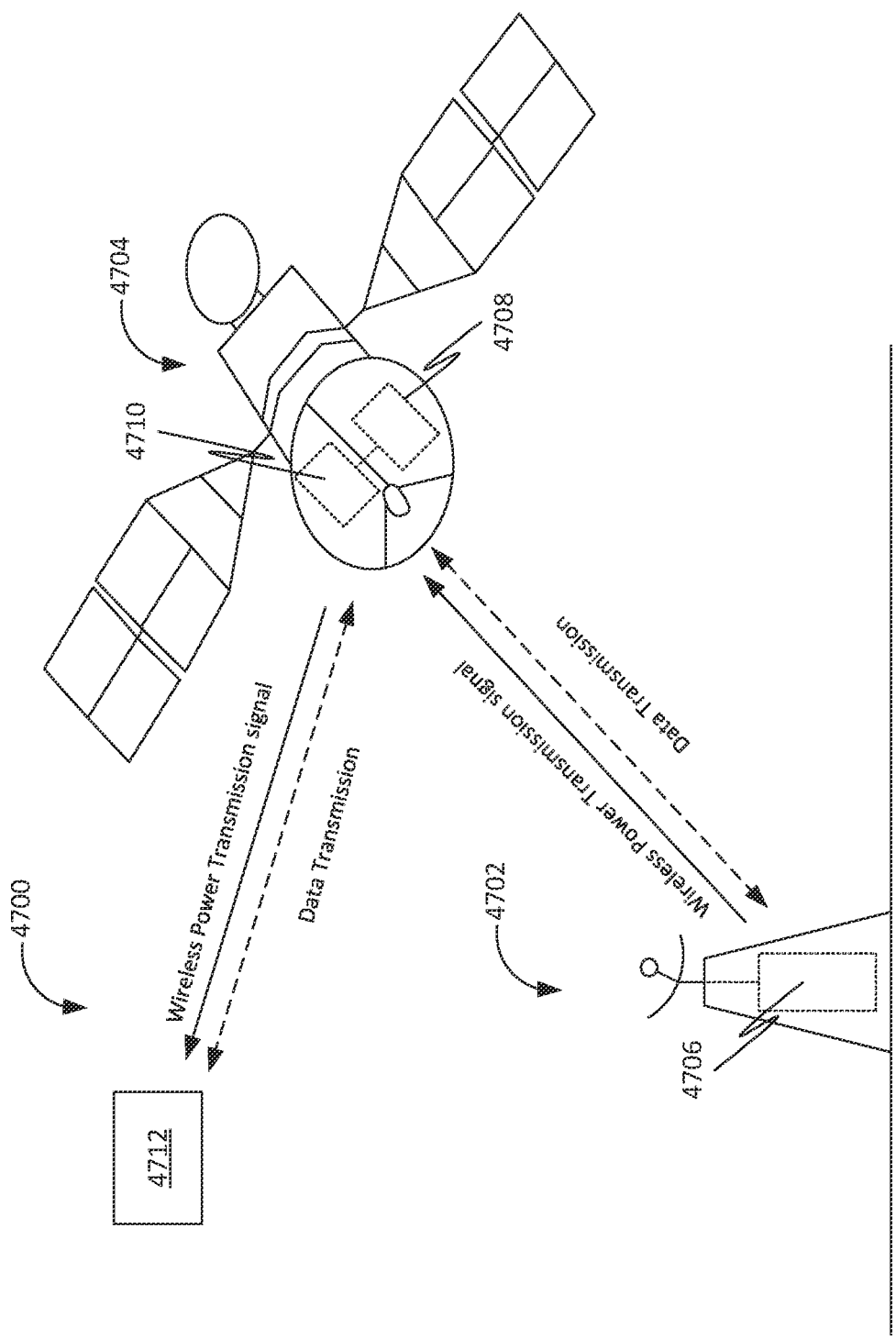
FIG. 47 is a schematic of a system for facilitating wireless energy transmissions, in accordance with some embodiments.

FIG. 47 is a schematic of a system 4700 for facilitating wireless energy transmissions, in accordance with some embodiments. Accordingly, the system 4700 may include at least one ground station 4702 and at least one space station 4704. Further, the system 4700 may be a quantum energy system.

Further, the at least one ground station 4702 may be positioned in at least one location on the earth. Further, the at least one ground station 4702 may include at least one transmitter device (a transmitter) 4706.

Figure 50:
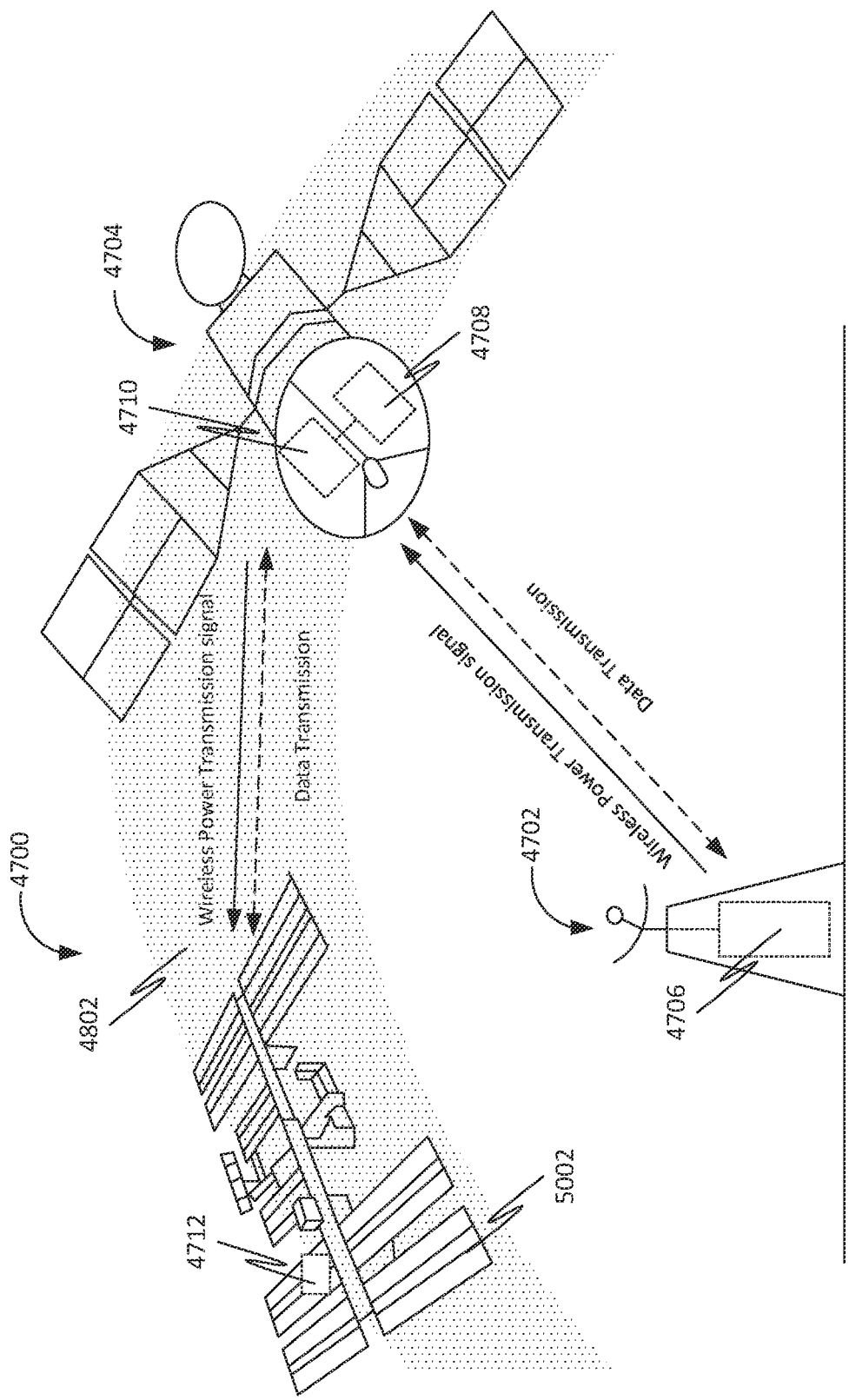
FIG. 50 is a schematic of the system for facilitating wireless energy transmissions to the at least one secondary receiver device positioned in the ionosphere, in accordance with some embodiments.
Figure 52:
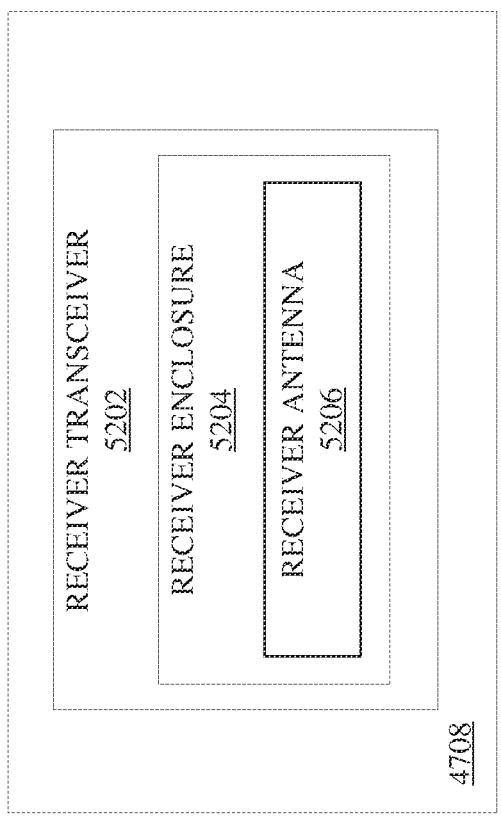
FIG. 52 is a block diagram of the primary receiver device of the at least one space station of the system, in accordance with some embodiments.

Further, the at least one space station 4704 may be positioned in at least one orbit around the earth. Further, each of the at least one space station 4704 may include a primary receiver device (a receiver and/or a receiver device) 4708 and a primary transmitter device (a transmitter) 4710. Further, the primary receiver device 4708 may include a receiver transceiver (a transceiver) 5202, as shown in FIG. 52. Further, the at least one transmitter device 4706 may be configured for transmitting energy wirelessly to the receiver transceiver 5202. Further, the energy may include terahertz electromagnetic wave energy. Further, the receiver transceiver 5202 may be configured for receiving the energy wirelessly from the at least one transmitter device 4706 based on the transmitting of the energy wirelessly. Further, the receiver transceiver 5202 may include a receiver enclosure (an enclosure) 5204, as shown in FIG. 52. Further, the receiver enclosure 5204 may include at least one metamaterial. Further, the receiver enclosure 5204 may be configured for converting the terahertz electromagnetic wave energy into electrical energy based on the receiving of the energy. Further, the receiver enclosure 5204 may include a receiver antenna (an antenna) 5206, as shown in FIG. 52, configured for facilitating the receiving of the energy wirelessly. Further, the receiver antenna 5206 may include at least one superconducting material. Further, the primary transmitter device 4710 may be electrically coupled with the primary receiver device 4708. Further, the primary transmitter device 4710 may be configured for transmitting the electrical energy wirelessly to at least one secondary receiver device (a receiver and/or a receiver device) 4712 based on the converting. Further, in an embodiment, the at least one secondary receiver device 4712 may be mounted on at least one space station (international space station) 5002, as shown in FIG. 50. Further, the at least one secondary receiver device 4712 powers the at least one space station 5002. Further, the at least one space station 5002 orbits around the earth in at least one low earth orbit.

Figure 48:
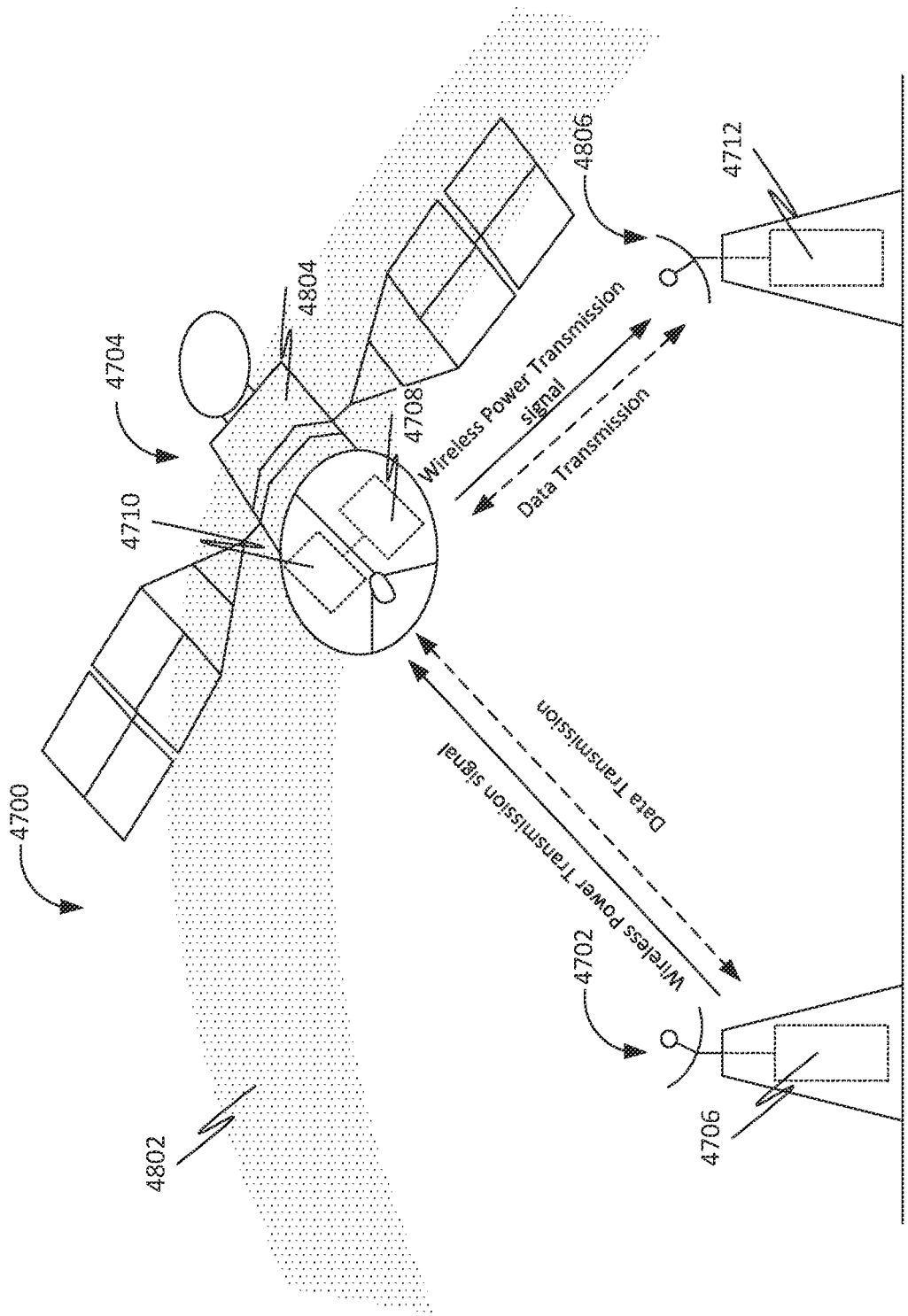
FIG. 48 is a schematic of the system for facilitating wireless energy transmissions to the at least one secondary receiver device positioned below the ionosphere, in accordance with some embodiments.

Further, in some embodiments, the at least one space station 4704 may include at least one low earth orbit satellite 4804, as shown in FIG. 48. Further, the at least one orbit may include at least one low earth orbit. Further, the at least one low earth orbit may be in the ionosphere 4802, as shown in FIG. 48, of the atmosphere of the earth.

Figure 51:
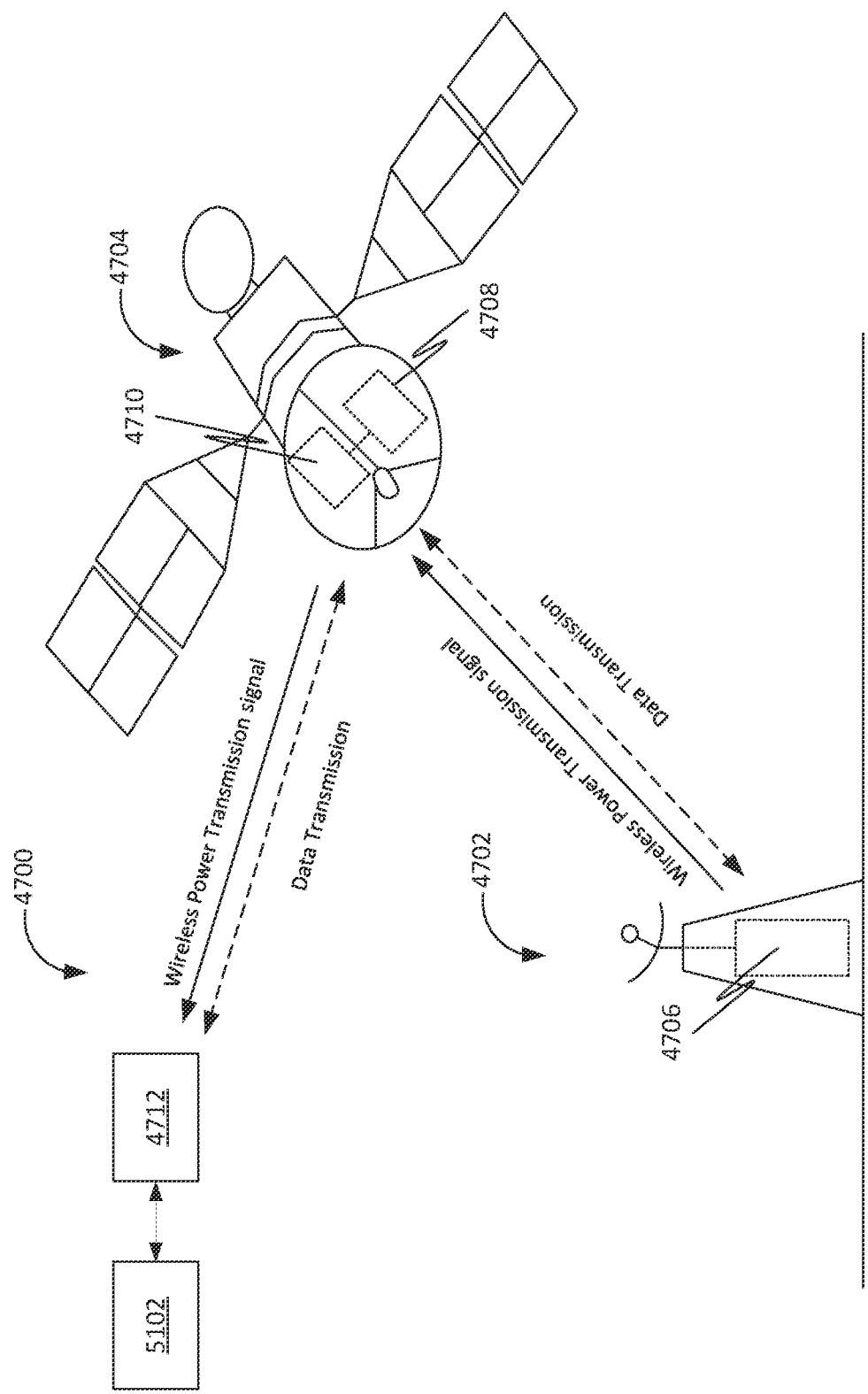
FIG. 51 is a schematic of the system for facilitating wireless energy transmissions to the at least one secondary receiver device for powering the at least one electronic device, in accordance with some embodiments.
Figure 53:
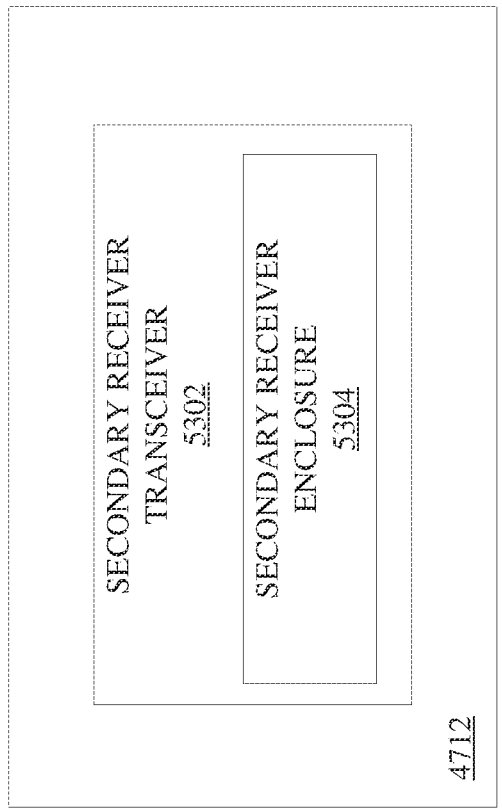
FIG. 53 is a block diagram of the at least one secondary receiver device of the system, in accordance with some embodiments.

Further, in an embodiment, the at least one secondary receiver device 4712 may be positioned at least one of above and below the ionosphere 4802. Further, the transmitting of the electrical energy wirelessly to the at least one secondary receiver device 4712 may include converting the electrical energy into electromagnetic wave energy and emitting the electromagnetic wave energy into the ionosphere 4802 with at least one radiating characteristic for refracting the electromagnetic wave energy towards the at least one secondary receiver device 4712 based on the converting of the electrical energy into the electromagnetic wave energy. Further, the at least one radiating characteristic may include a wattage, an angle from the verticle, an azimuth angle, a frequency, a power, an amplitude, etc. of the electromagnetic wave energy. In an embodiment, the system 4700 may include the at least one secondary receiver device 4712. Further, the at least one secondary receiver device 4712 may be electrically couplable with at least one electronic device 5102, as shown in FIG. 51, associated with at least one of a virtual reality environment, an augmented reality environment, a mixed reality environment, and an extended reality environment. Further, at least one of the virtual reality environment, the augmented reality environment, the mixed reality environment, and the extended reality environment may include Metaverse™. Further, the at least one electronic device 5102 may include wearables, HMTD, earphones, tactile/haptic feedback devices, etc. Further, the at least one secondary receiver device 4712 may include at least one secondary receiver transceiver 5302, as shown in FIG. 53, configured for receiving the electromagnetic wave energy wirelessly from the primary transmitter device 4710 based on the emitting. Further, the at least one secondary receiver transceiver 5302 may include at least one secondary receiver enclosure 5304, as shown in FIG. 53. Further, the at least one secondary receiver enclosure 5304 may be configured for converting the electromagnetic wave energy into electrical energy based on the receiving of the electromagnetic wave energy. Further, the at least one secondary receiver device 4712 may be configured for powering the at least one electronic device 5102 based on the converting of the electromagnetic wave energy into the electrical energy.

Further, in an embodiment, the at least one secondary receiver device 4712 may be movably positioned at least one of above and below the ionosphere 4802. Further, the at least one electronic device 5102 may be an energy source of at least one electric vehicle, a smart city, a smart structure, an autonomous vehicle, drones, etc.

Figure 54:
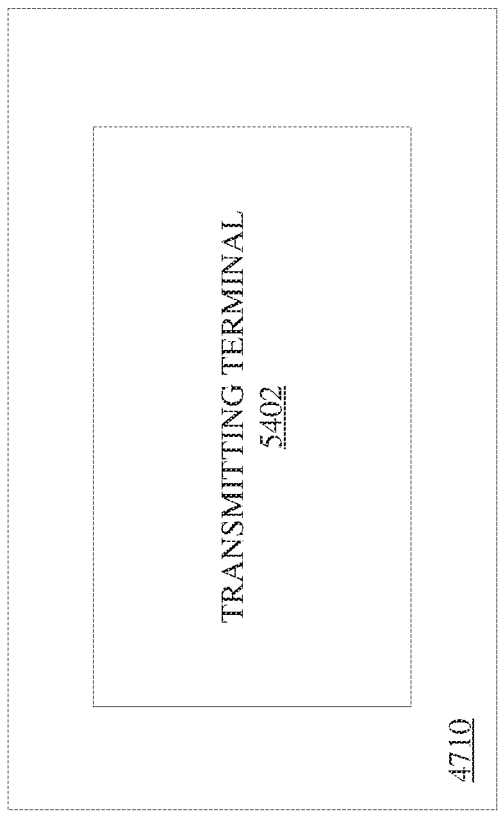
FIG. 54 is a block diagram of the primary transmitter device of the at least one space station of the system, in accordance with some embodiments.
Figure 55:
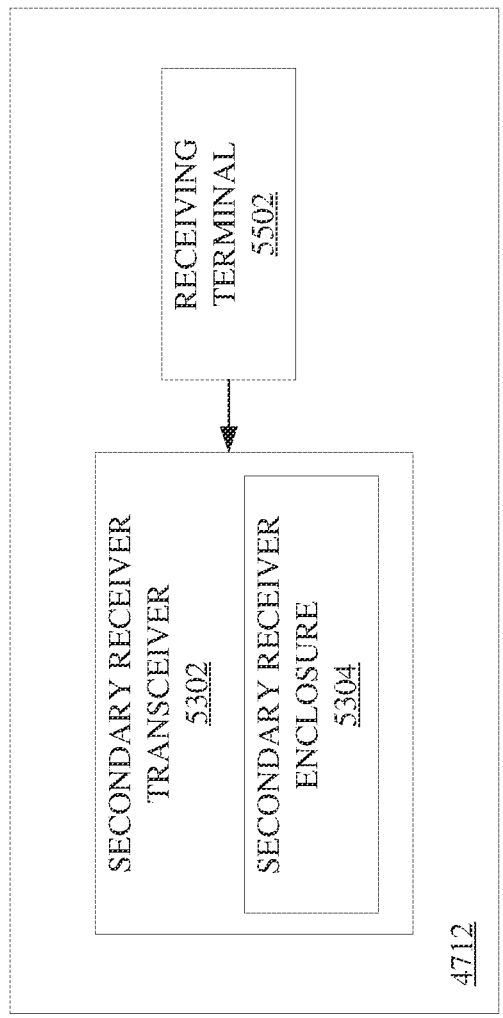
FIG. 55 is a block diagram of the at least one secondary receiver device of the system, in accordance with some embodiments.

Further, in an embodiment, the at least one secondary receiver device 4712 may be positioned in the ionosphere 4802. Further, the transmitting of the electrical energy wirelessly to the at least one secondary receiver device 4712 may include conducting the electrical energy to the at least one secondary receiver device 4712 via the ionosphere 4802. Further, in an embodiment, the primary transmitter device 4710 may include a transmitting terminal (gold tip) 5402, as shown in FIG. 54. Further, the conducting of the electrical energy may include generating an amount of the electromotive force (EMF) corresponding to the electrical energy on the transmitting terminal 5402. Further, the generating of the amount of the electromotive force creates a flow of the electrical energy towards a receiving terminal 5502, as shown in FIG. 55, of the at least one secondary receiver device 4712 through the ionosphere 4802.

Figure 56:
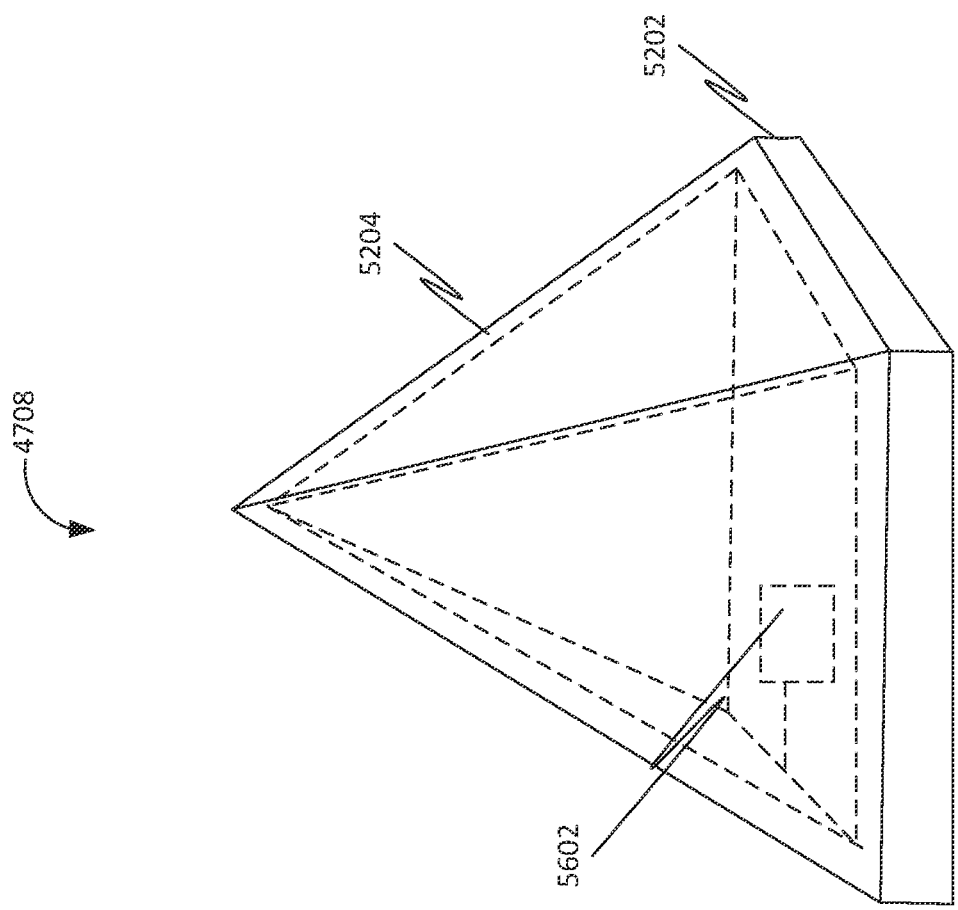
FIG. 56 is a perspective view of the primary receiver device of the system, in accordance with some embodiments.

Further, in some embodiments, the receiver transceiver 5202 further may include at least one energy storage device 5602, as shown in FIG. 56, disposed inside of the receiver enclosure 5204. Further, the at least one energy storage device 5602 may be electrically coupled with the receiver enclosure 5204. Further, the at least one energy storage device 5602 may be configured for storing the electrical energy after the converting. Further, the at least one energy storage device 5602 may be comprised of borophene.

Figure 57:
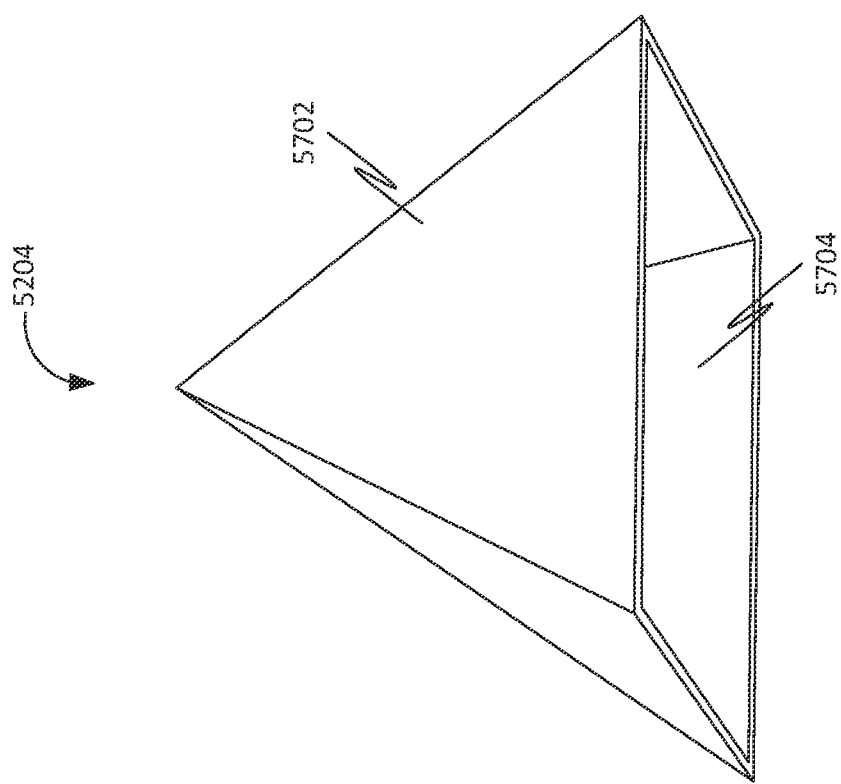
FIG. 57 is a bottom perspective view of the receiver enclosure of the receiver transceiver of the primary receiver device, in accordance with some embodiments.

Further, in some embodiments, the receiver enclosure 5204 may include at least one layer of at least one material on at least one of an outer surface 5702 and an inner surface 5704 of the receiver enclosure 5204, as shown in FIG. 57. Further, the at least one layer of the at least one material prevents transmission of electromagnetic wave energy through the receiver enclosure 5204. Further, in an embodiment, the at least one material may include white limestone tufa.

Further, in some embodiments, the receiver enclosure 5204 may include at least one layer of at least one material on at least one of an outer surface 5702 and an inner surface 5704 of the receiver enclosure 5204, as shown in FIG. 57. Further, the at least one layer of the at least one material prevents transmission of electrical energy through the receiver enclosure 5204. Further, in an embodiment, the at least one material may include pink granite.

Further, in some embodiments, the primary receiver device 4708 may be configured for generating at least one energy asset for the electrical energy based on the converting. Further, the at least one energy asset may be at least one quantum energy asset. Further, the primary receiver device 4708 may be configured for accessing a second distributed block-chain associated with at least one transaction of the at least one energy asset based on the generating of the at least one energy asset. Further, the primary receiver device 4708 may be configured for creating at least one entry for the at least one transaction of the at least one energy asset in the second distributed block-chain based on the accessing of the second distributed block-chain. Further, the transmitting of the electrical energy to the at least one secondary receiver device 4712 may be further based on the creating. Further, in an embodiment, the generating of the at least one energy asset may include generating at least one quantum fractional non-fungible token (F-NFT) energy asset quantumly based on the converting. Further, the at least one quantum fractional non-fungible token (F-NFT) energy asset may be associated with at least one quantum energy asset storage digital wallet. Further, the at least one quantum fractional non-fungible token (F-NFT) energy asset (fractional non-fungible token (F-NFT) quantum energy asset) may be stored in a quantum F-NFT vault. Further, the at least one asset may be the at least one quantum F-NFT energy asset. Further, the at least one quantum F-NFT energy asset may be an F-NFT quantum energy asset. Further, in an embodiment, the accessing of the second distributed block-chain may include accessing a digital wallet associated with the second distributed block-chain. Further, the digital wallet may be a quantum F-NFT wallet. Further, the creating of the at least one entry for the at least one transaction of the at least one energy asset may include creating the at least one entry for the at least one transaction of the at least one quantum F-NFT energy asset in the digital wallet using a private key. Further, the private key may be a quantum private key that may be distributed through quantum power key distribution. Further, in an embodiment, the at least one secondary receiver device 4712 may be configured for accessing the digital wallet associated with the second distributed block-chain. Further, the at least one secondary receiver device 4712 may be configured for creating at least one request for the at least one transaction of the at least one quantum F-NFT energy asset. Further, the creating of the at least one entry for the at least one transaction of the at least one quantum F-NFT energy asset in the digital wallet may be further based on the creating of the at least one request.

Further, in some embodiments, the primary receiver device 4708 may be configured for transmitting a registration request to the at least one transmitter device 4706. Further, the registration request may include a unique receiver device identifier associated with the primary receiver device 4708. Further, the at least one transmitter device 4706 may be configured for analyzing the registration request. Further, the at least one transmitter device 4706 may be configured for accessing a distributed block-chain associated with wireless energy transfer based on the analyzing. Further, the at least one transmitter device 4706 may be configured for authenticating the primary receiver device 4708 based on the accessing of the distributed block-chain. Further, the transmitting of the energy wirelessly to the receiver transceiver 5202 may be based on the authenticating.

Figure 61:
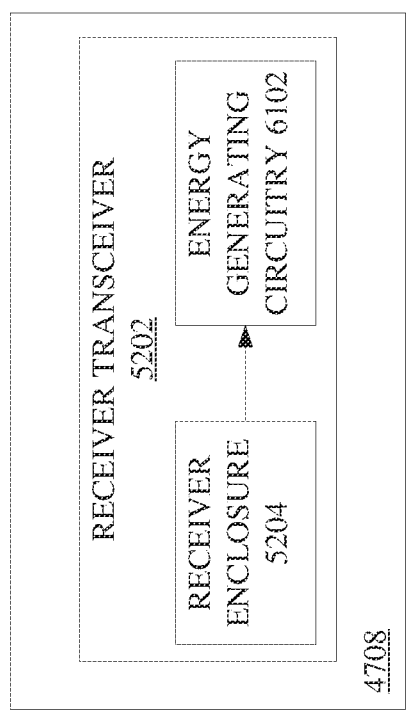
FIG. 61 is a block diagram of the primary receiver device of the system, in accordance with some embodiments.

Further, in some embodiments, the receiver enclosure 5204 may be configured for storing the terahertz electromagnetic wave energy based on the receiving of the energy. Further, the receiver enclosure 5204 may be configured for vibrating based on the receiving of the terahertz electromagnetic wave energy. Further, the converting of the terahertz electromagnetic wave energy into the electrical energy may be based on the vibrating. Further, in an embodiment, the receiver transceiver 5202 may include at least one energy generating circuitry 6102, as shown in FIG. 61. Further, the at least one energy generating circuitry 6102 may be mechanically coupled with the receiver enclosure 5204. Further, the at least one energy generating circuitry 6102 may be configured for generating alternating current electrical energy based on the vibrating. Further, the electrical energy may include the alternating current electrical energy.

Further, in some embodiments, the at least one metamaterial may include at least one layer of at least one graphene. Further, the receiver enclosure 5204 may include the at least one layer of the at least one graphene.

Further, in some embodiments, the at least one superconductor material inside and outside of the quantum energy system may include Borophene is used on the inside of the receiver enclosure 5204 and is a crystalline atomic monolayer of boron, i.e., it is a two-dimensional allotrope of boron and also known as boron sheet. Further, the outer surface 5702 of the receiver enclosure 5204 may include white limestone tufa (prevents any RF penetration leakage into the receiver enclosure 5204). Further, the inner surface 5704 of the receiver enclosure 5204 includes a Pink Granite Block (which contains quartz and has radioactive properties). Further, the Pink Granite Block prevents any electrical energy from escaping from within the receiver enclosure 5204. Further, the primary transmitter device 4710 may include a Gold tip (transmitting terminal) for allowing transferring of the electrical energy to the ionosphere 4802. Further, the at least one energy storage device 5602 may be a Capacitor (EIC) Model comprising Borophene. Further, the at least one metamaterial may include at least one of graphene, borophene, and bismuth.

FIG. 48 is a schematic of the system 4700 for facilitating wireless energy transmissions to the at least one secondary receiver device 4712 positioned below the ionosphere 4802, in accordance with some embodiments. Further, the at least one secondary receiver device 4712 may be mounted on a ground station 4806 separated by a distance from the at least one ground station 4702. Further, the ground station 4806 may be positioned on the earth. Further, in an embodiment, the ground station may be movably positioned on the earth.

Figure 49:
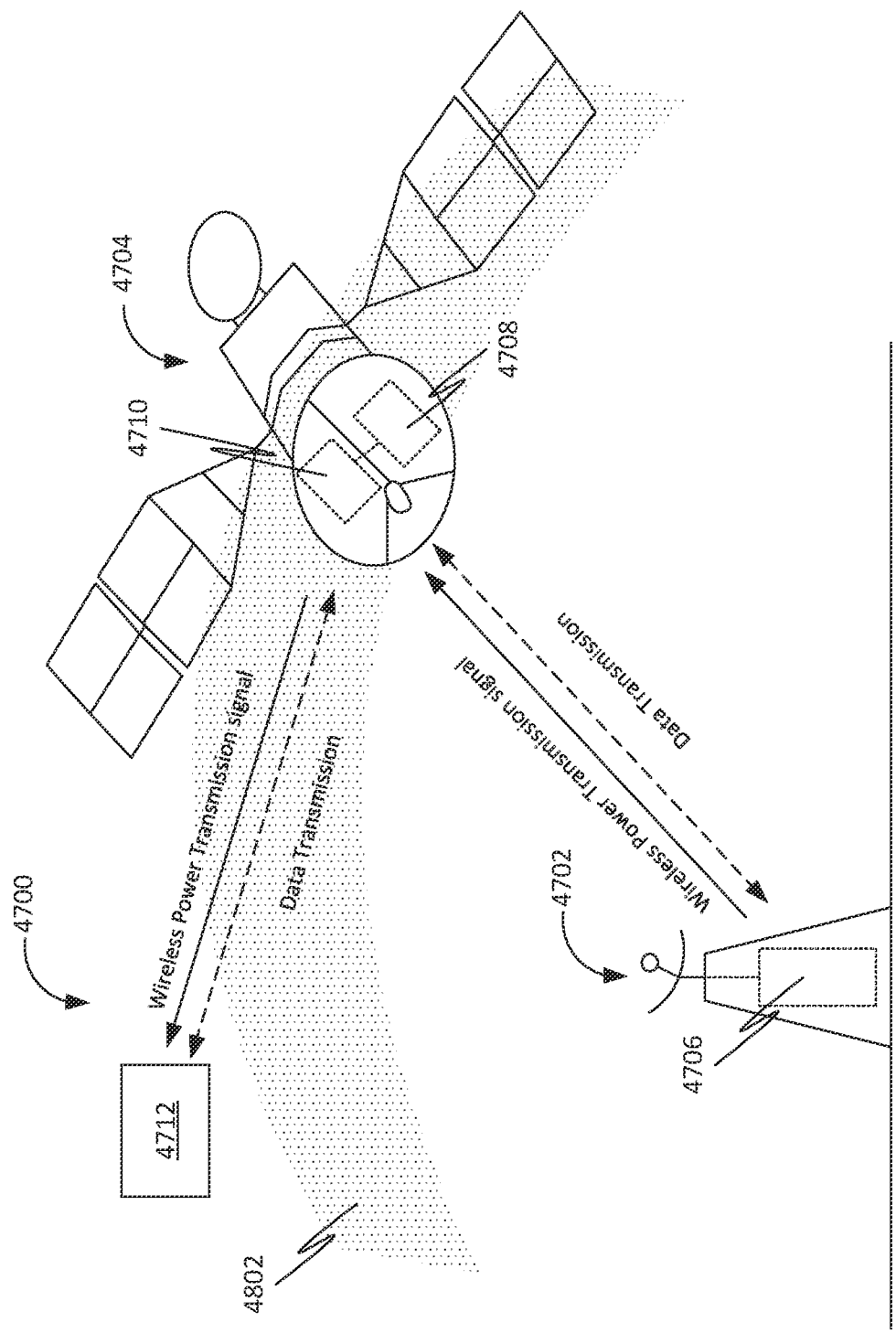
FIG. 49 is a schematic of the system for facilitating wireless energy transmissions to the at least one secondary receiver device positioned above the ionosphere, in accordance with some embodiments.

FIG. 49 is a schematic of the system 4700 for facilitating wireless energy transmissions to the at least one secondary receiver device 4712 positioned above the ionosphere 4802, in accordance with some embodiments. Further, the at least one secondary receiver device 4712 may be mounted on at least one satellite. Further, the at least one satellite may have at least one orbit above the ionosphere 4802.

FIG. 50 is a schematic of the system 4700 for facilitating wireless energy transmissions to the at least one secondary receiver device 4712 positioned in the ionosphere 4802, in accordance with some embodiments.

FIG. 51 is a schematic of the system 4700 for facilitating wireless energy transmissions to the at least one secondary receiver device 4712 for powering the at least one electronic device 5102, in accordance with some embodiments.

FIG. 52 is a block diagram of the primary receiver device 4708 of the at least one space station 4704 of the system 4700, in accordance with some embodiments.

FIG. 53 is a block diagram of the at least one secondary receiver device 4712 of the system 4700, in accordance with some embodiments.

FIG. 54 is a block diagram of the primary transmitter device 4710 of the at least one space station 4704 of the system 4700, in accordance with some embodiments.

FIG. 55 is a block diagram of the at least one secondary receiver device 4712 of the system 4700, in accordance with some embodiments.

FIG. 56 is a perspective view of the primary receiver device 4708 of the system 4700, in accordance with some embodiments.

FIG. 57 is a bottom perspective view of the receiver enclosure 5204 of the receiver transceiver 5202 of the primary receiver device 4708, in accordance with some embodiments. Further, the receiver enclosure 5204 may have a hollow square pyramid structure without a base.

Figure 58:
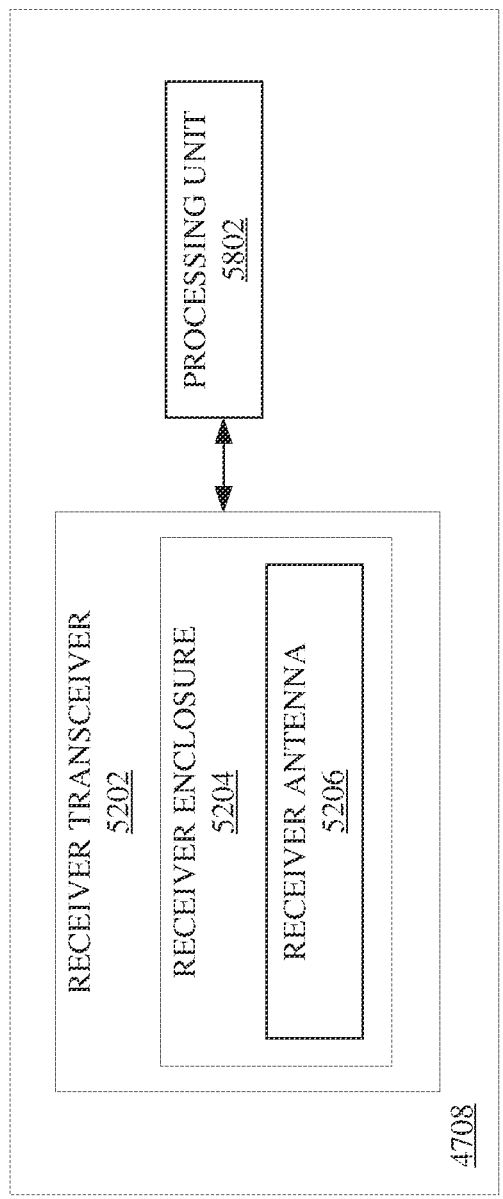
FIG. 58 is a block diagram of the primary receiver device of the system, in accordance with some embodiments.

FIG. 58 is a block diagram of the primary receiver device 4708 of the system 4700, in accordance with some embodiments. Further, the primary receiver device 4708 may include a processing unit 5802. Further, the processing unit 5802 may be communicatively coupled with the receiver transceiver 5202.

Figure 59:
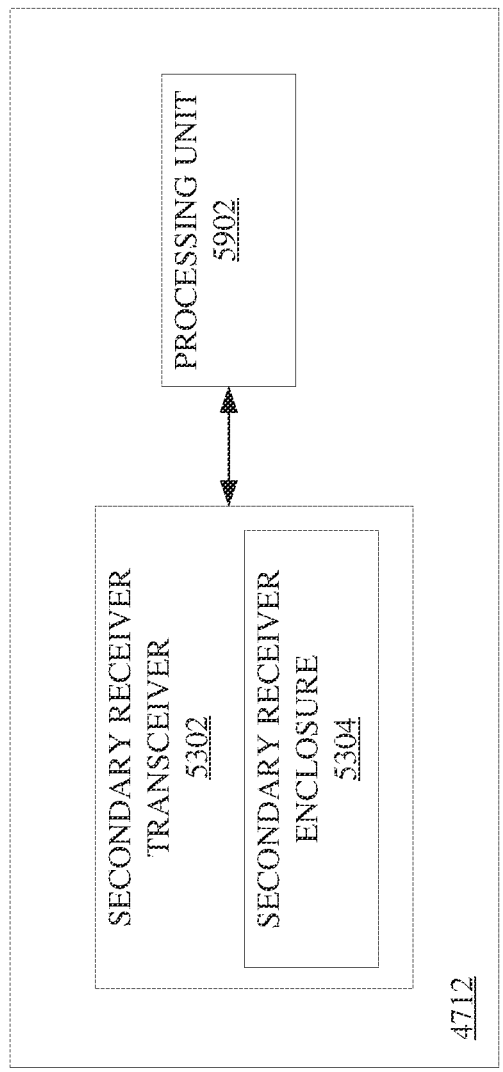
FIG. 59 is a block diagram of the at least one secondary receiver device of the system, in accordance with some embodiments.

FIG. 59 is a block diagram of the at least one secondary receiver device 4712 of the system 4700, in accordance with some embodiments. Further, the at least one secondary receiver device 4712 may include a processing unit 5902. Further, the processing unit 5902 may be communicatively coupled with the secondary receiver transceiver 5302.

Figure 60:
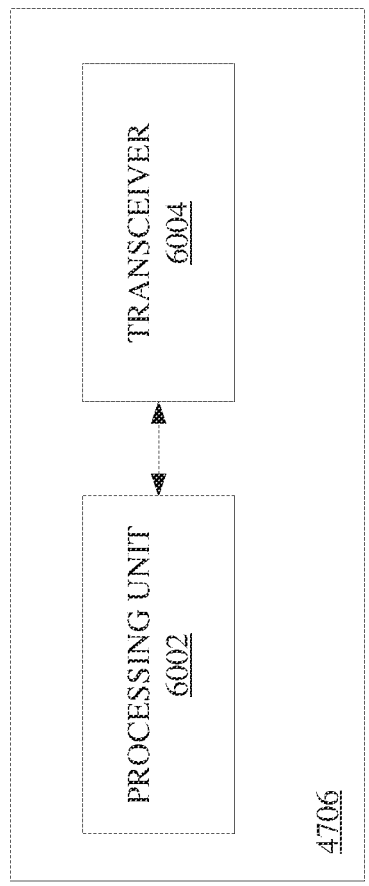
FIG. 60 is a block diagram of the at least one transmitter device of the system, in accordance with some embodiments.

FIG. 60 is a block diagram of the at least one transmitter device 4706 of the system 4700, in accordance with some embodiments. Further, the at least one transmitter device 4706 may include a processing unit 6002 and a transceiver 6004. Further, the processing unit 6002 may be communicatively coupled with the transceiver 6004.

FIG. 61 is a block diagram of the primary receiver device 4708 of the system 4700, in accordance with some embodiments.

Figure 62:
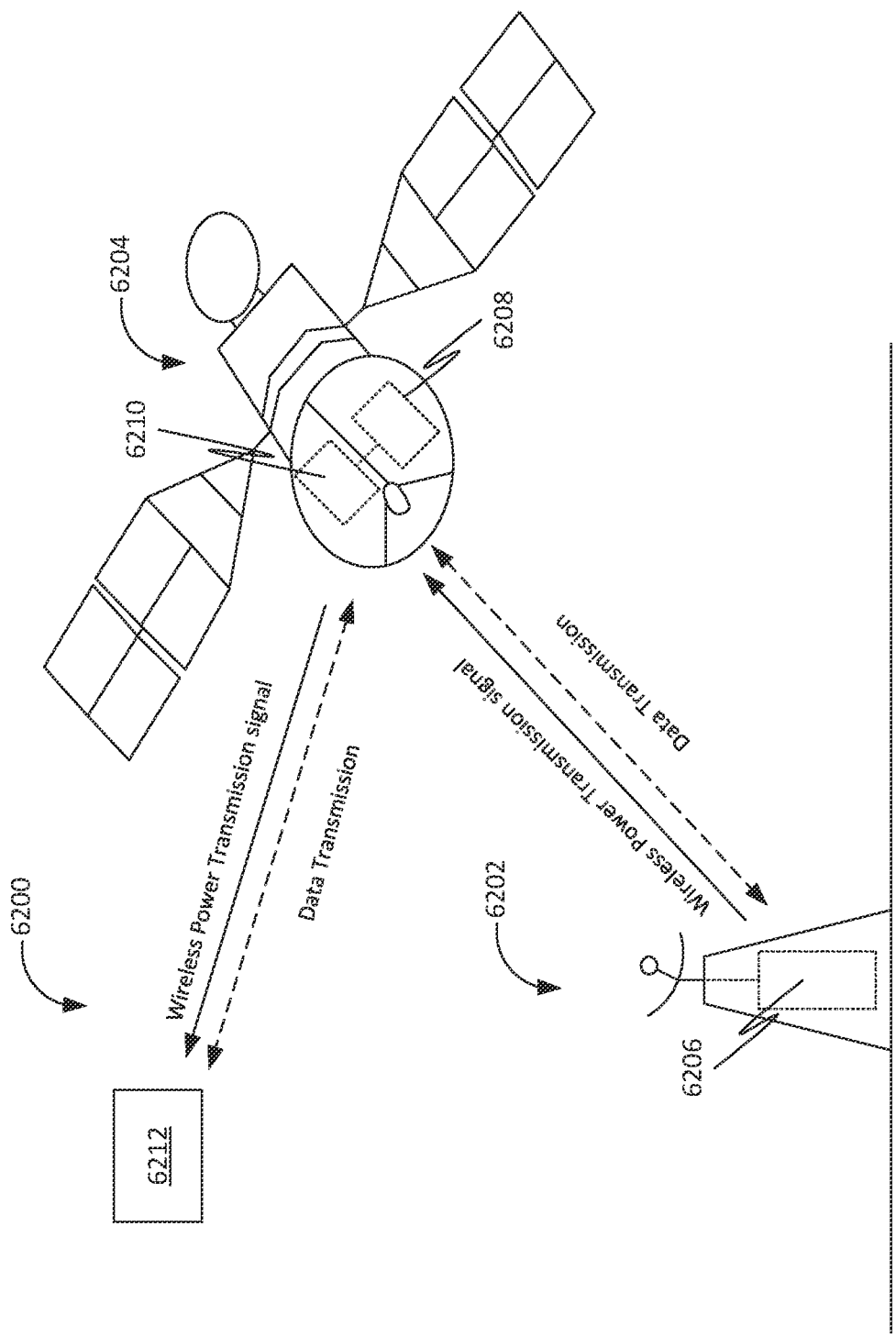
FIG. 62 is a schematic of a system for facilitating wireless energy transmissions, in accordance with some embodiments.

FIG. 62 is a schematic of a system 6200 for facilitating wireless energy transmissions, in accordance with some embodiments. Accordingly, the system 6200 may include at least one ground station 6202 and at least one space station 6204.

Further, the at least one ground station 6202 may be positioned in at least one location on the earth. Further, the at least one ground station 6202 may include at least one transmitter device 6206.

Further, the at least one space station 6204 may be positioned in at least one orbit around the earth. Further, each of the at least one space station 6204 may include a primary receiver device 6208 and a primary transmitter device 6210. Further, the primary receiver device 6208 may include a receiver transceiver. Further, the at least one transmitter device 6206 may be configured for transmitting energy wirelessly to the receiver transceiver. Further, the energy may include terahertz electromagnetic wave energy. Further, the receiver transceiver may be configured for receiving the energy wirelessly from the at least one transmitter device 6206 based on the transmitting of the energy wirelessly. Further, the receiver transceiver may include a receiver enclosure. Further, the receiver enclosure may include at least one metamaterial. Further, the receiver enclosure may be configured for storing the terahertz electromagnetic wave energy based on the receiving of the energy. Further, the receiver enclosure may be configured for converting the terahertz electromagnetic wave energy into electrical energy based on the receiving of the energy. Further, the receiver enclosure may include a receiver antenna configured for facilitating the receiving of the energy wirelessly. Further, the receiver antenna may include at least one superconducting material. Further, the receiver transceiver may be configured for transmitting a registration request to the at least one transmitter device 6206. Further, the registration request may include a unique receiver device identifier associated with the primary receiver device 6208. Further, the primary receiver device 6208 may be configured for generating the at least one energy asset based on the converting. Further, the primary receiver device 6208 may be configured for accessing a second distributed block-chain associated with at least one transaction of the at least one energy asset based on the generating of the at least one energy asset. Further, the primary receiver device 6208 may be configured for creating at least one entry for the at least one transaction of the at least one energy asset in the second distributed block-chain based on the accessing of the second distributed block-chain. Further, the at least one transmitter device 6206 may be configured for analyzing the registration request. Further, the at least one transmitter device 6206 may be configured for accessing a distributed block-chain associated with wireless energy transfer based on the analyzing. Further, the at least one transmitter device 6206 may be configured for authenticating the primary receiver device 6208 based on the accessing of the distributed block-chain. Further, the transmitting of the energy wirelessly to the receiver transceiver may be based on the authenticating. Further, the primary transmitter device 6210 may be electrically coupled with the primary receiver device 6208. Further, the primary transmitter device 6210 may be configured for transmitting the electrical energy wirelessly to at least one secondary receiver device 6212 based on the converting and the creating.

Figure 63:
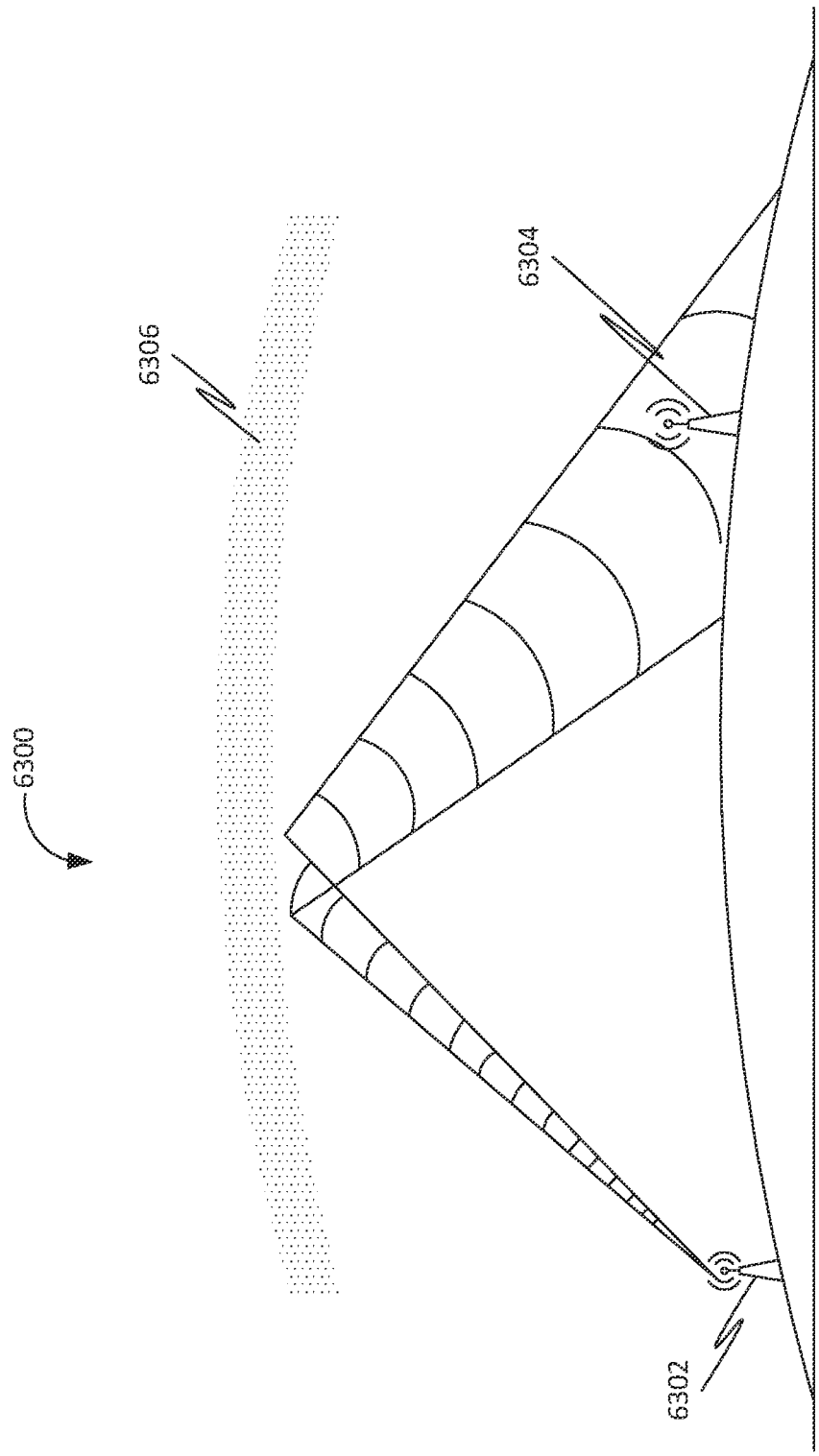
FIG. 63 is a schematic of a system for facilitating wireless energy transmissions from at least one transmitter device to at least one receiver device via the ionosphere of the atmosphere of the earth, in accordance with some embodiments.

FIG. 63 is a schematic of a system 6300 for facilitating wireless energy transmissions from at least one transmitter device 6302 to at least one receiver device 6304 via the ionosphere 6306 of the atmosphere of the earth, in accordance with some embodiments. Further, the at least one transmitter device 6302 may be positioned on the earth. Further, the at least one receiver device 6304 may be positioned on the earth and separated by a distance from the at least one transmitter device 6302. Further, the at least one transmitter device 6302 and the at least one receiver device 6304 may be mounted on a ground station. Further, the at least one transmitter device 6302 may emit electromagnetic wave energy toward the ionosphere 6306. Further, the electromagnetic wave energy reflects from the ionosphere directing the electromagnetic wave energy towards the at least one receiver device 6304. Further, the at least one receiver device 6304 converts the electromagnetic wave energy into electrical energy. Further, the energy of the electromagnetic wave energy may be 1000 watts. Further, the transmission of the electromagnetic wave energy to the at least one receiver device 6304 may be a point to point mode.

Figure 64:
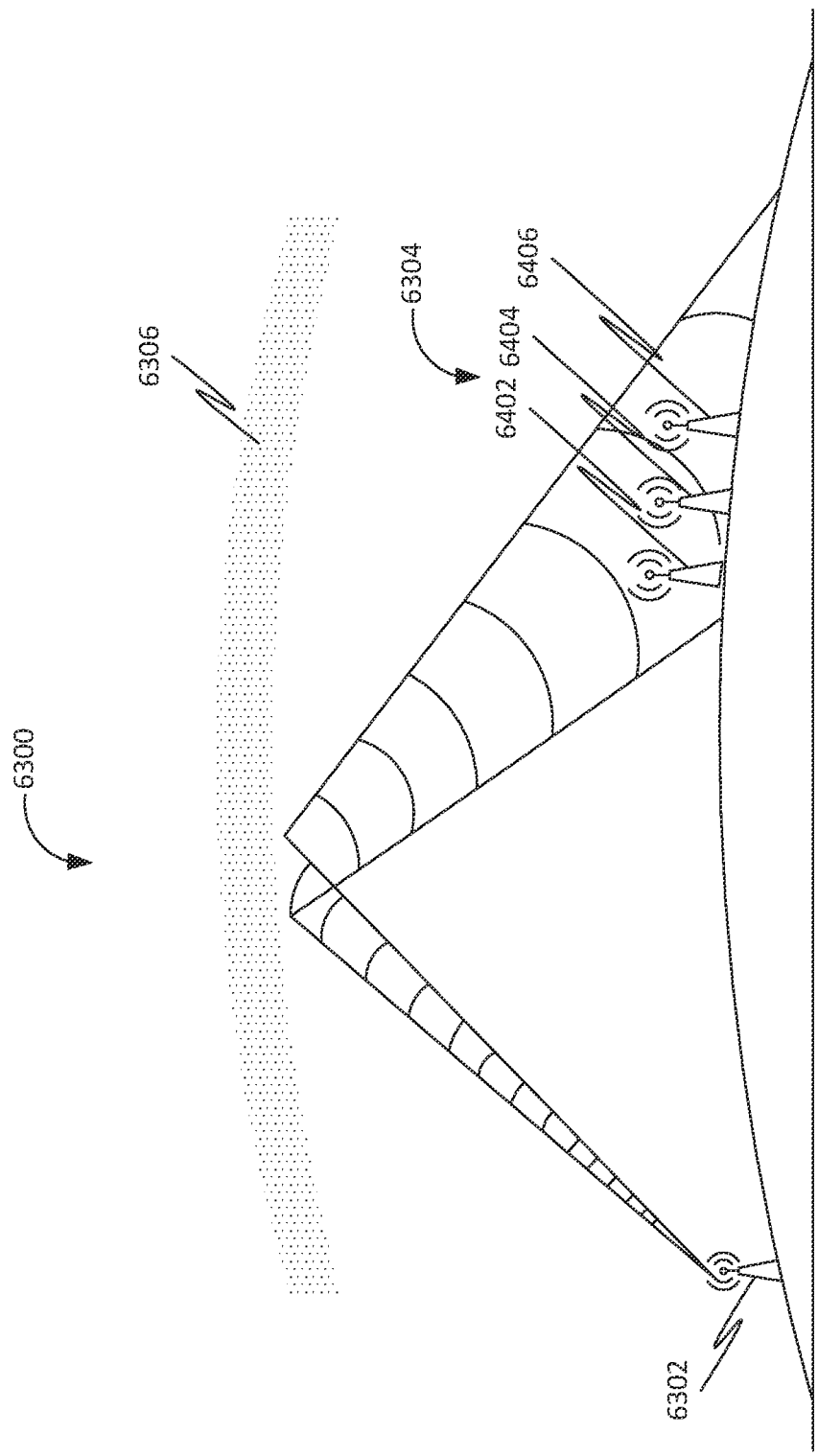
FIG. 64 is a schematic of a system for facilitating wireless energy transmissions from the at least one transmitter device to the at least one receiver device via the ionosphere of the atmosphere of the earth, in accordance with some embodiments.

FIG. 64 is a schematic of a system 6300 for facilitating wireless energy transmissions from the at least one transmitter device 6302 to the at least one receiver device 6304 via the ionosphere 6306 of the atmosphere of the earth, in accordance with some embodiments. Further, the at least one receiver device 6304 may include a plurality of receiver devices 6402-6406. Further, the transmission of the electromagnetic wave energy to the plurality of receiver devices 6402-6406 may be a point to multi-points mode.

Although the present disclosure has been explained in relation to its preferred embodiment, it is to be understood that many other possible modifications and variations can be made without departing from the spirit and scope of the disclosure.

What is claimed is:

1. A system for facilitating wireless energy transmissions, the system comprising:
 at least one ground station positioned in at least one location on the earth, wherein the at least one ground station comprises at least one transmitter device; and
 at least one space station positioned in at least one orbit around the earth, wherein each of the at least one space station comprises:
  a primary receiver device comprising a receiver transceiver, wherein the at least one transmitter device is configured for transmitting energy wirelessly to the receiver transceiver, wherein the energy comprises terahertz electromagnetic wave energy, wherein the receiver transceiver is configured for receiving the energy wirelessly from the at least one transmitter device based on the transmitting of the energy wirelessly, wherein the receiver transceiver comprises a receiver enclosure, wherein the receiver enclosure comprises at least one metamaterial, wherein the receiver enclosure is configured for converting the terahertz electromagnetic wave energy into electrical energy based on the receiving of the energy, wherein the receiver enclosure comprises a receiver antenna configured for facilitating the receiving of the energy wirelessly, wherein the receiver antenna comprises at least one superconducting material; and
  a primary transmitter device electrically coupled with the primary receiver device, wherein the primary transmitter device is configured for transmitting the electrical energy wirelessly to at least one secondary receiver device based on the converting.

2. The system of claim 1, wherein the at least one space station comprises at least one low earth orbit satellite, wherein the at least one orbit comprises at least one low earth orbit, wherein the at least one low earth orbit is in the ionosphere of the atmosphere of the earth.

3. The system of claim 2, wherein the at least one secondary receiver device is positioned at least one of above and below the ionosphere, wherein the transmitting of the electrical energy wirelessly to the at least one secondary receiver device comprises:
 converting the electrical energy into electromagnetic wave energy; and
 emitting the electromagnetic wave energy into the ionosphere with at least one radiating characteristic for refracting the electromagnetic wave energy towards the at least one secondary receiver device based on the converting of the electrical energy into the electromagnetic wave energy.

4. The system of claim 3 further comprises the at least one secondary receiver device electrically couplable with at least one electronic device associated with at least one of a virtual reality environment, an augmented reality environment, a mixed reality environment, and an extended reality environment, wherein the at least one secondary receiver device comprises at least one secondary receiver transceiver configured for receiving the electromagnetic wave energy wirelessly from the primary transmitter device based on the emitting, wherein the at least one secondary receiver transceiver comprises at least one secondary receiver enclosure, wherein the at least one secondary receiver enclosure is configured for converting the electromagnetic wave energy into electrical energy based on the receiving of the electromagnetic wave energy, wherein the at least one secondary receiver device is configured for powering the at least one electronic device based on the converting of the electromagnetic wave energy into the electrical energy.

5. The system of claim 2, wherein the at least one secondary receiver device is positioned in the ionosphere, wherein the transmitting of the electrical energy wirelessly to the at least one secondary receiver device comprises conducting the electrical energy to the at least one secondary receiver device via the ionosphere.

6. The system of claim 5, wherein the primary transmitter device comprises a transmitting terminal, wherein the conducting of the electrical energy comprises generating an amount of the electromotive force corresponding to the electrical energy on the transmitting terminal, wherein the generating of the amount of the electromotive force creates a flow of the electrical energy towards a receiving terminal of the at least one secondary receiver device through the ionosphere.

7. The system of claim 1, wherein the receiver transceiver further comprises at least one energy storage device disposed inside of the receiver enclosure, wherein the at least one energy storage device is electrically coupled with the receiver enclosure, wherein the at least one energy storage device is configured for storing the electrical energy after the converting, wherein the at least one energy storage device is comprised of borophene.

8. The system of claim 1, wherein the receiver enclosure comprises at least one layer of at least one material on at least one of an outer surface and an inner surface of the receiver enclosure, wherein the at least one layer of the at least one material prevents transmission of electromagnetic wave energy through the receiver enclosure.

9. The system of claim 8, wherein the at least one material comprises white limestone tufa.

10. The system of claim 1, wherein the receiver enclosure comprises at least one layer of at least one material on at least one of an outer surface and an inner surface of the receiver enclosure, wherein the at least one layer of the at least one material prevents transmission of electrical energy through the receiver enclosure.

11. The system of claim 10, wherein the at least one material comprises pink granite.

12. The system of claim 1, wherein the primary receiver device is further configured for:
generating at least one energy asset for the electrical energy based on the converting;
accessing a second distributed block-chain associated with at least one transaction of the at least one energy asset based on the generating of the at least one energy asset; and
creating at least one entry for the at least one transaction of the at least one energy asset in the second distributed block-chain based on the accessing of the second distributed block-chain, wherein the transmitting of the electrical energy to the at least one secondary receiver device is further based on the creating.

13. The system of claim 12, wherein the generating of the at least one energy asset comprises generating at least one quantum fractional non-fungible token (F-NFT) energy asset quantumly based on the converting, wherein the at least one quantum fractional non-fungible token (F-NFT) energy asset is associated with at least one quantum energy asset storage digital wallet, wherein the at least one asset is the at least one quantum F-NFT energy asset.

14. The system of claim 13, wherein the accessing of the second distributed block-chain comprises accessing a digital wallet associated with the second distributed block-chain, wherein the creating of the at least one entry for the at least one transaction of the at least one energy asset comprises creating the at least one entry for the at least one transaction of the at least one quantum F-NFT energy asset in the digital wallet using a private key.

15. The system of claim 14, wherein the at least one secondary receiver device is configured for:
accessing the digital wallet associated with the second distributed block-chain; and
creating at least one request for the at least one transaction of the at least one quantum F-NFT energy asset, wherein the creating of the at least one entry for the at least one transaction of the at least one quantum F-NFT energy asset in the digital wallet is further based on the creating of the at least one request.

16. The system of claim 1, wherein the primary receiver device is configured for transmitting a registration request to the at least one transmitter device, wherein the registration request comprises a unique receiver device identifier associated with the primary receiver device, wherein the at least one transmitter device is configured for:
analyzing the registration request;
accessing a distributed block-chain associated with wireless energy transfer based on the analyzing;
authenticating the primary receiver device based on the accessing of the distributed block-chain, wherein the transmitting of the energy wirelessly to the receiver transceiver is based on the authenticating.

17. The system of claim 1, wherein the receiver enclosure is configured for:
storing the terahertz electromagnetic wave energy based on the receiving of the energy; and
vibrating based on the receiving of the terahertz electromagnetic wave energy, wherein the converting of the terahertz electromagnetic wave energy into the electrical energy is based on the vibrating.

18. The system of claim 17, wherein the receiver transceiver further comprises at least one energy generating circuitry, wherein the at least one energy generating circuitry is mechanically coupled with the receiver enclosure, wherein the at least one energy generating circuitry is configured for generating alternating current electrical energy based on the vibrating, wherein the electrical energy comprises the alternating current electrical energy.

19. The system of claim 1, wherein the at least one metamaterial comprises at least one layer of at least one graphene, wherein the receiver enclosure comprises the at least one layer of the at least one graphene.

20. A system for facilitating wireless energy transmissions, the system comprising:
at least one ground station positioned in at least one location on the earth, wherein the at least one ground station comprises at least one transmitter device; and
at least one space station positioned in at least one orbit around the earth, wherein each of the at least one space station comprises:

a primary receiver device comprising a receiver transceiver, wherein the at least one transmitter device is configured for transmitting energy wirelessly to the receiver transceiver, wherein the energy comprises terahertz electromagnetic wave energy, wherein the receiver transceiver is configured for receiving the energy wirelessly from the at least one transmitter device based on the transmitting of the energy wirelessly, wherein the receiver transceiver comprises a receiver enclosure, wherein the receiver enclosure comprises at least one metamaterial, wherein the receiver enclosure is configured for:

storing the terahertz electromagnetic wave energy based on the receiving of the energy; and converting the terahertz electromagnetic wave energy into electrical energy based on the receiving of the energy, wherein the receiver enclosure comprises a receiver antenna configured for facilitating the receiving of the energy wirelessly, wherein the receiver antenna comprises at least one superconducting material, wherein the receiver transceiver is configured for transmitting a registration request to the at least one transmitter device, wherein the registration request comprises a unique receiver device identifier associated with the primary receiver device, wherein the primary receiver device is configured for:

generating the at least one energy asset based on the converting;

accessing a second distributed block-chain associated with at least one transaction of the at least one energy asset based on the generating of the at least one energy asset; and creating at least one entry for the at least one transaction of the at least one energy asset in the second distributed block-chain based on the accessing of the second distributed block-chain, wherein the at least one transmitter device is configured for:

analyzing the registration request;

accessing a distributed block-chain associated with wireless energy transfer based on the analyzing; and authenticating the primary receiver device based on the accessing of the distributed block-chain, wherein the transmitting of the energy wirelessly to the receiver transceiver is based on the authenticating; and a primary transmitter device electrically coupled with the primary receiver device, wherein the primary transmitter device is configured for transmitting the electrical energy wirelessly to at least one secondary receiver device based on the converting and the creating.

* * * * *